United States Patent
Addepalli et al.

(10) Patent No.: US 9,860,709 B2
(45) Date of Patent: Jan. 2, 2018

(54) SYSTEM AND METHOD FOR REAL-TIME SYNTHESIS AND PERFORMANCE ENHANCEMENT OF AUDIO/VIDEO DATA, NOISE CANCELLATION, AND GESTURE BASED USER INTERFACES IN A VEHICULAR ENVIRONMENT

(71) Applicant: CISCO TECHNOLOGY, INC., San Jose, CA (US)

(72) Inventors: Sateesh K. Addepalli, San Jose, CA (US); Lillian Lei Dai, Rockville, MD (US); Raghuram S. Sudhaakar, Sunnyvale, CA (US); Flavio Bonomi, Palo Alto, CA (US); Xiaoqing Zhu, Mountain View, CA (US); Preethi Natarajan, Los Gatos, CA (US); Vijaynarayanan Subramanian, Sunnyvale, CA (US); Rong Pan, Sunnyvale, CA (US); Robert Edward Somers, San Luis Obispo, CA (US)

(73) Assignee: Cisco Technology, Inc., San Jose, CA (US)

( * ) Notice: Subject to any disclaimer, the term of this patent is extended or adjusted under 35 U.S.C. 154(b) by 643 days.

(21) Appl. No.: 14/243,304

(22) Filed: Apr. 2, 2014

(65) Prior Publication Data

US 2014/0303807 A1    Oct. 9, 2014

Related U.S. Application Data

(62) Division of application No. 13/108,631, filed on May 16, 2011, now Pat. No. 8,718,797.

(Continued)

(51) Int. Cl.
*H04W 72/00* (2009.01)
*H04W 4/04* (2009.01)
(Continued)

(52) U.S. Cl.
CPC ........... *H04W 4/046* (2013.01); *B60R 16/023* (2013.01); *B60W 50/10* (2013.01); *G06F 3/017* (2013.01);
(Continued)

(58) Field of Classification Search
CPC ............... H04W 72/042; H04W 24/02; H04W 72/0446; H04W 72/085; H04W 24/08;
(Continued)

(56) References Cited

U.S. PATENT DOCUMENTS 5,428,666 A    6/1995 Fyfe et al.
5,604,787 A    2/1997 Kotzin et al.
(Continued)

FOREIGN PATENT DOCUMENTS

DE    10146664 A1    2/2003
EP    1337119 A    8/2003
(Continued)

OTHER PUBLICATIONS

Autonet Mobile, "Autonet Mobile Features, Technology Specifications," autonetmobile.com, 1 page; [earliest known publication date: Apr. 8, 2011] http://www.autonetmobile.com/service/anmdev.html.

(Continued)

*Primary Examiner* — Olumide T Ajibade Akonai

(57) ABSTRACT

A method includes establishing communication channels between an on-board unit (OBU) of a vehicle and a plurality of nodes, tagging each of a plurality of data from the plurality of nodes with a priority level, storing the plurality of data in a priority queue according to respective priority levels, selecting a medium to present a first data of the plurality of data to a user, and presenting the first data to the user via the medium. In the method, the plurality of nodes includes a remote node and an in-vehicle device. Another method includes receiving a data from a remote node, generating a plurality of data streams from the data and transmitting the plurality of data streams across a plurality of wireless interfaces. Another method includes enhancing audio signals from a plurality of microphones and speakers. Yet another method includes various gesture based user interfaces coupled to the OBU.

20 Claims, 24 Drawing Sheets

Related U.S. Application Data

(60) Provisional application No. 61/433,138, filed on Jan. 14, 2011.

(51) Int. Cl.

| | | |
|---|---|---|
| *H04W 72/04* | (2009.01) | |
| *H04W 28/06* | (2009.01) | |
| *H04W 52/12* | (2009.01) | |
| *G06F 9/54* | (2006.01) | |
| *H04W 48/06* | (2009.01) | |
| *H04W 48/18* | (2009.01) | |
| *B60W 50/10* | (2012.01) | |
| *G06F 3/01* | (2006.01) | |
| *G06F 3/16* | (2006.01) | |
| *H04L 12/26* | (2006.01) | |
| *H04L 29/06* | (2006.01) | |
| *H04W 12/08* | (2009.01) | |
| *G06F 21/45* | (2013.01) | |
| *H04W 12/06* | (2009.01) | |
| *H04W 28/02* | (2009.01) | |
| *H04W 40/20* | (2009.01) | |
| *H04W 48/02* | (2009.01) | |
| *H04L 29/08* | (2006.01) | |
| *B60R 16/023* | (2006.01) | |
| *H04L 12/721* | (2013.01) | |
| *H04L 29/12* | (2006.01) | |
| *H04W 8/06* | (2009.01) | |
| *H04W 8/08* | (2009.01) | |
| *H04W 8/26* | (2009.01) | |
| *H04W 40/02* | (2009.01) | |
| *H04L 1/00* | (2006.01) | |
| *H04W 4/00* | (2009.01) | |
| *H04W 4/10* | (2009.01) | |
| *H04W 12/02* | (2009.01) | |
| *H04W 12/04* | (2009.01) | |
| *H04W 76/00* | (2009.01) | |
| *H04W 80/02* | (2009.01) | |
| *H04W 84/00* | (2009.01) | |
| *H04W 36/08* | (2009.01) | |
| *H04W 52/14* | (2009.01) | |
| *H04W 52/22* | (2009.01) | |
| *H04W 52/24* | (2009.01) | |
| *H04W 52/34* | (2009.01) | |
| *H04W 84/12* | (2009.01) | |
| *H04W 92/18* | (2009.01) | |

(52) U.S. Cl.
CPC ............... *G06F 3/167* (2013.01); *G06F 9/542* (2013.01); *G06F 21/45* (2013.01); *H04L 1/008* (2013.01); *H04L 12/266* (2013.01); *H04L 29/06578* (2013.01); *H04L 43/0811* (2013.01); *H04L 43/0876* (2013.01); *H04L 45/12* (2013.01); *H04L 61/2592* (2013.01); *H04L 63/08* (2013.01); *H04L 63/107* (2013.01); *H04L 67/12* (2013.01); *H04L 67/32* (2013.01); *H04L 69/18* (2013.01); *H04W 4/00* (2013.01); *H04W 4/10* (2013.01); *H04W 8/06* (2013.01); *H04W 8/08* (2013.01); *H04W 8/26* (2013.01); *H04W 12/02* (2013.01); *H04W 12/04* (2013.01); *H04W 12/06* (2013.01); *H04W 12/08* (2013.01); *H04W 28/0215* (2013.01); *H04W 28/06* (2013.01); *H04W 40/02* (2013.01); *H04W 40/20* (2013.01); *H04W 48/02* (2013.01); *H04W 48/06* (2013.01); *H04W 48/18* (2013.01); *H04W 52/12* (2013.01); *H04W 72/0406* (2013.01); *H04W 72/0493* (2013.01); *H04W 76/005* (2013.01); *H04W 80/02* (2013.01); *H04W 36/08* (2013.01); *H04W 52/143* (2013.01); *H04W 52/225* (2013.01); *H04W 52/241* (2013.01); *H04W 52/346* (2013.01); *H04W 72/042* (2013.01); *H04W 84/005* (2013.01); *H04W 84/12* (2013.01); *H04W 92/18* (2013.01)

(58) Field of Classification Search
CPC ............... H04W 28/06; H04W 52/241; H04W 72/1231; H04B 7/0413; H04B 7/0417; H04B 17/309
See application file for complete search history.

(56) References Cited

U.S. PATENT DOCUMENTS

| | | |
|---|---|---|
| 5,737,215 A | 4/1998 | Schricker et al. |
| 5,763,862 A | 6/1998 | Jachimowicz et al. |
| 5,933,773 A | 8/1999 | Barvesten |
| 5,987,325 A | 11/1999 | Tayloe |
| 6,002,929 A | 12/1999 | Bishop et al. |
| 6,026,075 A | 2/2000 | Linville |
| 6,078,652 A | 6/2000 | Barak |
| 6,169,387 B1 | 1/2001 | Kaib |
| 6,175,789 B1 | 1/2001 | Beckert et al. |
| 6,285,869 B1 | 9/2001 | Shannon et al. |
| 6,320,351 B1 | 11/2001 | Ng et al. |
| 6,427,072 B1 | 7/2002 | Reichelt |
| 6,427,073 B1 | 7/2002 | Kortesalmi et al. |
| 6,484,082 B1 | 11/2002 | Millsap et al. |
| 6,490,679 B1 | 12/2002 | Tumblin et al. |
| 6,502,131 B1 | 12/2002 | Vaid |
| 6,516,357 B1 | 2/2003 | Hamann et al. |
| 6,526,272 B1 | 2/2003 | Bansal et al. |
| 6,542,071 B1 | 4/2003 | Ohtsubo et al. |
| 6,574,734 B1 | 6/2003 | Colson et al. |
| 6,587,127 B1 | 7/2003 | Leeke et al. |
| 6,604,140 B1 | 8/2003 | Beck et al. |
| 6,615,186 B1 | 9/2003 | Kolls |
| 6,643,504 B1 | 11/2003 | Chow et al. |
| 6,668,179 B2 | 12/2003 | Jiang |
| 6,714,799 B1 | 3/2004 | Park et al. |
| 6,721,580 B1 | 4/2004 | Moon |
| 6,735,506 B2 | 5/2004 | Breed et al. |
| 6,757,262 B1 | 6/2004 | Weisshaar et al. |
| 6,816,903 B1 | 11/2004 | Rakoshitz |
| 6,823,244 B2 | 11/2004 | Breed |
| 6,868,282 B2 | 3/2005 | Carlsson |
| 6,914,517 B2 | 7/2005 | Kinsella |
| 6,925,425 B2 | 8/2005 | Remboski et al. |
| 6,928,299 B1 | 8/2005 | Rinne et al. |
| 6,934,391 B1 | 8/2005 | Linkola et al. |
| 6,957,199 B1 | 10/2005 | Fisher |
| 6,980,830 B2 | 12/2005 | Ahonen |
| 7,039,221 B1 | 5/2006 | Tumey et al. |
| 7,050,897 B2 | 5/2006 | Breed et al. |
| 7,064,711 B2 | 6/2006 | Strickland et al. |
| 7,069,144 B2 | 6/2006 | Yoshihara et al. |
| 7,082,359 B2 | 7/2006 | Breed |
| 7,096,316 B1 | 8/2006 | Karr et al. |
| 7,171,460 B2 | 1/2007 | Kalavade et al. |
| 7,178,724 B2 | 2/2007 | Tamagno et al. |
| 7,185,161 B2 | 2/2007 | Kang |
| 7,218,930 B2 | 5/2007 | Ko et al. |
| 7,222,783 B2 | 5/2007 | Merrien |
| 7,259,469 B2 | 8/2007 | Brummet et al. |
| 7,363,056 B2 | 4/2008 | Faisy |
| 7,389,178 B2 | 6/2008 | Raz et al. |
| 7,412,313 B2 | 8/2008 | Isaac |
| 7,412,380 B1 | 8/2008 | Avendano et al. |
| 7,558,110 B2 | 7/2009 | Mizushima et al. |
| 7,564,842 B2 | 7/2009 | Callaway et al. |
| 7,593,605 B2 | 9/2009 | King et al. |
| 7,603,107 B2 | 10/2009 | Ratert et al. |
| 7,606,643 B2 | 10/2009 | Hunt et al. |

(56) References Cited

U.S. PATENT DOCUMENTS

| | | |
|---|---|---|
| 7,630,802 B2 | 12/2009 | Breed |
| 7,631,033 B2 | 12/2009 | Zehler |
| 7,636,626 B2 | 12/2009 | Oesterling et al. |
| 7,676,223 B2 | 3/2010 | Das |
| 7,689,231 B2 | 3/2010 | Mardiks et al. |
| 7,689,251 B2 | 3/2010 | Bae |
| 7,729,725 B2 | 6/2010 | Stenmark |
| 7,738,891 B2 | 6/2010 | Tenhunen et al. |
| 7,755,472 B2 | 7/2010 | Grossman |
| 7,778,227 B2 | 8/2010 | Gibbs |
| 7,787,602 B2 | 8/2010 | Pearson et al. |
| 7,791,310 B2 | 9/2010 | Luz et al. |
| 7,792,618 B2 | 9/2010 | Quigley et al. |
| 7,808,375 B2 | 10/2010 | Bertness et al. |
| 7,844,817 B2 | 11/2010 | Mueller et al. |
| 7,849,020 B2 | 12/2010 | Johnson |
| 7,904,569 B1 | 3/2011 | Gelvin et al. |
| 7,917,251 B2 | 3/2011 | Kressner et al. |
| 7,957,729 B2 | 6/2011 | Roter et al. |
| 7,957,744 B2 | 6/2011 | Oesterling et al. |
| 8,054,038 B2 | 11/2011 | Kelty et al. |
| 8,060,017 B2 | 11/2011 | Schlicht |
| 8,061,140 B2 | 11/2011 | Harmon |
| 8,063,797 B1 | 11/2011 | Sonnabend et al. |
| 8,081,643 B2 | 12/2011 | Sonoda et al. |
| 8,086,395 B2 | 12/2011 | Mino |
| 8,095,184 B2 | 1/2012 | Hiltunen et al. |
| 8,100,206 B2 | 1/2012 | Kressner et al. |
| 8,131,317 B2 | 3/2012 | Lee |
| 8,135,443 B2 | 3/2012 | Aleksic et al. |
| 8,140,064 B2 | 3/2012 | Mardiks |
| 8,143,741 B2 | 3/2012 | Funakoshi et al. |
| 8,144,596 B2 | 3/2012 | Veillette |
| 8,180,400 B2 | 5/2012 | Shin et al. |
| 8,185,300 B2 | 5/2012 | Miura et al. |
| 8,195,233 B2 | 6/2012 | Morikuni et al. |
| 8,195,235 B2 | 6/2012 | Montes |
| 8,207,642 B2 | 6/2012 | Lafontaine et al. |
| 8,233,389 B2 | 7/2012 | Yim et al. |
| 8,244,468 B2 | 8/2012 | Scalisi et al. |
| 8,244,909 B1 | 8/2012 | Hanson et al. |
| 8,249,087 B2 | 8/2012 | Takada et al. |
| 8,255,107 B2 | 8/2012 | Yang et al. |
| 8,294,420 B2 | 10/2012 | Kocher |
| 8,296,373 B2 | 10/2012 | Bosworth et al. |
| 8,335,493 B2 | 12/2012 | Angelhag |
| 8,364,959 B2 | 1/2013 | Bhanoo et al. |
| 8,378,623 B2 | 2/2013 | Kusch et al. |
| 8,514,825 B1 | 8/2013 | Addepalli et al. |
| 8,582,631 B2 | 11/2013 | Vos |
| 8,602,141 B2 | 12/2013 | Yee et al. |
| 8,705,527 B1 | 4/2014 | Addepalli et al. |
| 8,712,474 B2 | 4/2014 | Gehrmann |
| 8,718,797 B1 | 5/2014 | Addepalli et al. |
| 8,719,431 B2 | 5/2014 | Reif et al. |
| 8,837,363 B2 | 9/2014 | Jones et al. |
| 8,848,608 B1 | 9/2014 | Addepalli |
| 8,964,549 B2 | 2/2015 | Vos |
| 8,964,781 B2 | 2/2015 | Hunzinger et al. |
| 8,965,677 B2 | 2/2015 | Breed |
| 8,989,954 B1 | 3/2015 | Addepalli et al. |
| 9,036,509 B1 | 5/2015 | Addepalli et al. |
| 9,083,581 B1 | 7/2015 | Addepalli et al. |
| 9,154,900 B1 | 10/2015 | Addepalli et al. |
| 9,167,618 B2 | 10/2015 | Brisebois |
| 9,225,782 B2 | 12/2015 | Addepalli et al. |
| 9,277,370 B2 | 3/2016 | Addepalli et al. |
| 2001/0033225 A1 | 10/2001 | Razavi et al. |
| 2002/0006139 A1 | 1/2002 | Kikkawa et al. |
| 2002/0072388 A1 | 6/2002 | Korneluk et al. |
| 2002/0097855 A1 | 7/2002 | Neudeck et al. |
| 2002/0103964 A1 | 8/2002 | Igari |
| 2002/0165008 A1 | 11/2002 | Sashimara et al. |
| 2002/0174360 A1 | 11/2002 | Ikeda |
| 2002/0198632 A1 | 12/2002 | Breed et al. |
| 2003/0005435 A1 | 1/2003 | Nelger et al. |
| 2003/0009271 A1 | 1/2003 | Akiyama |
| 2003/0028763 A1 | 2/2003 | Malinen et al. |
| 2003/0033435 A1 | 2/2003 | Hanner |
| 2003/0046228 A1 | 3/2003 | Berney |
| 2003/0051041 A1 | 3/2003 | Kalavade et al. |
| 2003/0083968 A1 | 5/2003 | Marsh et al. |
| 2003/0152038 A1 | 8/2003 | Oshima et al. |
| 2003/0191939 A1 | 10/2003 | Tsai et al. |
| 2004/0008677 A1 | 1/2004 | Cen |
| 2004/0022216 A1 | 2/2004 | Shi |
| 2004/0023689 A1 | 2/2004 | Ahonen |
| 2004/0024670 A1 | 2/2004 | Valenzuela et al. |
| 2004/0042604 A1 | 3/2004 | Hiltunen et al. |
| 2004/0073339 A1 | 4/2004 | Ruoppolo |
| 2004/0083043 A1 | 4/2004 | Akiyama et al. |
| 2004/0087305 A1 | 5/2004 | Jiang et al. |
| 2004/0137890 A1 | 7/2004 | Kalke |
| 2004/0143386 A1 | 7/2004 | Yoshihara et al. |
| 2004/0162653 A1 | 8/2004 | Ban et al. |
| 2004/0165656 A1 | 8/2004 | Shiue et al. |
| 2004/0171386 A1 | 9/2004 | Mitjana |
| 2004/0204087 A1 | 10/2004 | Carlsson |
| 2004/0229601 A1 | 11/2004 | Zabawskyj et al. |
| 2004/0230345 A1 | 11/2004 | Tzamaloukas |
| 2004/0246966 A1 | 12/2004 | Wu et al. |
| 2004/0249915 A1 | 12/2004 | Russell |
| 2004/0256451 A1 | 12/2004 | Goman et al. |
| 2005/0009563 A1 | 1/2005 | Stenmark |
| 2005/0018883 A1 | 1/2005 | Scott |
| 2005/0020250 A1 | 1/2005 | Chaddha et al. |
| 2005/0039027 A1 | 2/2005 | Shapiro |
| 2005/0041660 A1 | 2/2005 | Pennec et al. |
| 2005/0060070 A1 | 3/2005 | Kapolka et al. |
| 2005/0065678 A1 | 3/2005 | Smith et al. |
| 2005/0075137 A1 | 4/2005 | Reemtsma |
| 2005/0096836 A1 | 5/2005 | Minami et al. |
| 2005/0101323 A1 | 5/2005 | De Beer |
| 2005/0124288 A1 | 6/2005 | Karmi et al. |
| 2005/0131673 A1 | 6/2005 | Koizumi et al. |
| 2005/0162687 A1 | 7/2005 | Lee |
| 2005/0207408 A1 | 9/2005 | Elliott |
| 2005/0239504 A1 | 10/2005 | Ishi et al. |
| 2005/0266883 A1 | 12/2005 | Chatrath |
| 2005/0271037 A1 | 12/2005 | Habaguchi et al. |
| 2005/0282554 A1 | 12/2005 | Shyy et al. |
| 2006/0020783 A1 | 1/2006 | Fisher |
| 2006/0031590 A1 | 2/2006 | Monette et al. |
| 2006/0059340 A1 | 3/2006 | Eldenmalm et al. |
| 2006/0068786 A1 | 3/2006 | Florence |
| 2006/0075242 A1 | 4/2006 | Aissi et al. |
| 2006/0076420 A1 | 4/2006 | Prevost et al. |
| 2006/0079237 A1 | 4/2006 | Liu et al. |
| 2006/0079254 A1 | 4/2006 | Hogan |
| 2006/0089157 A1 | 4/2006 | Casey |
| 2006/0129311 A1 | 6/2006 | Bauman et al. |
| 2006/0129848 A1 | 6/2006 | Paksoy et al. |
| 2006/0160532 A1 | 7/2006 | Buckley et al. |
| 2006/0172772 A1 | 8/2006 | Bjorkner |
| 2006/0181521 A1 | 8/2006 | Perreault et al. |
| 2006/0183500 A1 | 8/2006 | Choi |
| 2006/0218337 A1 | 9/2006 | Hashimoto |
| 2006/0224887 A1 | 10/2006 | Vesikivi et al. |
| 2006/0234693 A1 | 10/2006 | Isidore et al. |
| 2006/0277589 A1 | 12/2006 | Margis et al. |
| 2006/0282554 A1 | 12/2006 | Jiang et al. |
| 2006/0285538 A1 | 12/2006 | Oommen |
| 2006/0291455 A1 | 12/2006 | Katz et al. |
| 2007/0004457 A1 | 1/2007 | Han |
| 2007/0021847 A1 | 1/2007 | Hyodo et al. |
| 2007/0027583 A1 | 2/2007 | Tamir et al. |
| 2007/0030119 A1 | 2/2007 | Ono et al. |
| 2007/0030136 A1 | 2/2007 | Teshima et al. |
| 2007/0038772 A1 | 2/2007 | Obata |
| 2007/0060200 A1 | 3/2007 | Boris et al. |
| 2007/0067085 A1 | 3/2007 | Lu et al. |
| 2007/0077966 A1 | 4/2007 | Huang |
| 2007/0094337 A1 | 4/2007 | Klassen et al. |
| 2007/0105531 A1 | 5/2007 | Schroeder, Jr. |

(56) References Cited

U.S. PATENT DOCUMENTS

| | | |
|---|---|---|
| 2007/0124490 A1 | 5/2007 | Kalavade et al. |
| 2007/0129072 A1 | 6/2007 | Yamato et al. |
| 2007/0130156 A1 | 6/2007 | Tenhunen et al. |
| 2007/0139216 A1 | 6/2007 | Breed |
| 2007/0149170 A1 | 6/2007 | Bloebaum et al. |
| 2007/0167161 A1 | 7/2007 | Cheng et al. |
| 2007/0177562 A1 | 8/2007 | Castrogiovanni et al. |
| 2007/0198144 A1 | 8/2007 | Norris et al. |
| 2007/0202895 A1 | 8/2007 | Benco et al. |
| 2007/0218947 A1 | 9/2007 | Buckley |
| 2007/0223031 A1 | 9/2007 | Kitada et al. |
| 2007/0225873 A1 | 9/2007 | Toya et al. |
| 2007/0238449 A1 | 10/2007 | Park et al. |
| 2007/0254713 A1 | 11/2007 | Lagnado et al. |
| 2007/0255797 A1 | 11/2007 | Dunn et al. |
| 2007/0265735 A1 | 11/2007 | Chigusa |
| 2007/0266428 A1 | 11/2007 | Downes et al. |
| 2007/0271014 A1 | 11/2007 | Breed |
| 2007/0273492 A1 | 11/2007 | Hara et al. |
| 2008/0020755 A1 | 1/2008 | Liu et al. |
| 2008/0020773 A1 | 1/2008 | Black et al. |
| 2008/0027606 A1 | 1/2008 | Helm |
| 2008/0028230 A1 | 1/2008 | Shatford |
| 2008/0031207 A1 | 2/2008 | Martinez et al. |
| 2008/0040005 A1 | 2/2008 | Breed |
| 2008/0043759 A1 | 2/2008 | Poetker et al. |
| 2008/0051062 A1 | 2/2008 | Lee |
| 2008/0072299 A1 | 3/2008 | Reiher |
| 2008/0087720 A1 | 4/2008 | Levitov |
| 2008/0120504 A1 | 5/2008 | Kirkup et al. |
| 2008/0122597 A1 | 5/2008 | Englander |
| 2008/0147265 A1 | 6/2008 | Breed |
| 2008/0147271 A1 | 6/2008 | Breed |
| 2008/0169350 A1 | 7/2008 | Audebert et al. |
| 2008/0205416 A1 | 8/2008 | DeChiara |
| 2008/0209545 A1 | 8/2008 | Asano |
| 2008/0220743 A1 | 9/2008 | Mora et al. |
| 2008/0226074 A1 | 9/2008 | Sammour et al. |
| 2008/0227604 A1 | 9/2008 | Daniel |
| 2008/0238135 A1 | 10/2008 | Takeda et al. |
| 2008/0254766 A1 | 10/2008 | Craven |
| 2008/0261561 A1 | 10/2008 | Gehrmann |
| 2008/0265024 A1 | 10/2008 | Tracy et al. |
| 2008/0267186 A1 | 10/2008 | Boukis |
| 2008/0284575 A1 | 11/2008 | Breed |
| 2008/0289018 A1 | 11/2008 | Kawaguchi |
| 2008/0290161 A1 | 11/2008 | Blake |
| 2008/0311912 A1 | 12/2008 | Balasubramanian et al. |
| 2009/0003283 A1 | 1/2009 | Meylan |
| 2009/0007250 A1 | 1/2009 | Pouzin et al. |
| 2009/0019528 A1 | 1/2009 | Wei et al. |
| 2009/0037207 A1 | 2/2009 | Farah |
| 2009/0043441 A1 | 2/2009 | Breed |
| 2009/0061839 A1 | 3/2009 | Zimmerman et al. |
| 2009/0077643 A1 | 3/2009 | Schmidt et al. |
| 2009/0138136 A1 | 5/2009 | Natsume |
| 2009/0154460 A1 | 6/2009 | Varela et al. |
| 2009/0156227 A1* | 6/2009 | Frerking .......... H04B 7/0691 455/455 |
| 2009/0163175 A1 | 6/2009 | Shi et al. |
| 2009/0215449 A1 | 8/2009 | Avner |
| 2009/0225736 A1 | 9/2009 | Patarkazishvili |
| 2009/0227230 A1 | 9/2009 | Camilleri et al. |
| 2009/0265633 A1 | 10/2009 | Lim et al. |
| 2009/0312850 A1 | 12/2009 | Higuchi et al. |
| 2010/0005313 A1 | 1/2010 | Dai |
| 2010/0037057 A1 | 2/2010 | Shim et al. |
| 2010/0049626 A1 | 2/2010 | Hong |
| 2010/0070171 A1 | 3/2010 | Barbeau et al. |
| 2010/0085868 A1 | 4/2010 | Guo et al. |
| 2010/0088401 A1 | 4/2010 | DeGraeve et al. |
| 2010/0112997 A1 | 5/2010 | Roundtree |
| 2010/0167702 A1 | 7/2010 | Madhavan |
| 2010/0167721 A1 | 7/2010 | Madhavan |
| 2010/0167724 A1 | 7/2010 | Haran et al. |
| 2010/0183016 A1 | 7/2010 | Bonk et al. |
| 2010/0195724 A1 | 8/2010 | Yoshida et al. |
| 2010/0202346 A1 | 8/2010 | Sitzes et al. |
| 2010/0208698 A1 | 8/2010 | Lu |
| 2010/0215043 A1 | 8/2010 | Hisada |
| 2010/0226291 A1 | 9/2010 | Gorbachov |
| 2010/0232404 A1 | 9/2010 | Chen et al. |
| 2010/0234009 A1 | 9/2010 | Antani et al. |
| 2010/0234071 A1 | 9/2010 | Shabtay et al. |
| 2010/0248690 A1 | 9/2010 | Biggs et al. |
| 2010/0279653 A1 | 11/2010 | Poltorak |
| 2010/0280956 A1 | 11/2010 | Chutorash et al. |
| 2010/0291924 A1 | 11/2010 | Antrim et al. |
| 2010/0294750 A1 | 11/2010 | Hogenmueller et al. |
| 2010/0311391 A1 | 12/2010 | Siu et al. |
| 2010/0311404 A1 | 12/2010 | Shi et al. |
| 2010/0311418 A1 | 12/2010 | Shi et al. |
| 2010/0311444 A1 | 12/2010 | Shi et al. |
| 2011/0032952 A1 | 2/2011 | Rochon et al. |
| 2011/0034201 A1 | 2/2011 | Hamada et al. |
| 2011/0055292 A1 | 3/2011 | Madau et al. |
| 2011/0059738 A1 | 3/2011 | Waller |
| 2011/0071718 A1 | 3/2011 | Norris et al. |
| 2011/0106375 A1 | 5/2011 | Sundaram |
| 2011/0149982 A1 | 6/2011 | Hwang et al. |
| 2011/0153149 A1 | 6/2011 | Jeon et al. |
| 2012/0004933 A1 | 1/2012 | Foladare et al. |
| 2012/0089299 A1 | 4/2012 | Breed |
| 2012/0109418 A1 | 5/2012 | Lorber |
| 2012/0109446 A1 | 5/2012 | Yousefi et al. |
| 2012/0182935 A1 | 7/2012 | Addepalli et al. |
| 2013/0018575 A1 | 1/2013 | Birken et al. |
| 2013/0159466 A1 | 6/2013 | Mao |
| 2013/0301584 A1 | 11/2013 | Addepalli et al. |
| 2014/0049413 A1 | 2/2014 | Agarwal et al. |
| 2014/0380442 A1 | 12/2014 | Addepalli et al. |
| 2015/0029987 A1 | 1/2015 | Addepalli et al. |
| 2015/0222708 A1 | 8/2015 | Addepalli et al. |

FOREIGN PATENT DOCUMENTS

| | | |
|---|---|---|
| EP | 1696357 | 8/2006 |
| EP | 1727383 | 11/2006 |
| EP | 1737160 | 12/2006 |
| EP | 1758335 | 2/2007 |
| GB | 2294787 | 5/1996 |
| GB | 2313257 A | 11/1997 |
| GB | 2386803 A | 9/2003 |
| GB | 2406925 | 4/2005 |
| JP | 2000194660 | 7/2000 |
| WO | WO 92/19078 | 10/1992 |
| WO | WO 99/24938 | 5/1999 |
| WO | WO 99/27730 | 6/1999 |
| WO | WO 99/46682 | 9/1999 |
| WO | WO 00/79368 | 12/2000 |
| WO | WO 0111577 | 2/2001 |
| WO | WO 02/067563 | 8/2002 |
| WO | WO 02/089449 | 11/2002 |
| WO | WO 03/007639 | 1/2003 |
| WO | WO 2004/021296 | 3/2004 |
| WO | WO 2005/029890 | 3/2005 |
| WO | WO 2006/094564 | 9/2006 |
| WO | WO 2007/143342 | 12/2007 |
| WO | WO 2008/040964 | 4/2008 |
| WO | WO 2009/082759 | 7/2009 |

OTHER PUBLICATIONS

Autonet Mobile, "CARFI Features, Technology Specifications," autonetmobile.com, 1 page; [earliest known publication date: Apr. 8, 2011] http://autonetmobile.com/service/carfidev.html.

Autonet Mobile, "It's What Your Car has been Waiting For," autonetmobile.com, 2 pages; [retrieved and printed Apr. 8, 2011] http://www.autonetmobile.com/service/.

Bickhart, Ryan W., et al., "Transparent TCP-to-SCTP Translation Shim Layer," EuroBSDCon 2007, Copenhagen, Denmark, Sep. 17-18, 2007; 14 pages.

(56) References Cited

OTHER PUBLICATIONS

Bilstrup, "A Survey Regarding Wireless Communication Standards Intended for a High-Speed Vehicle Environment," Technical Report IDE0712, Feb. 2007, 51 pages.
Blazevic, Ljubica, et al., "A Location-Based Routing Method for Mobile Ad Hoc Networks," IEEE Transactions on Mobile Computing, vol. 4, No. 2, Mar./Apr. 2005 (Issue publication date: Feb. 7, 2005); 14 pages.
Boman, K., Niemi, V., et al. "UMTS Security," Electronics and Communication Engineerying Journal, Oct. 2002, 14 pages; http://www.it.iitb.ac.in/~kavita/GSM_Security_Papers/New%20papers/umts_security.pdf.
Dierks, T., et al., "The Transport Layer Security (TLS) Protocol," (Version 1.1), Network Working Group, RFC 4346, Apr. 2006, 87 pages; http://www.rfc-editor.org/rfc/pdfrfc/rfc4346.txt.pdf.
EPO May 22, 2012 European Search Report and Written Opinion from EP 12150208.2.
Farinacci, D. et al., "LISP Mobile Node," Network Working Group Internet Draft, Feb. 1, 2010, 22 pages; http://tools.ietf.org/id/draft-meyer-lisp-mn-01.txt.
Harkins, D., et al., "The Internet Key Exchange (IKE)," Network Working Group, RFC 2409, Nov. 1998, 41 pages; http://www.rfc-editor.org/rfc/pdfrfc/rfc2409.txt.pdf.
Hsu, WAVE/DSRC Development and Standardization, Industrial Technology Research Institute, Oct. 1, 2010, 84 pages.
Ibars, Christian et al., "Radio Resource Allocation for a High Capacity Vehicular Access Network," 4th International Symposium on Wireless Vehicular Communications: WIVEC2011, Sep. 5-6, 2011, San Francisco, CA; U.S., 5 pages, http://www.ieeevtc.org/wivec2011/.
Ibars, Christian et al., "Wireless Services in the Connected Vehicle Era," IEEE Communications Magazine, Dec. 23, 2010, 13 pages.
Kent, S., et al., "Security Architecture for the Internet Protocol," Network Working Group, RFC 2401, Nov. 1998, 66 pages; http://www.rfc-editor.org/rfc/pdfrfc/rfc2401.txt.pdf.
Lillian Lei Dai, *"Proactive Mobile Wireless Networks: an infrastructureless wireless network architecture for delay-sensitive applications,"* Massachusetts Institute of Technology, Jun. 2008 (two parts submitted: Part 1-105 pages; Part 2-97 pages).
"Cisco Mobile Network Solutions for Commercial Transit Agencies," Cisco.com, © 2008 Cisco Systems, Inc., Aug. 2008, 8 pages http://www.cisco.com/en/US/prod/collateral/routers/ps272/white_paper_c11-4921115.html.
"Cisco Mobile Network Solutions for Public Safety," Cisco.com, 2008 Cisco Systems, Inc., Mar. 2008, 7 pages http://www.cisco.com/en/US/prod/collateral/routers/ps272/prod_white_paper0900aecd806220af.html.
"TCG Mobile Trusted Module Specification." Trusted Computing Group, Specification version 1.0, Revision 6, Jun. 2008, 105 pages; [Retrieved and printed Apr. 8, 2011] http://www.trustedcomputinggroup.org/files/resource_files/87852F33-1D09-3519-AD0C0F141CC6B10D/Revision_6-tcg-mobile-trusted-module-1_0.pdf.
Alves, T., et al., "TrustZone: Integrated Hardware and Software Security," Information Quarterly, vol. 3, No. 4, 2004, pp. 18-24; [Retrieved and printed Apr. 8, 2011] http://www.iqmagazineonline.com/magazine/pdf/v_3_4_pdf/Pg18_24_custZone_Secur.pdf.
Arsenault, A., et al., "Securely Available Credentials—Requirements," IETF, Network Working Group, RFC 3157, Baltimore Technologies, Aug. 2001, 20 pages.
U.S. Appl. No. 13/014,605, entitled "System and Method for Enabling Secure Transactions Using Flexible Identity Management in a Vehicular Environment," filed Jan. 26, 2011, Inventors: Sateesh K. Addepalli et al.
U.S. Appl. No. 13/071,367, entitled "System and Method for Wireless Interface Selection and for Communication and Access Control of Subsystems, Devices, and Data in a Vehicular Environment," filed Mar. 24, 2011, Inventors: Sateesh K. Addepalli et al.
U.S. Appl. No. 13/111,425, entitled "System and Method for Providing Resource Sharing, Synchronizing, Media Coordination, Transcoding, and Traffic Management in a Vehicular Environment," filed May 19, 2011, Inventors: Sateesh K. Addepalli et al.
U.S. Appl. No. 13/117,860, entitled "System and Method for Analyzing Vehicular Behavior in a Network Environment," filed May 27, 2011, Inventors: Sateesh K. Addepalli et al.
U.S. Appl. No. 13/118,220, entitled "System and Method for Routing, Mobility, Application Services, Discovery, and Sensing in a Vehicular Network Environment," filed May 27, 2011, Inventors: Sateesh K. Addepalli et al.
U.S. Appl. No. 13/087,884, entitled System and Method for Discovery, Trusted Execution, and Admission Control in a Vehicular Environment, filed Apr. 15, 2011, Inventors: Sateesh K. Addepalli et al.
U.S. Appl. No. 13/083,305, entitled "System and Method for Applications Management in a Networked Vehicular Environment," filed Apr. 8, 2011, Inventors: Sateesh K. Addepalli et al.
U.S. Appl. No. 13/114,659, entitled "System and Method for Transport, Network, Translation, and Adaptive Coding in a Vehicular Network Environment," filed May 24, 2011, Inventors: Sateesh K. Addepalli et al.
U.S. Appl. No. 14/242,122, entitled "System and Method for Internal Networking, Data Optimization and Dynamic Frequency Selection in a Vehicular Environment," filed Apr. 1, 2014, Inventors: Sateesh K. Addepalli et al.
PCT Apr. 22, 2009 International Search Report for PCT/US08/88320; 3 pages.
PCT Jun. 29, 2010 International Preliminary Report on Patentability and Written Opinion of the International Searching Authority for PCT/US08/88320; 10 pages.
Robert Bosch GmbH, *Automotive Electrics Automotive Electronics, Systems and Components, New: Networking Hybrid Drive,* $5^{th}$ Edition, Nov. 2007, BentleyPublishers.com, 255 pages (two parts submitted: Part 1-121 pages; Part 2-131 pages) [Best copy available—Library of Congress Catalog Record included].
Scarfone, Karen et al., "Guide to Instrusion Detection and Prevention Systems (IDPS)," NIST (National Institute of Standards and Technology), Special Publication 800-94, Feb. 2007, 127 pages http://csrc.ncsl.nist.gov/publications/nistpubs/800-94/SP800-94.pdf.
Shevade, Updendra et al., "Enabling High-Bandwidth Vehicular Content Distribution," ACM CoNEXT 2010, Philadelphia, PA, Nov. 2010, 12 pages http://www.cs.utexas.edu/~lili/papers/pub/conext10.pdf.
Weigle, Dr. Michele, "Standards: WAVE/DSCRC/802.11p, CS 795/895 Vehicular Networks," Old Dominion University, Spring 2008, 19 pages.
Zeldovich, Nickalai et al., "Making Information Flow Explicit in HiStar," OSDI '06: $7^{th}$ USENIX Symposium on Operating Systems Design and Implementation, Nov. 2006, 16 pages.
Zeldovich, Nickolai et al., "Securing Distributed Systems with Information Flow Control," NSDI '08: $5^{th}$ USENIX Symposium on Networked Systems Design and Implementation, Apr. 2008, 16 pages.
Freeman, Shanna, "How OnStar Works," HowStuffWorks.com, a Discovery Company; Feb. 8, 2006 http://auto.howstuffworks.com/onstar2.htm/printable.
Wahab, et al.,"Driving Profile Modeling and Recognition Based on Soft Computer Approach," IEEE Transactions on Neural Networks, vol. 20, No. 4, Apr. 2009.
Petrescu, et al., "Joint IP Networking and Radio Architecture for Vehicular Networks," 11th International Conference on ITS Telecommunications, Aug. 2011, St. Petersburg, Germany; 7 pages.

\* cited by examiner

SYSTEM AND METHOD FOR REAL-TIME SYNTHESIS AND PERFORMANCE ENHANCEMENT OF AUDIO/VIDEO DATA, NOISE CANCELLATION, AND GESTURE BASED USER INTERFACES IN A VEHICULAR ENVIRONMENT

CROSS-REFERENCE TO RELATED APPLICATION

This application is a divisional (and claims the benefit under 35 U.S.C. §120) of U.S. application Ser. No. 13/108,631, filed May 16, 2011, entitled "SYSTEM AND METHOD FOR ESTABLISHING COMMUNICATION CHANNELS BETWEEN ON-BOARD UNIT OF VEHICLE AND PLURALITY OF NODES," by Inventors Sateesh K. Addepalli et al., which application claims the benefit of priority under 35 U.S.C. §119(e) of U.S. Provisional Application Ser. No. 61/433,138, filed Jan. 14, 2011, entitled "SYSTEM, METHOD, AND PROCESSES ASSOCIATED WITH CONNECTED VEHICLES," by Inventors Sateesh K. Addepalli et al. The disclosures of both of the prior applications are considered part of (and are incorporated by reference in) the disclosure of this application in their entireties.

TECHNICAL FIELD

This disclosure relates in general to the field of electronic communications and, more particularly, to real-time synthesis and performance enhancement of audio/video data, and noise cancellation and gesture based user interfaces in a vehicular environment.

BACKGROUND

Networking architectures have grown increasingly complex, and further, have been designed for use in a wide variety of communications environments. Demand continues to rise among the subscriber base of end users for network access across diverse network environments. In particular, configuring suitable network architecture for vehicular environments (e.g., automobiles, buses, airplanes, trains, boats, etc.) presents unique difficulties. Vehicles can be mobile across a large geographic area, can travel at variable speeds, can have internal networks related to the vehicle itself, and can include more than one end user at a time. Providing the ability to synthesize and enhance the performance of audio-visual data, and to offer noise cancellation and gesture based user interfaces in the vehicular environment presents significant challenges to system designers, vehicle manufacturers and the like.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method according to an example embodiment includes establishing communication channels between an on-board unit (OBU) of a vehicle and a plurality of nodes, receiving a plurality of data from the plurality of nodes, tagging each of the plurality of data from the plurality of nodes with a respective priority level, storing the plurality of data in a priority queue according to the respective priority levels, selecting a medium to present a first data of the plurality of data to a user, and presenting the first data to the user via the medium. In the method, the plurality of nodes includes a remote node and an in-vehicle device. More specific embodiments include identifying a data type of the first data, accessing a previously stored mapping of data types to corresponding priority levels, and associating a priority level to the first data where the priority level corresponds to the data type of the first data.

A method according to an example embodiment includes establishing a communication channel between a node and a sender, extracting a meta information of a data from the sender, calculating a connectivity of each wireless interface in a plurality of wireless interfaces, generating a plurality of data streams from the data, and transmitting the plurality of data streams across the plurality of wireless interfaces. More specific embodiments include additional aspects including calculating connectivity of each wireless interface using loss rate and RSSI measurements, matching traffic rate across each wireless interface with bandwidth according to media characteristics of the data, calculating retransmission levels, and other features.

A method in another example embodiment includes locating at least two microphones and at least two speakers inside a vehicle, wherein the microphones and speakers are adapted to communicate with the OBU, receiving, on a first microphone, a first audio signal corresponding to a sound from a user, and receiving, on a second microphone, a second audio signal corresponding to the sound. The first microphone is located closer to the user than the second microphone. The method includes determining a source of the sound from the first audio signal and the second audio signal, and enhancing the first audio signal. More specific embodiments include transmitting a third audio signal on the at least two speakers, and enhancing the third audio signal on at least one of the at least two speakers and other features.

A method in another example embodiment includes sensing a gesture by a user on a user interface inside a vehicle, interpreting the gesture to correspond to a command for an on-board unit (OBU) of a vehicle, and sending controlling signals to an application associated with the user interface. More specific embodiments include various types of gestures and user interfaces.

Example Embodiments

Figure 1:
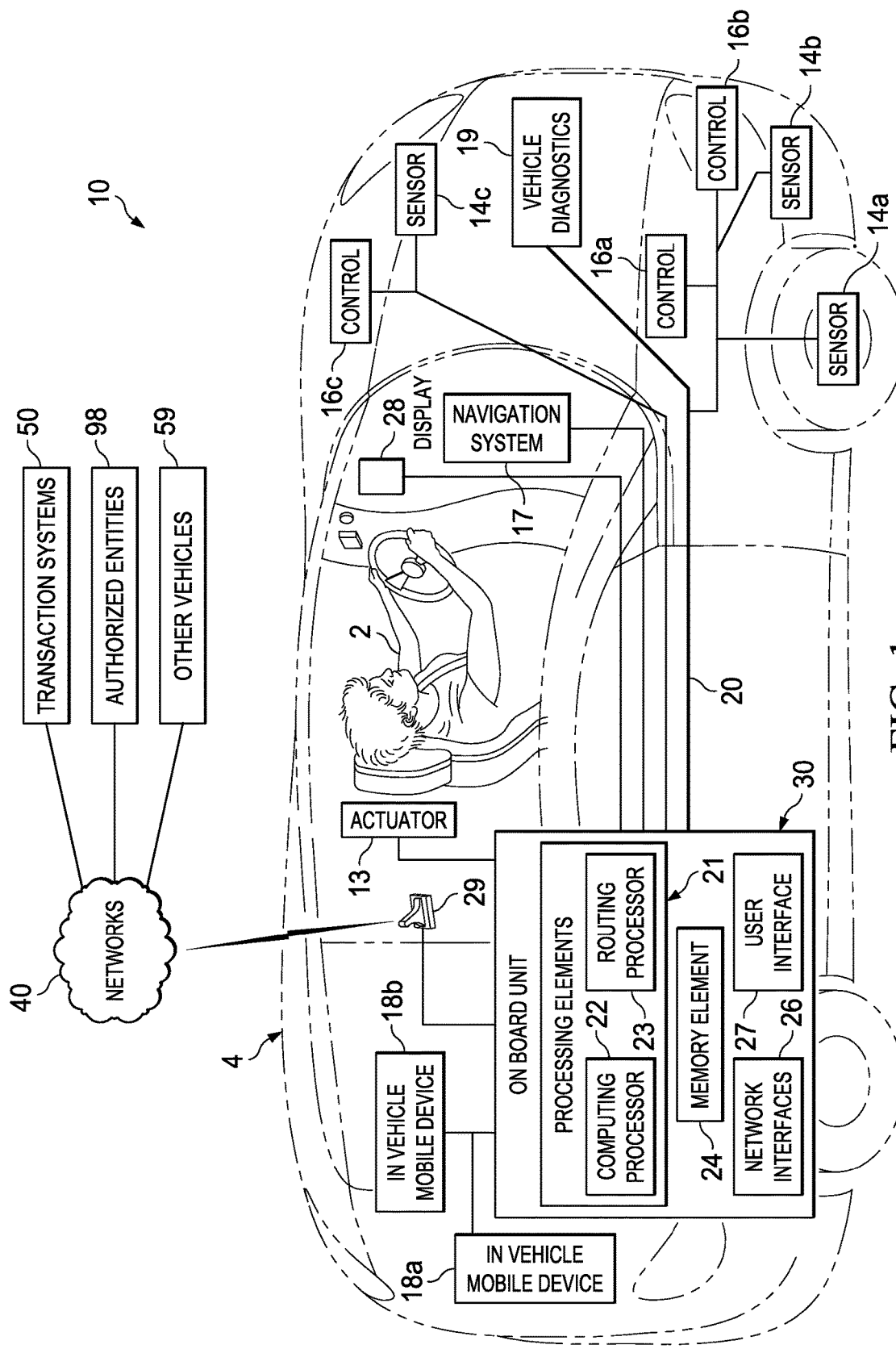
FIG. 1 is a simplified block diagram of one embodiment of a communication system in accordance with the present disclosure.

Turning to FIG. 1, FIG. 1 is a simplified block diagram of a communication system 10 for real-time synthesis and performance enhancement of audio/video data, and noise cancellation and gesture based user interfaces in a vehicular environment. The example architecture of FIG. 1 includes an end user (driver) 2 operating a vehicle 4 that includes an on-board unit (OBU) 30. In this particular example, OBU 30 includes processing elements 21, which include a computing processor 22 and a routing processor 23. OBU 30 also includes a memory element 24, network interfaces 26, a user interface 27, and a display 28. OBU 30 can be suitably coupled to a plurality of sensors 14a-c, a plurality of controls (e.g., electronic control units (ECUs)) 16a-c, and a plurality of actuators, such as actuator 13. In one example embodiment, sensors 14a-b and controls 16a-b may be part of an automotive diagnostic system, indicated by vehicle diagnostics 19, which may also be suitably integrated with OBU 30. OBU 30 may also be suitably coupled to various in-vehicle mobile devices 18a-b at any given time, where such devices may be associated with particular end users (passengers or driver) within vehicle 4. OBU 30 may also include capabilities associated with navigation system 17 (e.g., a global positioning system (GPS)).

FIG. 1 also includes networks 40, representing various types of connectivity to vehicle 4 (e.g., via antenna 29). Each established network of networks 40 has a logical coupling to remote nodes, which may include transaction systems 50, authorized entities 98, and other vehicles 59. A node may be any electronic device (e.g., machine device or a mobile device), client, server, peer, network element, service, application, or other object capable of sending, receiving, or forwarding information over communications channels in a network. A remote node may be any node located externally to a particular vehicle, such as vehicle 4. Examples of remote nodes include end user devices, mobile devices, electronic devices in networked systems (e.g., server in a datacenter, end user device in a local area network (LAN), etc.), OBUs of other vehicles, and road-side user devices. An end node as used herein, encompasses nodes that originate data packets in a network flow, and nodes that are the final destination of the data packets in the network flow. For example, sensor 14a and authorized entities 98 may be end nodes in a network flow, wherein sensor 14a originates data packets to send to authorized entities 98.

Elements of FIG. 1 may be coupled to one another through one or more interfaces (e.g., network interfaces 26) employing any suitable link (wired or wireless), which provides a viable pathway for electronic communications. Additionally, any one or more of these elements may be combined or removed from the architecture based on particular configuration needs. Communication system 10 may include a configuration capable of transmission control protocol/Internet protocol (TCP/IP) communications for the electronic transmission or reception of packets in a network. Communication system 10 may also operate in conjunction with a user datagram protocol/IP (UDP/IP) or any other suitable protocol, where appropriate and based on particular needs. In addition, communication system 10 may also include a configuration capable of accommodating legacy bus subsystems that may be employed to convey information across the myriad of machine devices (e.g., sensors 14*a-c*, controls 16*a-c*, actuator 13) in vehicle 4. A 'subsystem' as used herein is intended to encompass a network within a vehicle, where the network is a collection of nodes interconnected by communicative channels that facilitate electronic communications therebetween, in which the nodes are integrated with or otherwise linked to the vehicle.

Embodiments of communication system 10 can enable real-time synthesis and performance enhancement of audio/video data, and noise cancellation and gesture based user interface in a vehicular environment. Given the plethora of transaction agents (e.g., machine devices, humans, software agents, mobile devices, and authorized entities) and possible transactions (e.g., accessing one or more wireless/mobile/cellular networks and using network bandwidth and services, gaining access to various resources of the vehicle based on an identity profile and/or associated databases, gaining access to transaction applications in the vehicle, and engaging in commercial activities), numerous transaction scenarios may occur over the life of the vehicle. Such transaction scenarios may encompass, for example, toll or parking payments, vehicle miles traveled (VMT) systems, Internet commerce, original equipment manufacturer (OEM), gas and electric charging stations, roadside and/or drive-through kiosks, banking applications, vehicle dealer systems, location based service (LBS) system, vehicle system and its resources, mobile network operator system, travel agencies, rental and leasing agencies, network connection to Internet sites, vehicle-to-vehicle commerce, vehicle-to-mobile-device commerce, in-vehicle commerce systems, restaurants, commercial establishments, etc. Accordingly, it is important to have a flexible identity and access framework to ensure that appropriate transactions can be executed by different agents over time. A unified identity management framework enables aggregation and association of these agents and transactions.

Communication system 10 may include on-board unit (OBU) 30 that creates user profiles for each agent, grants appropriate levels of access, manages potential conflicts (e.g., by assigning priority to different agents), and provisions the appropriate wireless/mobile connectivity. The agent may be provisioned for authentication and access to a particular vehicle by provisioning at least one identity profile in OBU 30 of communication system 10. The identity profile may include user preferences such as priorities, most frequently visited Internet sites, gesture based actions, etc. The identity profile may also include associations between user gestures and specific transaction applications corresponding to the particular transactions. Finally, appropriate wireless/mobile connectivity may be dynamically determined by evaluating the transaction, the agent, the identity profile, and a current geographical location of the vehicle. Thus, vehicular transactions may be flexibly enabled by managing the identity of agents associated with transactions.

Certain terminologies are used with regard to the various embodiments of the present disclosure. The term 'road-side' as used herein is intended to mean outside of a vehicle and may or may not be physically located by a road. In addition, 'user device' as used herein is intended to include mobile devices, personal computers, electronic devices, and any other device, component, element, or object operable by a user and capable of initiating voice, audio, video, media, or data exchanges associated with communication system 10. The term 'road-side infrastructure device' as used herein includes a base station, access point, satellite, and any device capable of facilitating a voice, audio, video, media, or data exchanges between a user device or OBU and the Internet. As used herein, the term 'machine device' is meant to encompass sensors, actuators, vehicle controllers including ECUs, instruments, embedded devices, media devices, infotainment systems, vehicle navigation systems, displays, other peripheral or auxiliary devices or components, etc. Machine devices may be physically distributed across the vehicle in a vehicle subsystem, consolidated in any way, provisioned in proprietary configurations, or otherwise configured based on particular networking, vehicle, and/or end user needs. The term 'in-vehicle device' as used herein, encompasses machine devices and user devices located inside a vehicle. The term 'link' as used herein, encompasses a physical or logical communications channel that connects two or more communicating devices. The term 'channel' as used herein, encompasses a physical transmission medium, such as a wire, or a logical transmission medium, such as a radio channel. The term 'path' as used herein encompasses links and nodes connecting two end nodes in a network. Other terminologies are defined throughout the Specification.

For purposes of illustrating certain example techniques of communication system 10, it is important to understand the communications that may be traversing the network. The following foundational information may be viewed as a basis from which the present disclosure may be properly explained. Such information is offered earnestly for purposes of explanation only and, accordingly, should not be construed in any way to limit the broad scope of the present disclosure and its potential applications.

Many useful, but disparate, networks may exist in today's vehicles. For example, a controller-area network (CAN) bus, a geographical positioning system (GPS), and personal mobile devices (e.g., mobile phones, smart mobile phones/devices, e-book readers, tablets, laptops/net books, portable navigation systems, multimedia devices, etc.) facilitate the coexistence of some of the many possible networks within a single vehicle such as a personal automobile. A CAN bus is a vehicle bus standard designed to allow microcontrollers, sensors, and other devices associated with a vehicle to communicate with each other within the vehicle (e.g., without a host computer). CAN is a message based protocol, designed for and typically used by automotive applications. With appropriate network access, the CAN bus can be used to provide real-time vehicle diagnostics from associated sensors and controls to a manufacturer of the vehicle or to any other authorized entity. A separate network in the vehicle may exist for IP devices involved in the vehicle navigation system (e.g., GPS) and, possibly, another network associated with simple content delivery. Other networks could be used for Internet access for end users through, for example, mobile devices. Hence, various levels of network usage, different purposes of network usage, and different agents (e.g., humans, machine devices, external devices, mobile devices) associated with the network usage may occur in a single vehicle. Network usage in each of the identified cases may have a different usage scope, different latency, different associated routing, different policy requirements, and the like.

External networks may be accessed from a vehicle by certain electronic devices when a communication link is available. An 'external network' as used herein is intended to encompass a network that is external to a vehicle, where the network is a collection of nodes interconnected by communicative channels that facilitate electronic communications therebetween. Mobile devices such as, for example, mobile phones, smart mobile phones/devices, e-book readers, tablets, laptops/net books, portable navigation systems, multimedia devices, other handheld devices, etc. may be used within a vehicle to wirelessly access an external network, for making a cellular phone call, accessing the Internet via a mobile network operator, and accessing the Internet via a WiFi link to a road-side access point. A vehicle router in a vehicle may also be used to access a roadside infrastructure device within range of the vehicle. However, external network access from mobile devices and/or vehicle routers is dependent upon the particular wireless interfaces being within a wireless range of corresponding mobile or wireless network infrastructures. If the particular corresponding wireless infrastructure devices are not within a wireless range, or if the vehicle carrying the mobile devices and vehicle routers moves outside of the wireless range, then external network communication can be lost.

Vehicles may be equipped with vehicle navigation systems, for example, GPS. In-vehicle devices, such as cell phones and laptops, may also be equipped with vehicle navigation systems. In such vehicle navigation systems, information displayed on maps (and used for routing) is largely static. Many devices contain navigation data provided by the original manufacturer that cannot be changed, while other devices (such as Android phones) can connect to the Internet for information updates such as points-of-interest (POIs) and general traffic congestion data. While there is seemingly infinite information available on the Internet, the volume of information that is current and updated within a relatively small period of time is considerably small. Finding localized, transient geo-social information, for example, store specials and restaurant queues in a downtown area on a Tuesday at 11:00 AM, or the location and route of an advancing emergency vehicle, is still very difficult.

Additionally, even if some wireless communication links are available, they may not be desirable for extended use in a mobile vehicle. For example, pricing contracts with mobile network operators typically provide cellular coverage through the particular operator for a certain fee based on defined criteria. Example criteria may include tiered pricing on bandwidth usage over 3G/4G/WiFi/Satellite. However, due to capacity constraints, interference, multipath and other fading related issues in a moving vehicle, bandwidth availability may be limited. Additionally, failures in external networks may compromise bandwidth availability, leading to packet loss and congestion. Even if bandwidth is sufficiently available, a user may want to conserve and maximize the use of available bandwidth to reduce costs due to tiered pricing on bandwidth. Moreover, a user may access different types of traffic over wireless networks, for example, video, text, binary and audio data. When multiple streams of data containing audio and video are accessed by one or more users in a connected vehicle, such data streams may compete for the available limited bandwidth. Performance enhancements of the audio or video data streams in accordance with the embodiments disclosed herein may ensure high quality of the audio/video data streams even with limited bandwidth.

Video or audio streams transmitted over a wireless channel may experience degradation in quality because wireless channels are inherently noisy due to fading, multipath, and shadowing effects, which can result in a much higher bit error rate (BER) and consequently a low throughput. Many techniques exist to enhance performance of audio/video streams, for example, compressing and encoding video packets before transmission over the wireless channel. These techniques are implemented at the end nodes, and there is no participation by intermediate nodes not at a network level. For example, adaptive streaming has been used in Internet based video-platforms, where a receiver (i.e., an end node that is a final destination of data packets in a network flow) observes its local buffer status, and dynamically requests a sender (i.e., an end node that originates data packets in a network flow) for a suitable version of the encoded video stream, in the attempt to always match the available bottleneck bandwidth. The static adaptive streaming systems are generally designed for end nodes with relatively stable network connections (e.g., desktop computers, laptops on home wireless networks, etc.), wherein network conditions may be unlike the network conditions for connected vehicular environments with time-varying bandwidth, high packet loss rates, and highly varying round trip times. Moreover, various schemes exist for unequal error protection for voice or video packets based on their relative importance, or dispersing packets across multiple available links and/or paths. However, these schemes are typically applicable to semi-static scenarios without mobility. In contrast, connected vehicular environments may see highly variable network conditions.

In the connected vehicle environment discussed above, link quality may suffer even with a single wireless hop because of additional challenges due to high vehicle speeds, mobility, multiple access technologies, multiple path properties (e.g., for a single TCP connection) and highly dynamic bandwidth/latency scenarios, making it difficult to utilize available bandwidth and achieve reasonable performance. In addition, in the connected vehicle environment, different classes of traffic (based on various factors such as user profile, application priority, and policy settings) may compete for limited link resources and pose different Quality of Service (QoS) requirements. These classes of traffic originate from devices that may not be tuned to operate optimally in such challenging wireless conditions. Therefore, there is a need to optimize bandwidth usage by such devices, for example, by enhancing performance of high priority data streams without additional bandwidth usage.

Another aspect of a vehicular network environment includes multiple audio and video applications being used simultaneously in a vehicle. For example, the driver may listen to the radio, at the same time that a passenger in the backseat is engaging in a video conference. In such situations, the various sources of sound (and consequently noise) may interfere with each other, degrading voice quality of all applications inside the vehicle. Therefore, there is a need for performance enhancement of audio by applying noise cancellation techniques to vehicle subsystems.

In a vehicle that does not offer combined networking capabilities for various possible networks, each of the devices associated with a particular network (e.g., CAN bus sensors, mobile devices, GPS, etc.) may have a one-to-one mapping to either a human agent or to the vehicle. Network access is typically dictated by the human agent or vehicle mapped to the particular device. While some of these devices may be used by other human agents (e.g., another human agent borrows a cell phone, has account privileges on a laptop, borrows an automobile with a GPS, etc.) network access does not ordinarily accommodate the preferences of the new user. In some cases, a mobile router used to facilitate network access among various agents associated with a vehicle, could provide predetermined network access without regard to the particular agent or transaction.

In a vehicle that provides networking capabilities between entities inside the vehicle and the external world ("connected vehicle"), the amount of possible transactions and the changeability of agents associated with those transactions require a flexible framework to ensure appropriate network access. In a real-life scenario for a connected vehicle, multiple agents may use the vehicle and perform transactions on or via the vehicle over any given time period. Individual users such as, for example, an owner, a driver, a passenger, a temporary driver (e.g., borrower or renter), or a new owner of a used automobile, may use the vehicle as a personal computing and communication platform for navigational, recreational, and/or business-related purposes. A manufacturer of the vehicle may want to collect vehicle centric data from the vehicle and send firmware/software upgrades to the vehicle. Government entities may want to identify and locate the vehicle for law enforcement or government regulation (e.g., emissions controls) purposes. Vehicle dealers may want to obtain sensor data and other vehicle diagnostic information for maintenance updates and/or scheduling. Thus, a one-to-one exclusive mapping between an agent (e.g., a human or a device) and a connected vehicle does not exist.

In a contrasting example, a one-to-one mapping is typically provided between a mobile phone and a single user. In a mobile phone, credentials that bind the user and the device may be stored in a physical subscriber identity module (SIM) or provisioning module. Thus, if the mobile device is subsequently operated by a new user (e.g., someone borrowing the mobile phone), the credentials in the current SIM, associated with the original user, will be used to access a cellular network and to bill for the network access usage. Thus, the original user mapped to the mobile phone could be billed for any network usage fees incurred by the new user. In some cases involving the same service provider, the mobile phone can be provisioned with the new user's credentials by physically replacing the existing SIM hardware with a SIM of the new user. However, SIM swapping or identity reassignment across different service providers is often problematic or simply not feasible in a mobile phone.

In a connected vehicle, agents may change over any given period of time, and it may be impossible or impractical to physically switch a SIM in the vehicle or to make a trip to a service center each time a new agent needs network access to or from the vehicle. In one example, a manufacturer of an automobile may want to use a transaction application to collect real time data from sensors in the vehicle. If the automobile is manufactured in one country and shipped to another country (e.g., manufactured in Japan and shipped to the United States), then before the automobile is even purchased it would have traveled across international boundaries and multiple telecom service provider areas. Thus, if the manufacturer (i.e., the agent) provisions the automobile with credentials for a first service provider usable in the first country, the manufacturer may prefer a different service provider to be provisioned in the automobile once the automobile is shipped to another country.

Another example of possible agent changes in a vehicle includes owners, drivers, renters, and passengers of a vehicle. When an automobile is sold to a customer, the new owner needs access rights to various transactions (e.g., toll payments, gas and charging stations, Internet commerce, personal vehicle settings, etc.) provided by the vehicle. In addition, the new owner may need wireless access to networks and devices external to the vehicle using an appropriate service provider. These access rights may need to change each time the vehicle is driven by a different driver (e.g., another person in the owner's family, a current renter of a rental car, etc.). In addition, if the vehicle is sold again, a new owner and associated drivers and passengers also need access rights and the previously existing access rights need to be removed from the vehicle. Finally, multiple agents may want to access the vehicle concurrently, such as a driver and one or more passengers of the vehicle who desire access rights to at least some of the vehicle transactions. For example, a passenger may want to use an Internet commerce transaction to download music or videos, or the passenger may want to pay for transportation costs, such as toll expenses and/or gas and charging station expenses.

In a connected vehicle where OBU 30 hosts various applications (e.g., multimedia, collaboration, social, transportation, enterprise, original equipment manufacturer (OEM), dealers, consumer, navigation, public safety, and communications), one challenge is providing suitable user interfaces so that driver distraction is minimized. Statistics show that even a split second distraction such as typing short message service (SMS) text, dialing a phone, or watching a screen may cause fatal accidents. Similarly, elderly and disabled people may not be able to use some of the standard input-output interfaces available in a connected vehicle. Various touch-less user inputs may be available in vehicles. For example, voice interface is used to input alphanumerical information. However, reliability of such voice to text technology can be low, particularly for people with accents, due to various noise factors and the need for extensive voice processing. Moreover, disabled people who are unable to speak cannot use the system. Therefore, there is a need for user interfaces that aggregate multiple sources of input, for example, touch, gestures and voice, to provide a user interface that is simple to operate and that can minimize distractions inside vehicles. In addition, it may be advantageous to associate such a user interface with a suitable identity profile that matches agents with their unique gestures, touches, and commands. A system for real-time synthesis and performance enhancement of audio/video data, and noise cancellation and gesture-based user interface in a vehicular environment, outlined by FIG. 1, can resolve many of these issues.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

Turning to the infrastructure of FIG. 1, end user 2 can be associated with a human agent (e.g., a driver or passenger). End user 2 may initiate communication in communication system 10 via some network, and such communication may be initiated through any suitable device, inclusive of an in-vehicle mobile device 18a or 18b, display 28, and a navigation system 17, which could be integrated with infotainment system 15. Mobile devices, such as in-vehicle mobile devices 18a-b, are inclusive of mobile phones, smart mobile phones (smartphones), e-book readers, tablets, iPads, personal digital assistants (PDAs), laptops or electronic notebooks, portable navigation systems, multimedia gadgets (e.g., cameras, video and/or audio players, etc.), gaming systems, other handheld electronic devices, and any other device, component, element, or object capable of initiating voice, audio, video, media, or data exchanges within communication system 10. Data, as used herein in this specification, refers to any type of numeric, voice, video, or script data, or any type of source or object code, or any other suitable information in any appropriate format that may be communicated from one point to another in electronic devices and/or networks.

In-vehicle mobile devices 18a-b, and mobile devices external to vehicle 4, may communicate with OBU 30 of communication system 10 through any wireless or suitable wired link and may be configured as a personal area network (PAN) or a wireless personal area network (WPAN) or any other appropriate networking architecture or system that facilitates communications in a network environment. Wired and wireless communication links may be inclusive of any electronic link such as wireless technologies (e.g., Bluetooth, Zigbee, IEEE 802.11x, WiFi Direct, 60 GHz, ultra-wideband (UWB), etc.), a USB cable, an HDMI cable, etc. Connection between mobile devices and OBU 30 may be configured based on particular needs and logistics. In one example, an external mobile device may be connected to OBU 30 through a USB cable or wireless network when, for example, the external mobile device is a diagnostic tool used by a mechanic for servicing vehicle 4.

Networks 40 represent external networks, which can be a series of points or nodes of interconnected communication paths for receiving and transmitting packets of information that propagate through communication system 10. Networks 40 offer communicative interfaces between any of the components of FIG. 1 and remote nodes and other electronic devices of transaction systems 50, authorized entities 98, and other vehicles 59. In one embodiment, OBU 30 in vehicle 4 many communicate with other vehicles 59 over an ad hoc network. Such communication may be facilitated through corresponding OBUs in other vehicles 59. Networks 40 could be any local area network (LAN), wireless local area network (WLAN), wide area network (WAN), wireless wide area network (WWAN), metropolitan area network (MAN), wireless metropolitan area network (WMAN), wireless single hop or multi-hop vehicle-to-vehicle network, virtual private network (VPN), Intranet, Extranet, or any other appropriate architecture or system that facilitates communications in a network environment. Networks 40 may include any suitable communication link to OBU 30 such as wireless technologies (e.g., IEEE 802.11, 802.16, WiFi, WiMax, etc.), satellite, cellular technologies (e.g., 3G, 4G, etc.), etc., or any combination thereof. Networks 40 may also include configurations capable of transmission control protocol/Internet protocol (TCP/IP) communications, user datagram protocol/IP (UDP/IP), or any other suitable protocol, where appropriate and based on particular needs.

Embodiments of OBU 30 may include one or more distinct interfaces, represented by network interfaces 26, to facilitate communication via the various networks (including both internal and external networks) described herein. Such network interfaces 26 may be inclusive of multiple wireless interfaces (e.g., WiFi, WiMax, 3G, 4G, white space, 802.11x, satellite, Bluetooth, near field communication (NFC), LTE, GSM/WCDMA/HSPA, CDMA1x/EVDO, DSRC, GPS, etc.). Other interfaces represented by network interfaces 26, may include physical ports (e.g., Ethernet, USB, HDMI, etc.), interfaces for wired and wireless internal subsystems, and the like. Similarly, each of the nodes of communication system 10 can also include suitable interfaces for receiving, transmitting, and/or otherwise communicating data or information in a network environment.

OBU 30 and other associated or integrated components can include one or more memory elements (e.g., memory element 24) for storing information to be used in achieving operations associated with the wireless interface selection, seamless mobility, access control, and/or information flow control, as outlined herein. These devices may further keep information in any suitable memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory or storage options discussed herein should be construed as being encompassed within the broad term 'memory element' as used herein in this Specification.

In example embodiments, the operations as outlined herein may be implemented by logic encoded in one or more tangible media, which may be inclusive of non-transitory media (e.g., embedded logic provided in an ASIC, digital signal processor (DSP) instructions, software potentially inclusive of object code and source code to be executed by a processor or other similar machine, etc.). In some of these instances, one or more memory elements (e.g., memory element 24) can store data used for the operations described herein. This includes the memory elements being able to store software, logic, code, or processor instructions that are executed to carry out the activities described in this Specification.

Additionally, OBU 30 and associated or integrated components may include processing elements 21 (e.g., computing processor 22, routing processor 23, etc.) that can execute software or algorithms to perform activities to enable real-time synthesis and performance enhancement of audio/video data, noise cancellation, and gesture based user interfaces, and to route packets using suitable routing protocols. A processor can execute any type of instructions associated with the data to achieve the operations detailed herein in this Specification. In one example, the processors (as shown in various FIGURES) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, an EPROM, an EEPROM), or an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. Any of the potential processing elements, modules, microprocessors, digital signal processors (DSPs), and other devices described in this Specification should be construed as being encompassed within the broad term 'processor.' Regarding a physical implementation of OBU 30 and its associated components, any suitable permutation may be applied based on particular needs and requirements, including the design of the particular vehicle in which OBU 30 is implemented.

In example implementations, various components of OBU 30 may be installed in different physical areas of the vehicle or may be installed as single unit, with display 28 being positioned to allow driver access. Other displays may be provided in suitable locations for access by passengers in particular passenger seats. In one implementation, multimedia, networking, and communication components may be positioned at some distance from the vehicle engine (e.g., in or near the rear or trunk area if the engine is in the front area of the vehicle).

Communication system 10 may be configured to facilitate communication with machine devices (e.g., vehicle sensors, instruments, electronic control units (ECUs), embedded devices, actuators, etc.). OBU 30 may be implemented to provide one or more suitable communication interfaces (e.g., network interfaces 26) to legacy systems in vehicles such as, for example, a controller area network (CAN) a low speed network (LIN), a flexray communications protocol network, media oriented systems transport (MOST), and the like. Typically, multiple ECUs, with different embedded software, may be found in a single automobile and may communicate via a CAN bus. Sensors 14*a-b* may represent, for example, wheel and headlight sensors, respectively. Controls 16*a-b* may be inclusive of any embedded system or ECU that controls one or more of the electrical systems or subsystems in vehicle 4. Actuator 13 represents a vehicle-setting device such as, for example, a seat positioning device for adjusting various seat positions (e.g., longitudinal position relative to the brake and gas pedals, tilt position, lumbar support, etc.). Actuator 13 and other similar vehicle setting devices (e.g., temperature controls, sunroof, door locks, power windows, etc.) may be configured for communications in a LIN bus, in one embodiment. Sensor 14*c* represents a type of sensor or device that may be configured for communications via flexray communications protocol (e.g., a radar collision sensor). Control 16*c*, representing one or more ECUs, may be suitably integrated for controlling the flexray network and sensors and other associated components. Additionally, OBU 30 may be implemented to provide one or more suitable communication interfaces (e.g., network interfaces 26) to an Internet Protocol (IP) network, user datagram protocol (UDP) network, or any other suitable protocol or communication architecture provided to enable network communication with machine devices in vehicle 4.

In this particular example, vehicle 4 includes capabilities associated with navigation system 17 and vehicle diagnostics 19. Navigation system 17 may be provided in various embodiments including, for example, a portable navigation system or, alternatively, a fixed navigation system, each of which may be configured for wireless or wired communications to OBU 30. Other more specific machine devices, not shown in FIG. 1, may include display panel instruments, climate controls, interior lights, door locks, trunk open/shut actuator, hood open/shut actuator, seat heater and/or cooler, sunroof open/shut actuator, window heater/defroster/defogger, entertainment systems (e.g., speakers, radio, DVD, CD, etc.), and the like.

Figure 2:
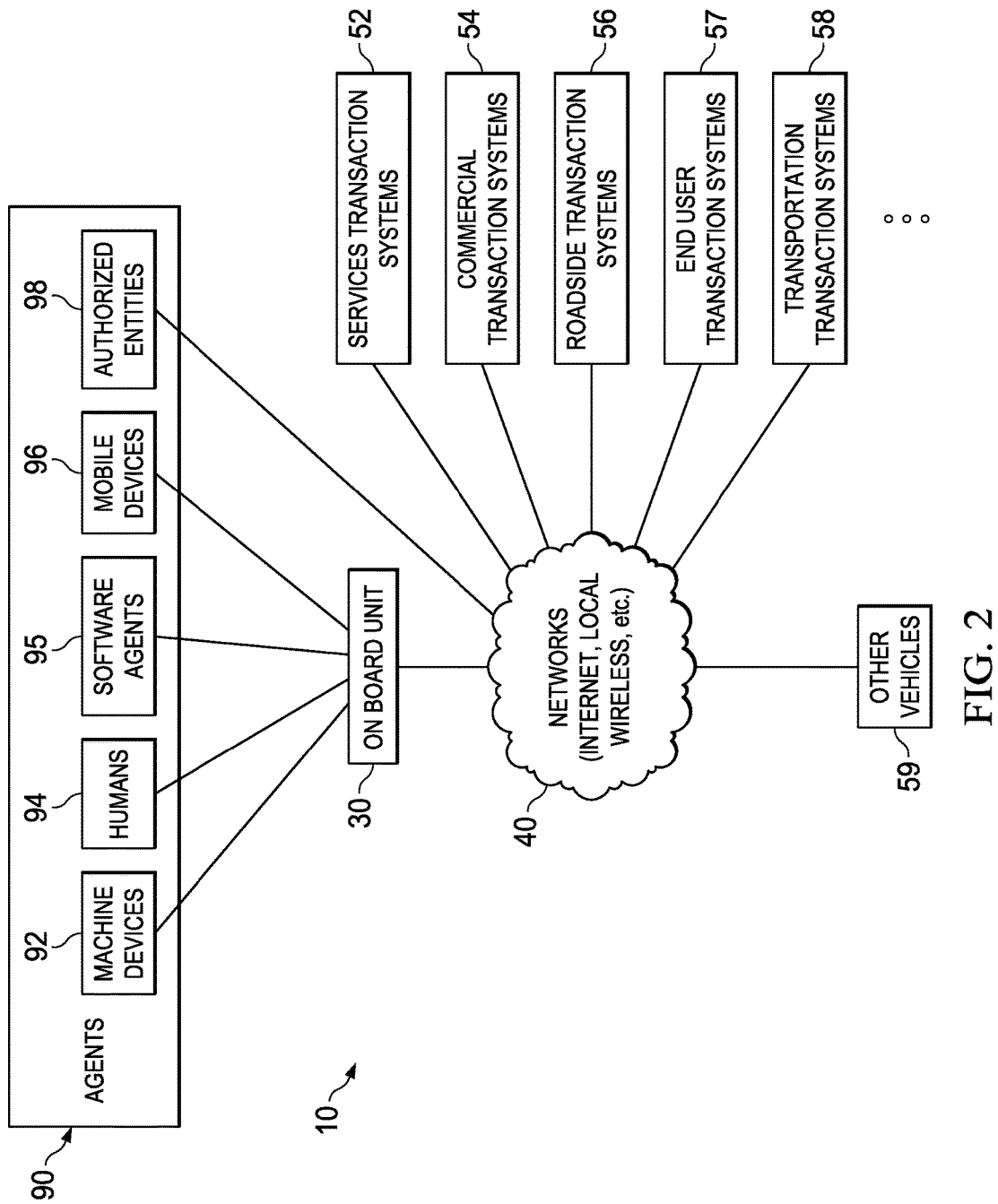
FIG. 2 is a simplified schematic diagram of the communication system in exemplary network environments associated with embodiments of the present disclosure.

Turning to FIG. 2, communication system 10 is illustrated with OBU 30 shown coupled to agents 90 and networks 40. As previously discussed herein, agents 90 can include machine devices 92, humans 94, and mobile devices 96. In addition, agents can also include software agents 95 and authorized entities 98. Software agents 95 can include any application or executable file comprising instructions that can be understood and processed on a computer, and provisioned in a memory element accessible to OBU 30 (e.g., memory element 24), and which may be initiated automatically in response to a particular set of criteria or conditions (e.g., every time network connectivity is detected on OBU 30, whenever OBU 30 is powered on and a particular time interval has passed, in response to another software agent, etc.).

Authorized entities 98 may include various entities having authorization to access a vehicle 4 such as, for example, a dealer of the vehicle, a manufacturer of the vehicle, OEMs associated with the vehicle, and public entities having an interest in the vehicle (e.g., State Departments of Transportation, local police departments, etc.). A node of such authorized entities will typically be remotely located from OBU 30 and, therefore, accessible from OBU 30 through networks 40 such as the Internet or other WANs and any available communication link (e.g., 3G, 4G, WiFi, WiMax, etc.) providing network access from OBU 30 to the Internet or other WAN. In some scenarios, however, OBU 30 may be locally accessible to an authorized entity such that Internet access is unnecessary. For example, when vehicle 4 is being manufactured and is located at one of the manufacturer's facilities, OBU 30 may be capable of accessing the manufacturer's network through a LAN or WLAN. Similarly, when a vehicle 4 is taken to a dealer for maintenance, the OBU 30 may connect to the dealer network through a communication link that does not include the Internet or any other wide area network.

Networks 40 may also facilitate communication between certain agents 90 (e.g., machine devices 92, humans 94, software agents 95, mobile devices 96) and transaction systems 50. By way of example, transaction systems 50 may include services transaction systems 52, commercial transaction systems 54, road-side transaction systems 56, end user transaction systems 57, and transportation transaction systems 58 on nodes or other electronic devices. Each of the transaction systems can be associated with many different types of entities and many different transaction scenarios. Services transaction systems 52 can encompass numerous entities providing services such as identity service providers, mobile wireless service providers, banks and other financial institutions, location-based services (LBS), travel agencies, vehicle rental and leasing agencies, Internet websites, etc. Commercial transaction systems 54 may include entities facilitating commercial transactions through the Internet (e.g., video and music download sites, online retailers, etc.), etc. Roadside transaction systems 56 may include various entities providing roadside services such as gas and electric charging stations, kiosks (both roadside and drive-through), etc. End user transaction systems 57 may include end user devices (e.g., mobile devices, laptops, personal computers, cellular telephones, etc.) for communication with OBU 30 through networks 40.

Transportation transaction systems 58 may include entities or devices facilitating vehicle charging transactions related to toll payments, ferry charges, bridge toll payments, parking, Vehicle Miles Traveled (VMT), and any other transportation costs incurred as a result of moving vehicle 4 from one location to another. All of the transaction systems 50 (e.g., transaction systems 52, 54, 56, 57, 58) as categorized, are provided for purposes of illustration and ease of understanding, and it will be appreciated that certain entities may logically be included in multiple transaction systems (e.g., a bank could be described as both a services transaction system and a commercial transaction system) and that numerous types of transaction systems and entities other than those enumerated herein may also be possible.

Other commercial transactions may occur through OBU 30 by accessing other vehicles 59 (vehicle-to-vehicle commerce). An available network represented by networks 40, may provide a communicative pathway between vehicle 4 and other vehicles 59, where vehicle 4 includes OBU 30 and other vehicles 59 include a suitable communication device (e.g., mobile device, OBU or similar device). The communicative pathway (i.e., path) between vehicle 4 and other vehicles 59 could be established as a single hop or multi-hop vehicle-to-vehicle network through WiFi, WiMax, or any other suitable wireless technologies allowing a sustained connection between vehicle 4 and other vehicles 59.

Commercial transactions could occur between a mobile device in one vehicle (connected to an OBU) and an OBU in another vehicle, between mobile devices in separate vehicles with OBUs, or between OBUs of separate vehicles. Commercial transactions may also be conducted between OBU 30 and mobile devices 96 (vehicle-to-mobile device commerce), such as when a mobile device purchases content from OBU 30 of the same vehicle. Another type of commercial transaction can include in-vehicle commerce in which a user of a mobile device pays for the use of resources through OBU 30 (e.g., in the case of a passenger in a commercial vehicle such as a taxi cab) or when mobile devices within a vehicle use the network available through OBU 30 to conduct commercial transactions with each other. In addition to commercial transactions, these communicative pathways involving vehicles and mobile devices may also be established for any other suitable services or transactions, providing proper authentication and network credentials are obtained.

Applications installed on OBU 30 can be considered transaction applications and can include a plethora of user-level and system-level applications. With proper authentication to OBU 30 and authorization, numerous types of transactions using the transaction applications may be performed through OBU 30. Generally, types of transactions are inclusive of 1) accessing one or more wireless/mobile/cellular networks and using network bandwidth and services, 2) gaining access to various resources of the vehicle, 3) gaining access to applications in the vehicle, and 4) engaging in commercial activities (e.g., paying for receiving goods or services, or receiving payment for selling goods or services).

Figure 3:
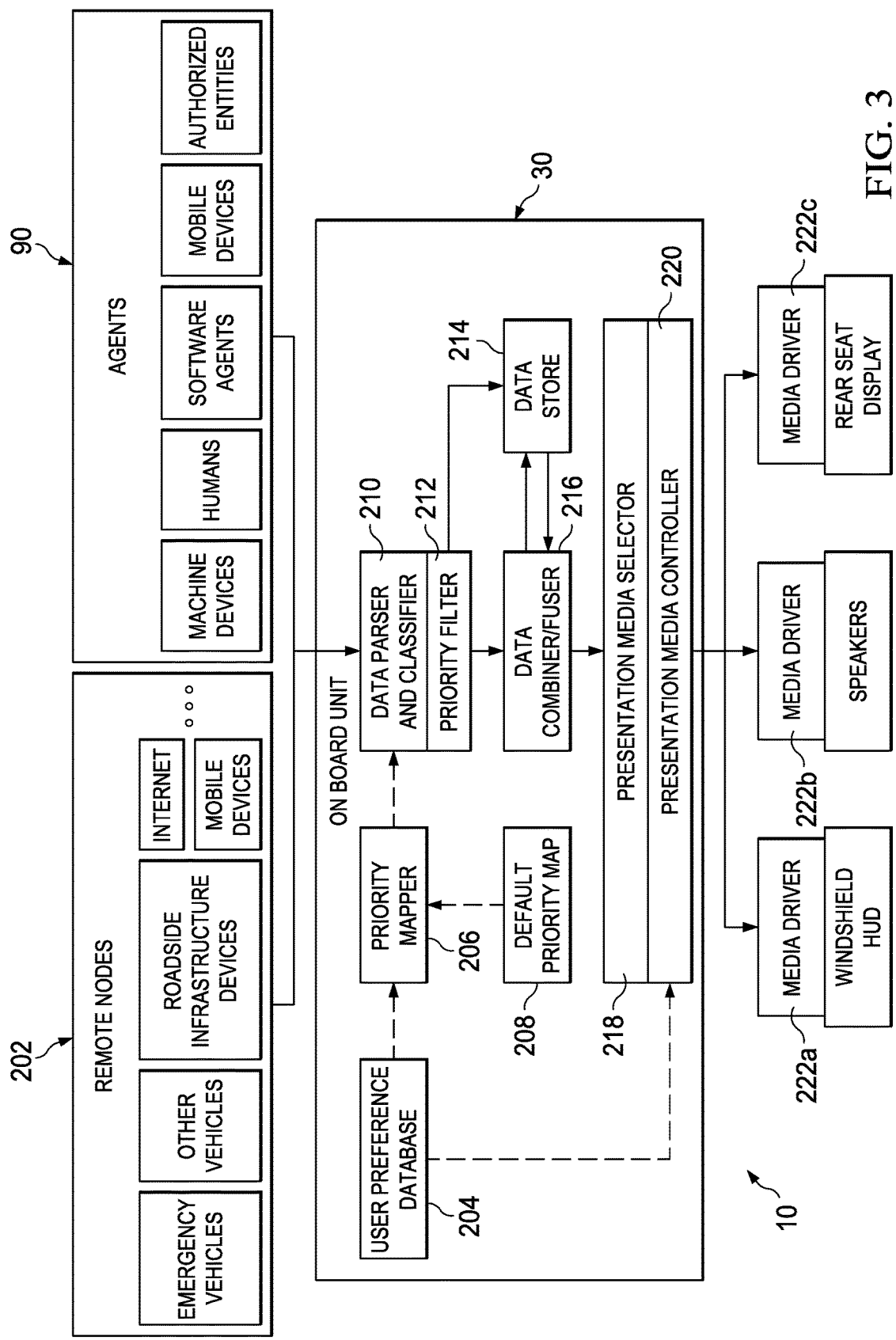
FIG. 3 is a simplified block diagram of the communication system according to embodiments of the present disclosure.

Turning to FIG. 3, FIG. 3 illustrates a simplified block diagram of a communication system 10 according to embodiments of the present disclosure. Communication system 10 may leverage OBU 30 and inter-vehicle routing protocols to supplement cloud data (i.e., data located via Internet, Enterprise and other clouds) with live, local and transient data collected from other vehicles and nearby locations. The ability to communicate directly with peers can also create opportunities for sharing and storing localized geosocial information in vehicular clouds and/or local roadside infrastructure devices. Given the potentially large amount of cloud and local data, OBU 30 can prioritize this information, possibly taking into account a user's preferences, and may express the information to the user via suitable user interfaces.

Disparate sources of information may be filtered through OBU 30 and presented to users (e.g., user 2) in appropriate formats, possibly based on user preferences and pre-specified priority levels. For example, emergency alert data (ambulance, police, accident prevention, etc.) may be categorized as high priority information and preempt other data. These alerts may be largely event triggered (e.g., upon detecting an ambulance coming towards the vehicle). Further, priority levels are also possible with collision avoidance, for example, being a higher priority than other events. Other user and sensor-generated alerts related to non-critical aspects, for example, a vehicle condition, may take a lower priority after emergency alerts. Such alerts may include information about broken taillights, potholes, accidents, etc.

Presentation of alerts can be customized for each user. For a majority of users, auditory signals with different levels of urgency may be appropriate. For other users, visual cues or haptic feedback may be more appropriate. Further, OBU 30 can minimize driver distraction by suppressing, if needed, any other forms of data display during emergency alerts.

Aside from emergency and vehicle alert data, a user may actively search content or may have content pushed to OBU 30. Relevancy of such data may be assessed based on various factors, including user preferences, proximity, timeliness, and/or relevance to other users seeking the same information in the same geographical neighborhood. OBU 30 may filter all incoming data and present such information to users in the vehicle based on user-specified interface formats.

In FIG. 3, various geo-social information sources such as remote nodes 202, for example, emergency vehicles, other vehicles, roadside infrastructure devices, Internet, etc., may send a data packet containing information to OBU 30. For example, an emergency vehicle may send traffic alerts to OBU 30 with information regarding its location and speed. The data packet containing the alert data may also contain information regarding the data packet size, format, and origin and destination addresses.

Similarly, various agents 90, such as machine devices, and software agents, may also be information sources, sending data containing information to OBU 30. For example, a sensor in the vehicle may send an alert to OBU 30 when tire pressure is low. Additionally, remote nodes may send data containing information to OBU. For example, a mobile device operating externally to vehicle 4 (e.g., a mobile device in another vehicle traveling behind vehicle 4) may send data informing OBU 30 of broken brake lights. In one embodiment, remote nodes 202 may be external to the vehicle, and agents 90 may be in-vehicle devices. Data received from multiple sources, for example, remote nodes 202 and in-vehicle agents 90, may compete for resources on OBU 30. Data received from such sources may be presented to a user 2 in a manner conveying an appropriate level of importance or criticality assigned to the message, while minimizing distraction to the user.

OBU 30 can include various control modules and data processing modules including a user preference database module 204 to process the information contained in the data. User preference database module 204 may provide configurability and customizability to a user regarding various user preferences, for example preferences regarding a data type, a data format and a medium through which the user receives the data. As used herein, 'medium' encompasses channels and tools used to deliver data, including by electronic and physical means, for example, video displays, speakers, and mechanical vibrators. User preference database module 204 may provide an interface to the user through which the user can set the various user preferences. User preference database module 204 can also allow the user to determine a medium through which the user likes to receive different types of data, for example, through audio or mechanical, such as alerts through steering wheel vibrations. Apart from setting static preferences, user preference database module 204 can also allow the user to change the various user preferences dynamically. For example, if the user wants to find advertisements for a shoe sale in a particular locality, the user can set a preference that may be used by a priority mapper module 206 to increase the importance of any relevant data related to shoe sales in the particular locality.

Priority mapper module 206 can create a mapping from the received data types to priority levels associated with the data types based on the various user preferences stored in user preference database module 204. In one embodiment, the priority level of a data type indicates the priority to be given to data associated with that data type when processing multiple data. Priority mapper module 206 may use a default priority map from a default priority mapper module 208 as a reference and modify any preset priorities in default priority mapper module 208 using the user preferences from user preference database module 204. Default priority mapper module 208 may store a preset mapping of different data types with corresponding priority levels. For example, traffic alerts may be set to a priority of 1, 1 being the highest priority, and advertisements may be set to a priority of 10, 10 being the lowest priority. In some cases, priority mapper module 206 may not change default priority levels set by default priority mapper module 208. For example, the user may not be able to change a priority level assigned to entertainment information over a relative priority level assigned to safety alerts.

The priority mapping information from priority mapper module 206 may be sent to a data parser and classifier module 210. Data parser and classifier module 210 can receive raw data from geosocial information sources, can process the data, and can extract certain information using predefined rules. For example, different sources may produce the same information in different formats, such as text and audio. Data parser and classifier module 210 can convert the various formats in which the data is received to a standard format usable by the various control modules and data processing modules of OBU 30. Data parser and classifier module 210 may determine data formats based on various rules, for example, data arriving at a specific port may be assigned a specific format, and data from a particular application may be assigned a different format.

Data parser and classifier module 210 can tag the information with a suitable priority level using a priority mapping created by priority mapper module 206. Tagged data from data parser and classifier module 210 may be sent to a priority filter module 212, which can read priority tags on the data and place the data into different priority queues. The priority queues can, for example, be numbered 1 through 10, 1 referring to the data containing the most important information such as safety alerts; and 10 referring to the data containing the least important information such as advertisements. Priority filter module 212 can also reorder data within the queues to ensure temporal integrity of the data (e.g., data within each queue is ordered based on the time of its generation).

When priority filter module 212 receives data containing information that may not be immediately relevant or presented to the user, priority filter module 212 may store the data in a data store module 214. For example, priority filter module 212 may receive unimportant advertisement information at the same time that it receives an important traffic alert. It may be dangerous to present the advertisement to the user before the traffic alert. Therefore, priority filter module 212 may store the data containing advertisement information in data store module 214, while presenting the traffic alert information to the user. In another embodiment, priority filter module 212 may receive an important traffic alert that may have higher priority than the stored data in the priority queue. Therefore, priority filter module 212 may move a lower priority data from the priority queue to the data store module 214 and place the higher priority traffic alert in the priority queue. Additionally, data store module 214 may help alleviate congestion of a potentially large volume of information generated by the information sources and received by the OBU.

In another example, priority filter module 212 may store data containing information that is not immediately needed by the user, but which may be important in the future, such as information about rain 20 miles ahead on a freeway. In that case, priority filter module 212 may put the data containing the information about rain in data store module 214 instead of in the priority queues. When the information about rain becomes relevant, data store module 214 can insert the data containing the information about rain back into the priority queues for further processing. Data store module 214 can also serve as a repository for data, wherein all or part of the data received by the data store module 214 can be stored permanently for later reference based on user instructions.

In the embodiment according to FIG. 3, it is possible that OBU 30 may receive the same information from multiple information sources, due to the wide variety and large number of potential information sources. For example, an emergency vehicle in upstream traffic may cause vehicles ten blocks ahead to slow down. Cars proximate the emergency vehicle may send a traffic alert about the emergency vehicle to OBU 30. Meanwhile, speed sensors in a vehicle five blocks ahead may detect traffic congestion caused by the emergency vehicle and relay the traffic congestion information to OBU 30. When information from both these sources is received by OBU 30, priority filter module 212 may assign different priorities to the traffic alert and the traffic congestion information. For example, the traffic alert may receive a higher priority than the congestion information. Nevertheless, both the traffic alert and the traffic congestion information indicate the same event. In such case, a data combiner/fuser module 216 may enable only one of the information in the multiple data to be displayed to the user. Data combiner/fuser module 216 can analyze information in the data in the priority queue based on related information types and can estimate whether the information is indicative of the same event. Data combiner/fuser module 216 may either delete the redundant information, or combine the information to produce an alert with more information.

Each type of information in the data can be presented to the user in multiple ways. For example, a traffic alert can be shown on a windshield heads-up display (HUD) or a front display, or played out on an audio system. Information requested by a backseat passenger may be shown on a backseat display or provided through a backseat audio system. A presentation media selector module 218 can determine the best method to present the available information. In one embodiment, the determination may be based on predefined algorithms that can be tuned by user preferences.

For example, a user may prefer to get all messages over the audio system while another user may prefer to get the information via the HUD. In another example, the priority level may determine the presentation. Thus, a high priority traffic alert may be presented via steering vibration, and a low priority advertisement may be played simultaneously on the audio at low volume.

Even after a presentation medium is selected, there may be a need to switch the medium dynamically. For example, an advertisement may be played over the audio system when there are no other competing alerts or sounds presented to the user. However, if a high priority traffic alert is received at the same time that the advertisement is being played out, the traffic alert may be prioritized over the advertisement and can be played out over the audio system.

A presentation media controller module 220 can handle multiple streams of data containing information with differing priorities simultaneously, and can seamlessly transfer the data to a suitable medium, temporarily delay the presentation of the data, end the presentation of the data, or perform any suitable combination thereof. In the example described above, the data containing advertisement information could be transferred to a front display, and the data containing traffic alert information could be transferred to a steering vibrator. Media driver modules 222a-c may be coupled to OBU 30 and can directly control each presentation medium to convert information received into a format for presentation by the corresponding medium. For example, media driver 222a controls windshield HUD, and can convert a traffic alert information into a format accessible by the windshield HUD. Media driver 222b on the other hand, may convert the same traffic alert information into a different format that is accessible by speakers. Media driver 222c may convert the same traffic alert information into yet another format accessible by a rear seat display.

Thus, according to various embodiments of the present disclosure, the various control modules and data processing modules in OBU 30 may cause improved emergency response. For example, emergency responders (e.g., ambulances, fire trucks, and police units) can broadcast an emergency signal that contains the live GPS location of the emergency responder as well as routing information from the emergency responder's navigation system. This information can propagate through multiple OBUs in traffic as each vehicle receives it and rebroadcasts it to other nearby vehicles. Thus, for each driver in the affected area (e.g., geographic locations close to the emergency responder), a live display of the emergency responder's location may appear on the respective vehicle's GPS system. In addition, if vehicle navigation systems are active (for example, if map and routing information can be updated in real time), the navigation systems may automatically reroute a vehicle, or multiple vehicles, out of a path of the emergency responder. Moreover, such information could enable drivers of the vehicles to adjust their driving behavior to better accommodate the emergency responder.

Embodiments according to FIG. 3 may also cause reduced traffic congestion. For example, a vehicle may be travelling abnormally slowly (for example, moving at 10 mph on a freeway with a speed limit of 70 mph). Such slow moving traffic information can be broadcasted by nearby vehicle OBUs and propagated through traffic. Vehicles heading into such congestion may receive this information and the vehicles' respective navigation systems may automatically reroute the vehicles around the congestion, resulting in traffic easing up around the slow moving vehicles as downstream traffic is rerouted.

In yet another example embodiment, more efficient use of time and space may be achieved. For example, a downtown parking lot or garage in a crowded city may experience congestion caused by vehicles searching for an open parking space. A parking lot or garage computer may sense the congestion and broadcast open space information to vehicle OBUs. For example, the computer may cause the driver to be alerted that the parking lot is full, and provide information about a location of the nearest alternative parking lot. An example embodiment according to FIG. 3 may also affect information relay between vehicles in motion. For example, a user may send a maintenance alert via OBUs to the driver of a vehicle ahead, of broken brake lights, without needing a phone number or other identity information.

The embodiment according to FIG. 3 may support location aware advertising. For example, OBUs may be able to communicate with restaurant computers (e.g., location-specific information broadcast from the restaurant) in a nearby locality and determine restaurant specials, deals, and queues. Other systems in the vehicle can piggyback on the transient network created and maintained by OBU 30 to provide more entertaining experiences for the passengers in the vehicle. For example, a handheld video game console can provide social interactions or game play between players in different vehicles, without having to implement the handheld video game console's own protocols or use high powered communications radios. The handheld video game may rely on OBUs inside the vehicles to maintain network connectivity among the vehicles (e.g., an ad hoc network) and provide a communications medium. Similarly, a variety of other applications may use the OBU's network as a platform for providing an enhanced entertainment experience inside the vehicle.

Thus, OBU 30 can create a local network between nearby vehicles. The local network enables an applications layer that can be used by various applications to enhance user experience inside the vehicle. A large amount of highly transient, locally specific information may be easily and efficiently accessed by drivers without resorting to a store/fetch model of a cloud based network. Such access to highly transient, locally specific information may be enabled by mesh networks created and destroyed dynamically by OBU 30 and sensory data captured from vehicles and vehicle occupants. OBU 30 may act as a synthesizer, combining large-scale information from the cloud (like directions and point of interest (POI) searches) with locally acquired information, and selectively filtering the information to provide the most relevant data to the driver in a prioritized and minimally distracting fashion, as may be determined by the importance and criticality of the information.

Figure 4:
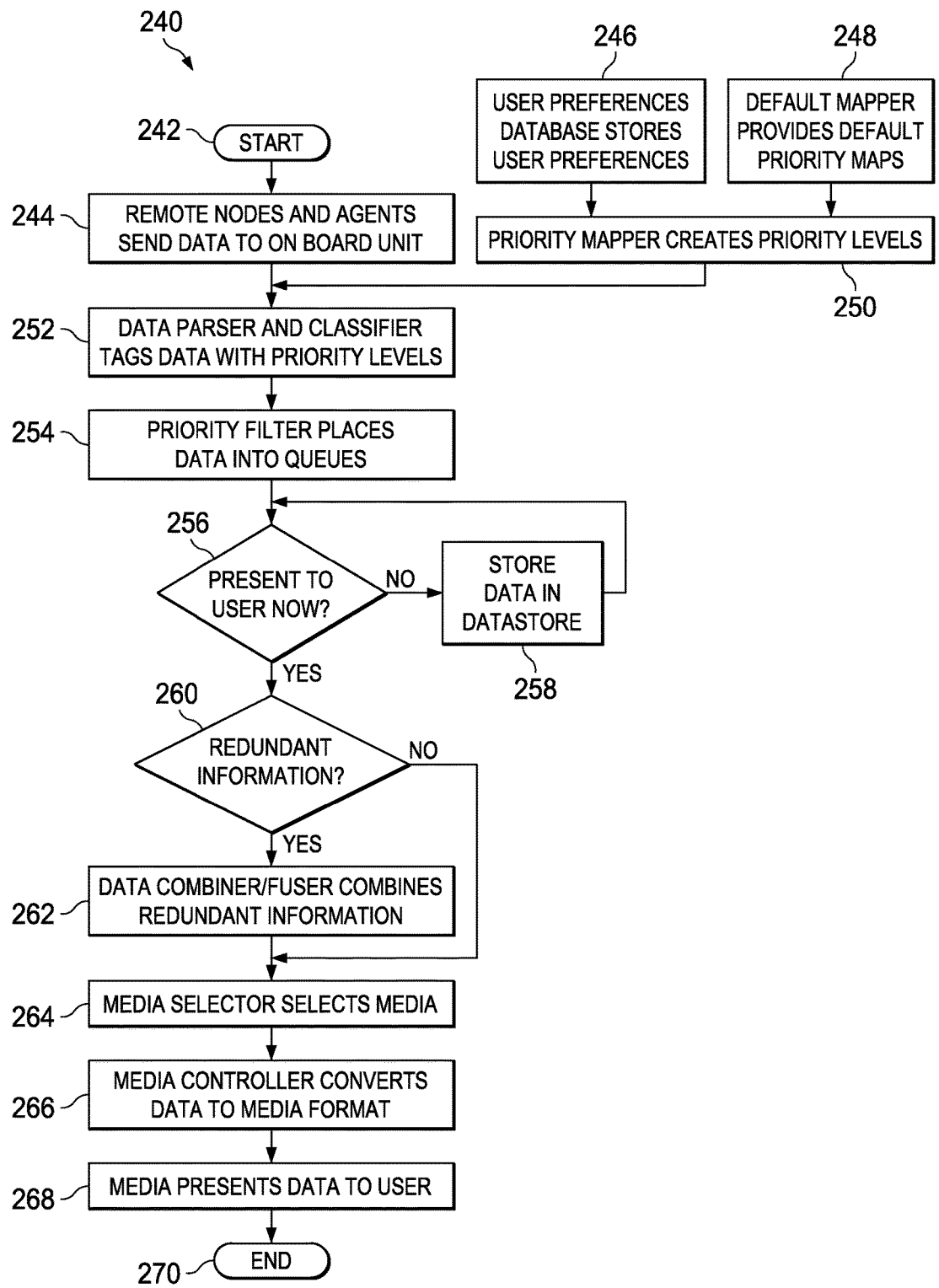
FIG. 4 is a simplified flow chart illustrating example operations that may be associated with a method for real time synthesis of data according to embodiments of the present disclosure.

Turning to FIG. 4, FIG. 4 is a flow-chart illustrating example operational steps of a method 240 for real time synthesis of data according to an embodiment of the present disclosure. The method starts in step 242. In step 244, remote nodes 202 and/or agents 90 send data to OBU 30. Various user preferences about data formats, priority, and other criteria can be stored in user preference database module 204 in step 246. Default priority maps can be created and stored in default priority mapper module 208 in step 248. Priority mapper module 206 may create priority levels for various data based on default priority maps and user preferences in step 250. In one embodiment, if user 2 does not set preferences for priority levels, priority mapper module 206 may assign priority levels based on default priority maps from default priority mapper module 208. In another embodiment, user preferences from user preference database module 204 may be used to set priority levels by priority mapper module 206.

Data parser and classifier module 210 tags the data from remote nodes 202 and/or agents 90 with priority levels from priority mapper module 206 in step 252. Priority filter module 212 places the data in priority queues in step 254. In step 256, priority filter module 212 makes a decision to present the data to the user. In example embodiments, the decision may be based on information contained in the data, user preferences, proximity, timeliness, and/or relevance to other users seeking the same information in the same geographical neighborhood, priority level and other considerations. If the data is not presented to the user as determined in step 256, the data is stored in data store module 214 in step 258. The data in data store module 214 may be periodically checked to determine whether it may be presented to the user.

If the data may be presented to the user, data/combiner fuser module 216 determines whether the data in the priority queue contains redundant or duplicate information in step 260. If the data in the priority queue contains redundant information, data combiner/fuser module 216 combines redundant information or eliminates duplicate information in step 262. Data is sent to presentation media selector module 218 that selects a presentation medium in step 264. Presentation media controller module 220 converts the data to a media format in step 266 and the data is presented to the user via the selected media in step 268. The method terminates in step 272. Thus, OBU 30 can present data containing diverse information from multiple sources to the driver in a minimally distracting and preferred way.

Figure 5:
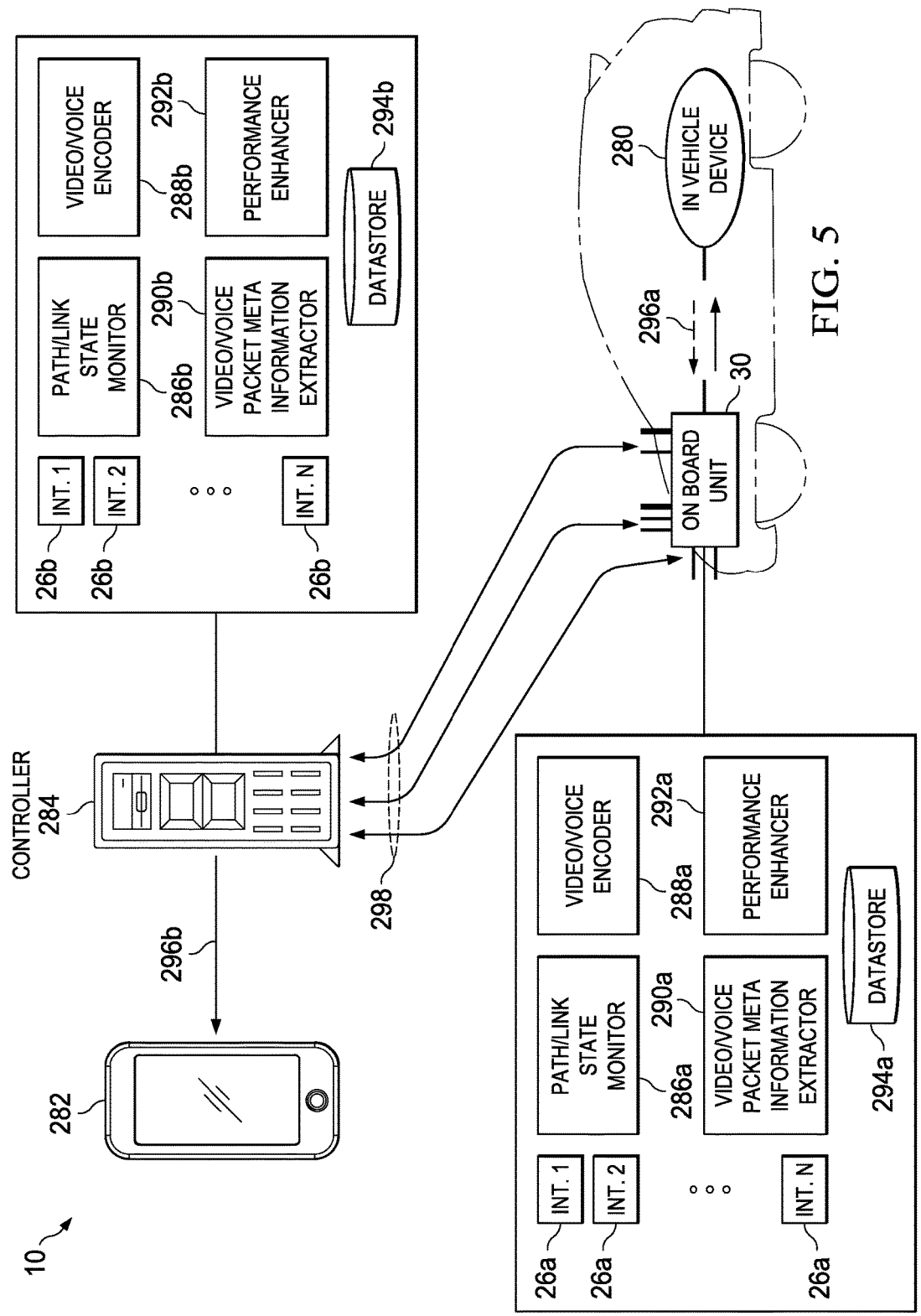
FIG. 5 is a simplified block diagram illustrating additional details of the communication system according to embodiments of the present disclosure.

Turning to FIG. 5, FIG. 5 is a simplified schematic diagram of an exemplary communication system 10 for performance enhancement of Voice over IP (VoIP) and video streams in accordance with embodiments of the present disclosure. In one example network session, OBU 30 in vehicle 4 may be in communication with end nodes operating within vehicle 4 and externally to vehicle 4, in addition to other possible intermediate remote nodes. In the example shown in FIG. 5, one end node may include an in-vehicle device 280 and another end node may include corresponding end node 282. The network session may be established through one or more remote nodes such as a network controller 284. OBU 30 may connect to the Internet via multiple wireless interfaces (e.g., 3G, WiFi, WiMax) while providing various voice and video services to in-vehicle device 280 (e.g., built-in music and movie players, laptops, smart phones, etc.). In accordance with embodiments disclosed herein, network controller 284 can perform various network functions, including ID/location mapping, shaping, proxy, etc. Furthermore network controller 284 can be implemented in a centralized or distributed manner in a network cloud.

OBU 30 may be in communication with in-vehicle device 280 via link 296*a*, which may be wired or wireless. Examples of wired links include Ethernet, Controller Area Network (CAN) buses, Local Internet Network (LIN) buses, and Media Oriented System Transport (MOST) buses. Examples of wireless links include IEEE 802.11, 802.16, WiFi, Bluetooth, and WiMax. Network controller 284 may be in communication with remote node 282 via link 296*b*, which may be a wireless link such as WiMax, 3G, or 4G. OBU 30 and network controller 284 may communicate with each other via multiple wireless links 298, including WiFi, WiMax, 3G, 4G, 802.11x, satellite, Bluetooth, near field communication (NFC), LTE, GSM/WCDMA/HSPA, CDMA1x/EVDO, DSRC, GPS, etc. Each link may traverse a distinct path. For example, data packets on a WiFi link may be sent directly from OBU 30 to a wireless access point and then to network controller 284. On the other hand, data packets on a 3G link may be transmitted via satellite to network controller 284.

Each of OBU 30 and controller 284 are coupled to a path/link state monitor 286*a-b*, video/voice encoder 288*a-b*, video/voice packet meta information extractor 290*a-b*, and performance enhancer 292*a-b*, one or more of which may be used, alone or in combination, for performance enhancement of incoming voice and video traffic. Each of OBU 30 and controller 284 may also be equipped with multiple network interfaces 26*a-b* such as network interfaces 1, 2 to n corresponding to multiple wireless links (and/or paths) 298. Each of OBU 30 and controller 284 may also be coupled to a storage device, for example, data store 294*a-b* that is adapted to store information such as link quality and path statistics.

By way of example for illustrating an operation of communication system 10, in-vehicle device 280 in vehicle 4 may be a phone transmitting voice to corresponding end node 282, which may be another phone. One or more of multiple wireless links 298 may experience poor link quality during the voice transmission as the vehicle moves. For example, a WiFi link may experience poor link quality relative to 3G and GSM/WCDMA/HSPA links. Therefore, OBU 30 may use one or more of path/link state monitor 286*a*, video/voice encoder 288*a*, video/voice packet meta information extractor 290*a*, and performance enhancer 292*a* to transmit the voice via wireless links that experience better link quality, for example 3G and GSM/WCDMA/HSPA. However, selecting links with the best link quality may be difficult when sending the same information across multiple interfaces with potentially completely different paths.

It will be appreciated that although the example has been described above in a situation where OBU 30 receives the voice traffic from in-vehicle device 280, the method is applicable to situations where network controller 284 receives voice traffic from corresponding end node 282. Controller 284 may use one or more of path/link state monitor 286*b*, video/voice encoder 288*b*, video/voice packet meta information extractor 290*b*, and performance enhancer 292*b* to enhance the voice traffic to OBU 30 despite poor link quality on one or more wireless links 298.

Figure 6:
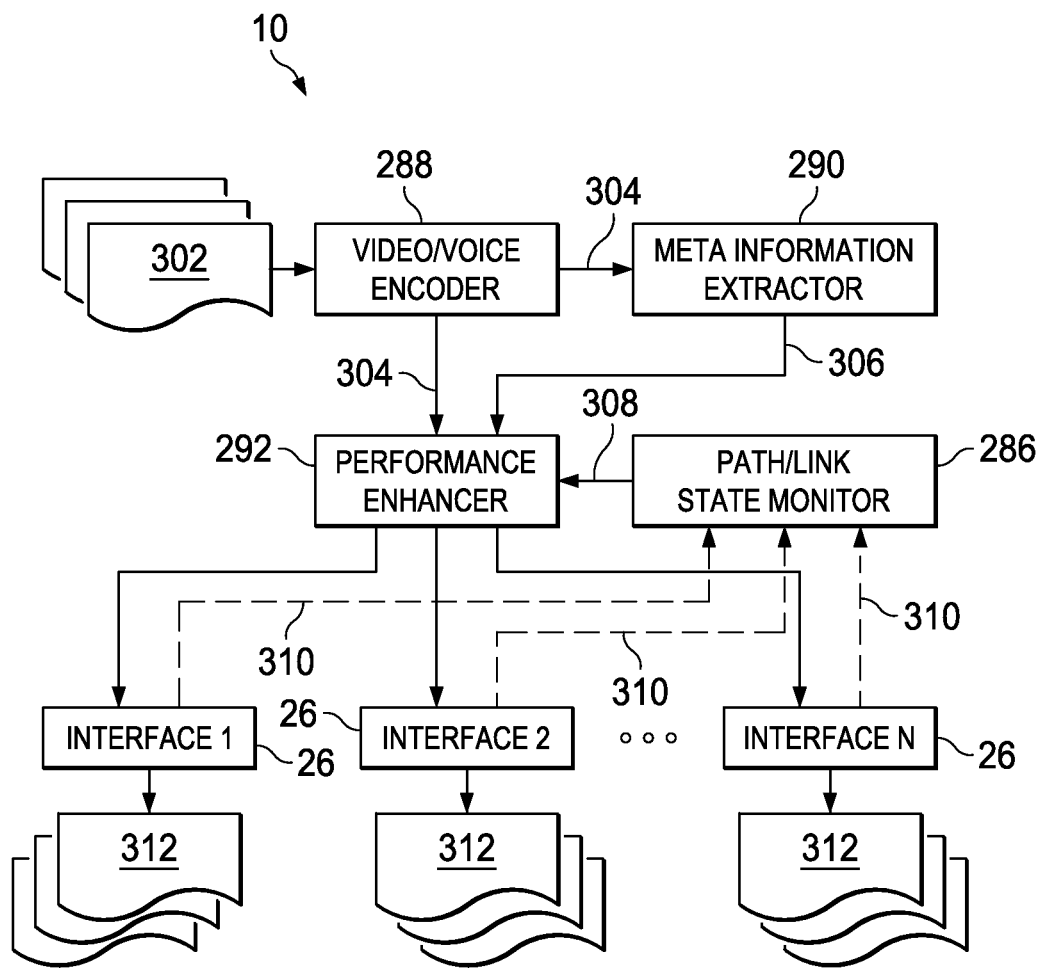
FIG. 6 is a simplified block diagram of potential components in the communication system according to embodiments of the present disclosure.

Turning to FIG. 6, FIG. 6 is a simplified block diagram illustrating a communication system 10 for performance enhancement of VoIP and video streams, according to embodiments of the present disclosure. Video/voice encoder 288 may convert incoming raw video/voice stream 302 into compressed and encoded media packets 304. As used herein, the term 'voice' encompasses all types of audio, including speech, noise, ambient sound, nature sounds, musical instruments (with or without vocals), etc.). In an example embodiment, video/voice encoder 288 may reside on an end node, for example a phone inside a vehicle. In another example embodiment, video/voice encoder 288 may reside on OBU 30. For example, if a vehicle is equipped with a video conferencing system, video/voice encoder 288 may be embedded in OBU 30 inside the vehicle. Video/voice encoder 288 may compress video/voice stream 302 to reduce a number of bits used to represent a video/voice sequence in video/voice stream 302, for example, by exploiting both temporal and spatial redundancy. Video/voice encoder 288 may also minimize any losses on decoded video quality, for example, by encoding the video/voice sequence in video/voice stream 302 in an error resilient way.

Compressed and encoded media packets 304 may be sent to video/voice packet meta information extractor 290 and performance enhancer 292. Meta information extractor 290 generates meta information 306 about compressed and encoded video/voice packets 304. Meta information 306 may include bit depth, packet size, priority, distortion contribution, and decoding deadline. Meta information 306 may be sent to the performance enhancer 292.

Path/link state monitor 288 can obtain path/link statistics 308 from dynamic online measurements 310 of various path and link characteristics of links 298, such as round trip time (RTT) over each path, available bandwidth over each path and packet loss ratio over each wireless link from various interfaces 26 (referred to individually and collectively herein as interface 26 or interfaces 26, respectively), for example interfaces 1, 2, . . . n. Path/link statistics 308 may be updated periodically to track time-varying conditions of wireless links (and/or paths) 298. Path/link state monitor 286 can feed path/link statistics 308 to performance enhancer 292. Performance enhancer 292 may use path/link statistics 308 and meta information 306 to perform various optimization procedures on compressed and encoded video packets 304 to create enhanced media streams 312 (referred to individually and collectively herein as media stream 312 or media streams 312, respectively) including: 1) optimal media-aware rate calculation; 2) retransmission limit selection for each media packet; 3) channel coding for error protection across multiple links (and/or paths); and 4) optimal path assignment for individual media packets. Performance enhancer 292 may transmit enhanced media streams 312 across one or more interfaces 26.

Figure 7:
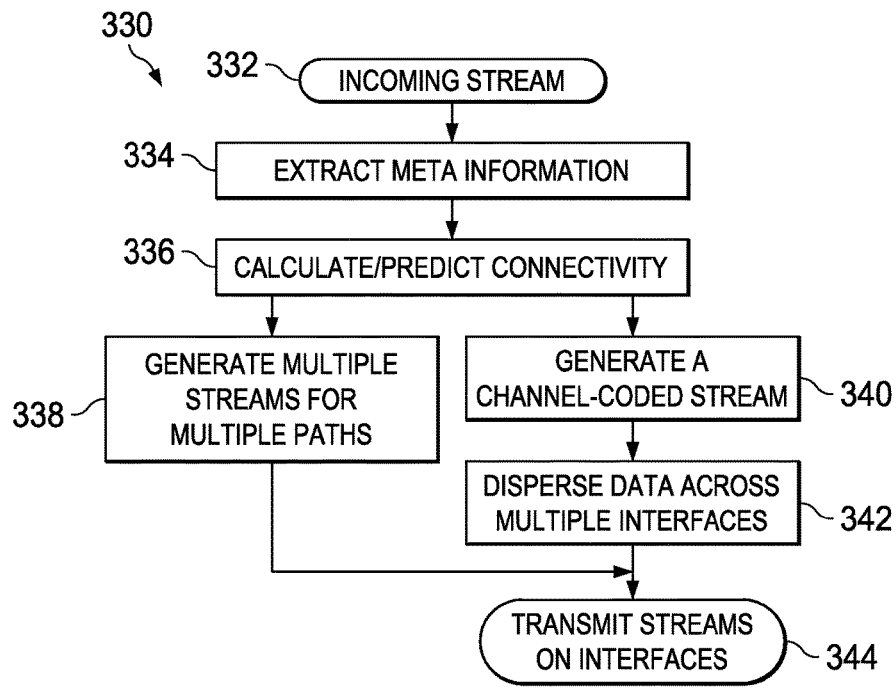
FIG. 7 is a simplified flow chart illustrating example operations that may be associated with a method for performance enhancement of data according to embodiments of the present disclosure.

Turning to FIG. 7, FIG. 7 illustrates a flow-chart with example operational steps for a method 330 associated with performance enhancement of voice and video streams according to embodiments of the present disclosure. Voice/video stream 302 is incoming in step 332. Meta information 306 is extracted from stream 302 by meta information extractor 290 in step 334. Connectivity of transmission interfaces 26 is calculated and/or predicted by performance enhancer 292 in step 336. Performance enhancer 292 can generate media streams 312 for multiple links (and/or paths) 298 in step 338. Generating multiple media streams 312 may be based at least on matching data transfer rate of each media stream 312 to available bandwidth across the corresponding interface. In an example embodiment, streaming media quality, for example, voice quality of VoIP calls, and resolution and frame rate of streamed video contents may be matched to available overall throughput (e.g., bandwidth) of wireless links 298 before transmitting the data. In another example embodiment, total available bandwidth of wireless links 298 may be allocated across multiple media streams 312 based on media characteristics of individual media streams 312 to enhance user experience.

Alternatively, performance enhancer 292 may generate a channel-coded stream in step 340. Channel coding may enable media streams 312 to be transmitted and received with minimal errors. In one example embodiment, coded (e.g., redundant) bits may be added to generate the channel coded stream. In another example embodiment, block codes may be added to generate the channel-coded stream (e.g., redundant bits may be added to one end of a block of data). Performance enhancer 292 may disperse the channel-coded stream into media streams 312 across multiple interfaces in step 342 based at least on matching data transfer rate of each media stream 312 to available bandwidth across the corresponding interface. In an example embodiment, media packets and coded error protection packets may be dispersed over multiple links (and/or paths) to achieve more robust error protection. In another example embodiment, error protection levels of different media streams 312 may be differentiated based on a relative importance of each media packet in the media stream 312 and a wireless channel condition of a link 298 over which media streams 312 are transmitted. Media streams 312 are transmitted across multiple interfaces 26 in step 344.

Figure 8:
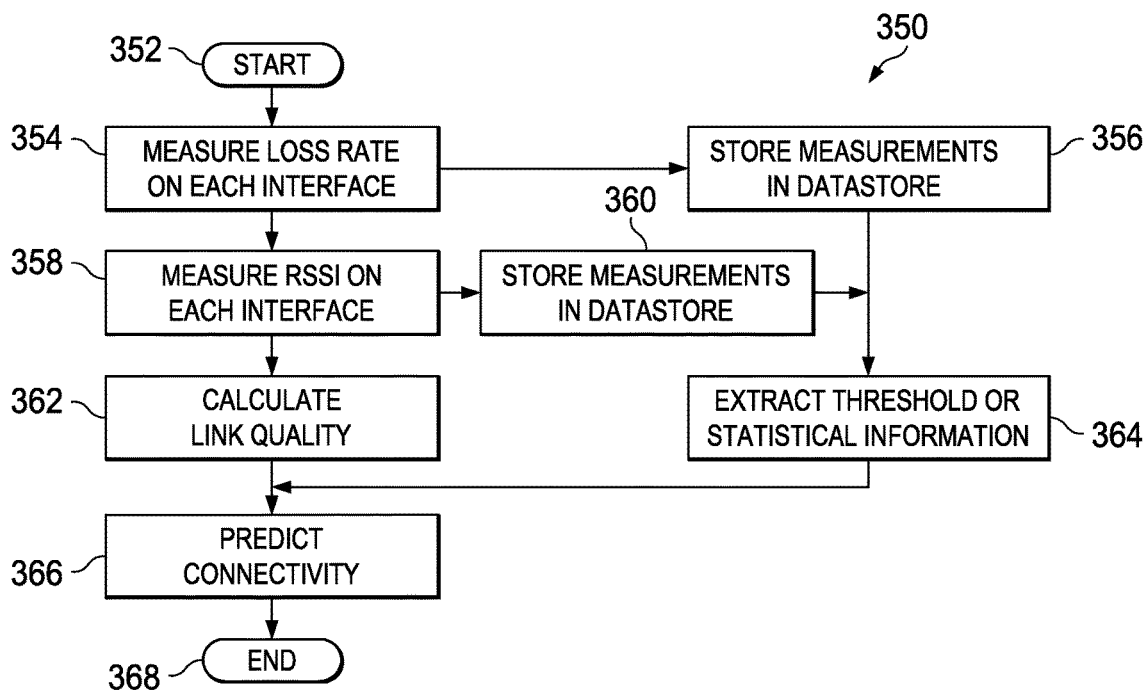
FIG. 8 is a simplified flow chart illustrating further example operations that may be associated with a method for performance enhancement of data according to embodiments of the present disclosure.

Turning to FIG. 8, FIG. 8 is a flow-chart illustrating example operational steps for a method 350 associated with calculating and/or predicting connectivity of an interface. Method 350 starts in step 352. Loss rate of each interface 26 is measured by path/link state monitor 286 in step 354 and the loss rate is stored in data store 294 in step 356. Received signal strength indication (RSSI) on each interface 26 is measured by path/link state monitor 286 in step 358 and stored in data store 294 in step 360. RSSI measurement on interface 26 may indicate a power in a signal on interface 26. If the RSSI measurement of interface 26 is below a certain threshold, a packet of information can be sent on interface 26. RSSI measurements may also be used in statistical analysis to determine connectivity empirically. In step 362, link quality is measured by path/link state monitor 286 on each interface 26 using well-known formulae, for example, as a ratio of arrived packets to expected packets. Threshold values of RSSI, RSSI measurements, statistical parameters and loss rate measurements may be extracted by performance enhancer 292 from data store 294 in step 364. In step 366, connectivity can be predicted by performance enhancer 292 based on link quality and information extracted from data store 294. The method ends in step 368.

Figure 9:
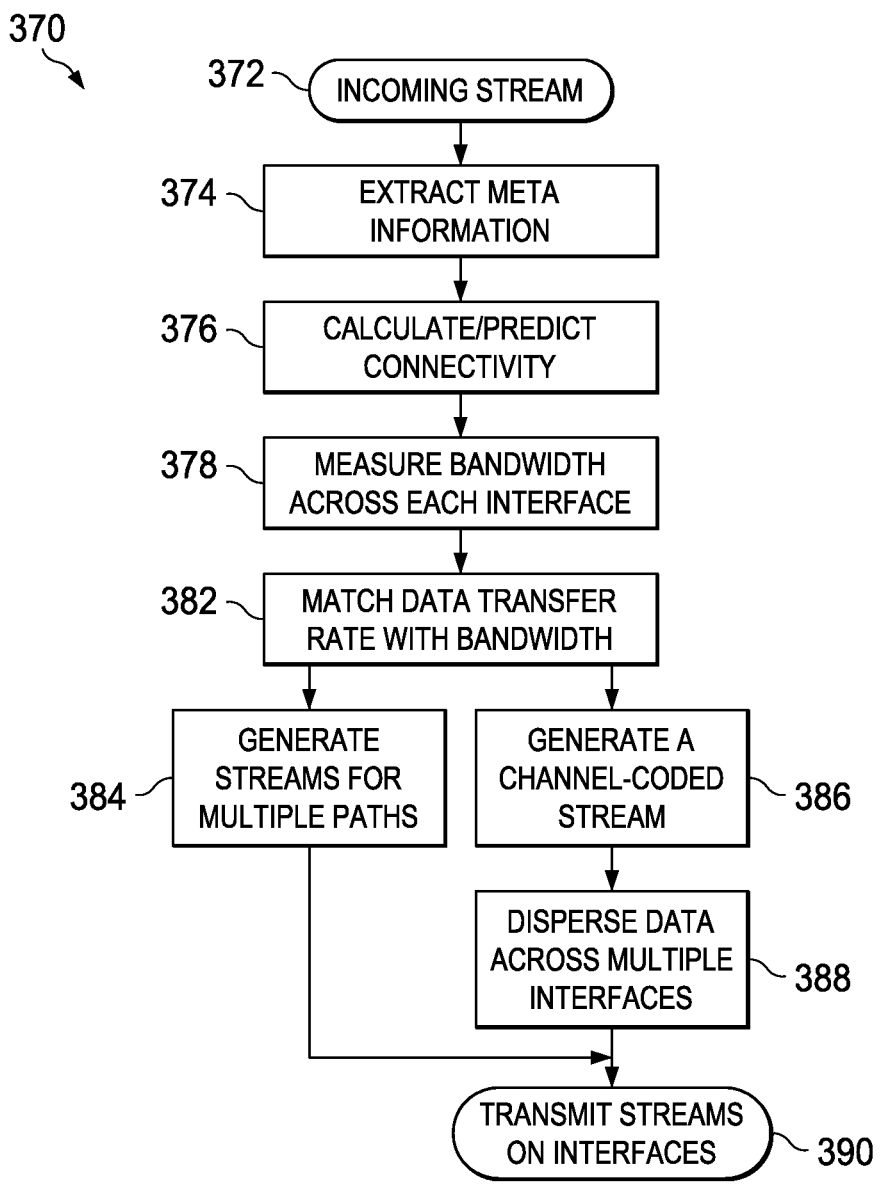
FIG. 9 is a simplified flow chart illustrating example operations that may be associated with a method for performance enhancement of data according to another embodiment of the present disclosure.

Turning to FIG. 9, FIG. 9 is a flow-chart illustrating example operational steps that may be associated with a method 370 for dynamically matching overall stream source rate with total available bandwidth over multiple wireless links according to an embodiment of the present disclosure. Using one or more optimization procedures, OBU 30 may adaptively change a data transfer rate of encoded video packets 304 based on network conditions and corresponding interfaces, and performance requirements of VoIP and video stream 302. Method 370 may adapt the data transfer rate of media stream 312 on each link 298 based at least on an available bandwidth across a corresponding interface. Thus, for multiple media streams 312 competing for limited bandwidth across multiple links 298, data transfer rate calculation according to an example embodiment may allocate different data transfer rates for different media streams 312 dynamically. In addition, a streaming media quality (e.g., voice quality of VoIP calls, resolution and frame rate of streamed video contents) may be matched to available overall throughput (e.g., bandwidth) of wireless links 298.

In FIG. 9, voice/video stream 302 is incoming in step 372. Meta information 306 is extracted from voice/video stream 302 in step 374. Connectivity of transmission interfaces 26 is calculated and/or predicted by performance enhancer 292 in step 376. Traffic rate distributed over each path may be monitored by path/link state monitor 286 to determine whether a bandwidth limit of the path is being exceeded by measuring bandwidth across each interface 26 in step 378 and measuring traffic rate on each available link in step 380. Bandwidth across each interface 26 may be measured by various techniques (e.g., by online end-to-end bandwidth measurement for each link, using a lightweight packet probing method of periodically transmitting a train of packets, etc.) to estimate the available bandwidth over a given path.

Performance enhancer 292 may calculate a data transfer rate across each interface by matching data transfer rate to available bandwidth across the interface in step 382 by rate adaptation techniques, for example, stream source rate adaptation. Data transfer rate matching to available bandwidth may also ensure that total available bandwidth is matched with an overall data transfer rate for all media streams 312. For example, transcoding, scalable encoding, packet pruning, or bitstream switching may be applied to media streams 312 to dynamically tune each media stream's data transfer rate and corresponding quality. For audio, enhancement-layer packets may be dropped from an incoming scalable voice/video stream 302. In an example embodiment, when both audio and video streams are present in an application such as video conferencing, full quality and data transfer rate of the audio stream may be preserved, while adapting data transfer rate of the video stream based on available residual bandwidth.

Performance enhancer 292 may generate media streams 312 for multiple links (and/or paths) 298 in step 384 based at least on matching data transfer rate of each media stream 312 to available bandwidth across the corresponding interface. Alternatively, performance enhancer 292 may generate a channel-coded stream in step 386 and disperse the channel-coded stream into media streams 312 across multiple interfaces in step 388 based at least on matching the data transfer rate of each media stream 312 to available bandwidth across the corresponding interface. Media streams 312 may be transmitted across multiple interfaces 26 in step 390.

Figure 10:
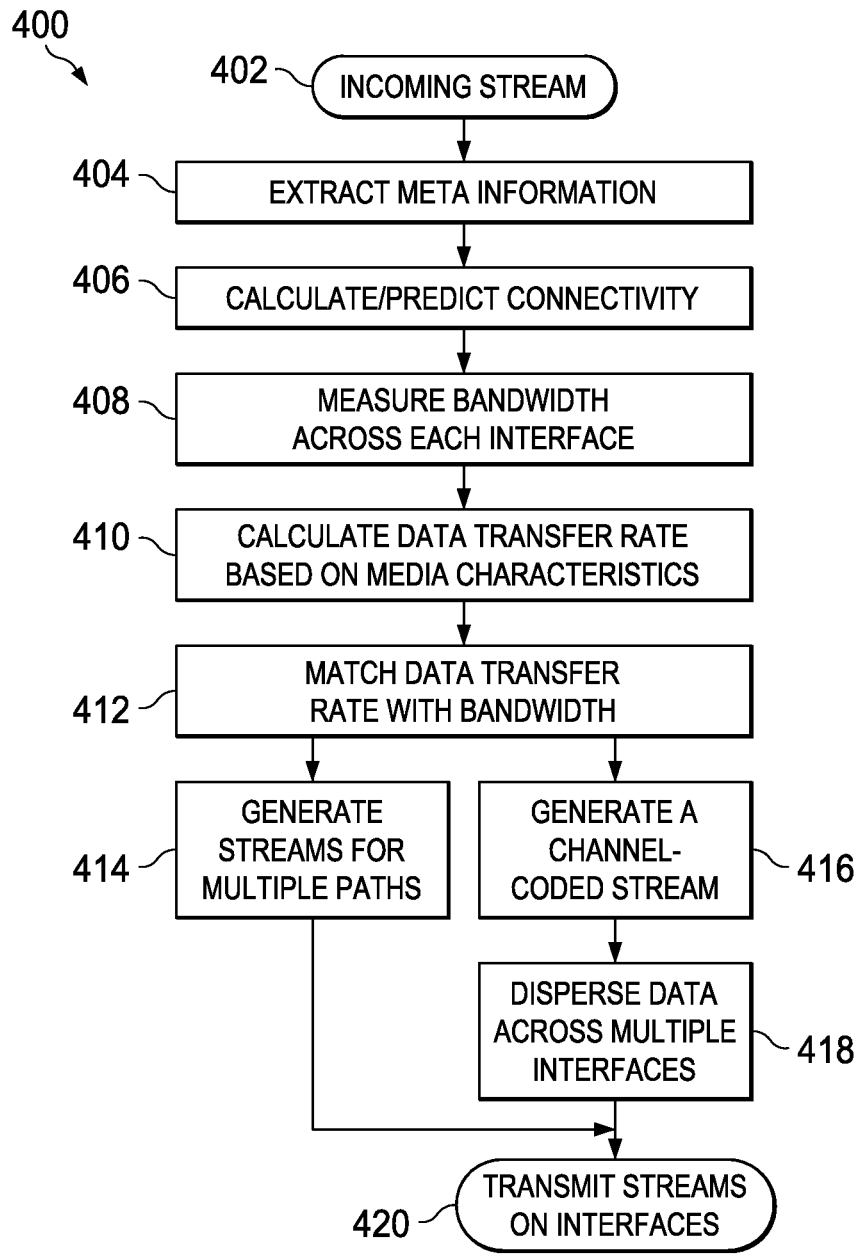
FIG. 10 is a simplified flow chart illustrating example operations that may be associated with a method for performance enhancement of data according to yet another embodiment of the present disclosure.

Turning to FIG. 10, FIG. 10 shows a flow-chart illustrating example operational steps that may be associated with a method 400 for enhancing traffic of multiple media streams 312 according to an embodiment of the present disclosure. When multiple media streams 312 share a common wireless bottleneck link, bandwidth may be allocated among them according to their media characteristics instead of conventional fair-rate allocation. For example, when a media stream 312 showing highly dynamic scenes from a motion movie competes against a head-and-shoulder news clip destined for a mobile phone, higher data transfer rate may be allocated for the former stream to maintain its basic quality.

In FIG. 10, voice/video stream 302 is incoming in step 402. Meta information is extracted from voice/video stream 302 by meta information extractor 290 in step 404. Connectivity of transmission interfaces is calculated and/or predicted by performance enhancer 292 in step 406. In step 408, bandwidth across each interface is measured by path/link state monitor 286 to estimate the available bandwidth over a given path. Data transfer rate across each interface may be calculated by media aware rate allocation in step 410 based on several alternative media characteristics (i.e., media-aware criteria), including criteria to minimize the weighted sum of distortion of all participating media streams 312 across all interfaces and maintain equal quality of all participating media streams 312. Quality metrics or media-aware criteria can either be objective, e.g., commonly adopted measurements based on peak-signal-to-noise-ratio (PSNR), or subjective, based on extensive prior study of user preference for various artifacts in a decoded video content. Thus, the data transfer rate allocated to each media stream 312 may depend on its media characteristic, the receiver display size, as well a total bottleneck bandwidth shared by all media streams 312. Performance enhancer 292 may calculate data transfer rate across each interface by matching data transfer rate to available bandwidth in step 412.

Performance enhancer 292 can generate media streams 312 for multiple links (and/or paths) 298 in step 414 based at least on matching data transfer rate of each media stream 312 to available bandwidth across the corresponding interface. Alternatively, performance enhancer 292 may generate a channel-coded stream in step 416 and disperse the channel-coded stream into media streams 312 across multiple interfaces in step 418 based at least on matching data transfer rate of each media stream 312 to available bandwidth across the corresponding interface. Media streams 312 are transmitted across multiple interfaces in step 420.

Figure 11:
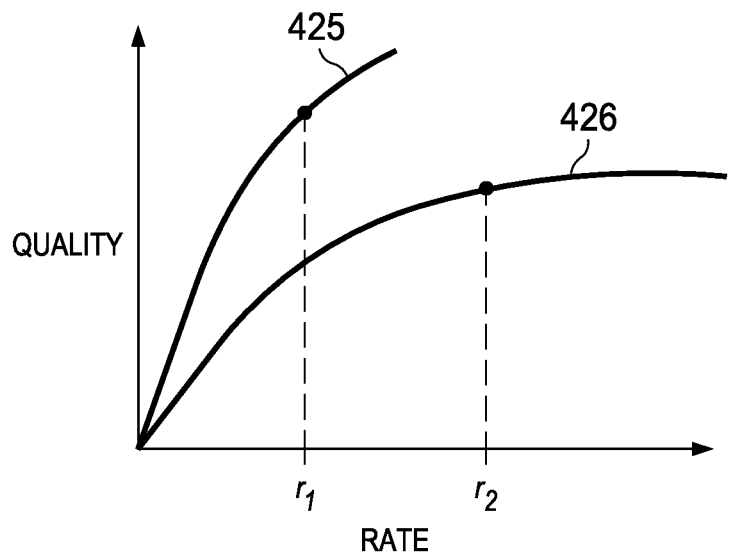
FIG. 11 is a graph of quality versus rate for two potential data flows in accordance with embodiments of the present disclosure.
Figure 12:
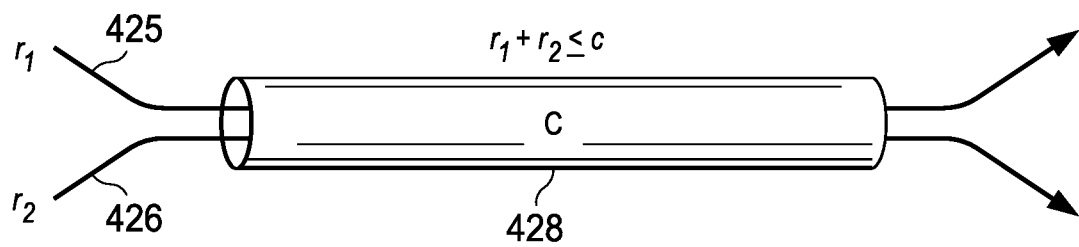
FIG. 12 is a simplified diagram illustrating a potential principle of operation of the communication system according to an embodiment of the present disclosure.

Turning to FIGS. 11 and 12, FIGS. 11 and 12 show a potential principle of operation of a traffic optimization method according to an embodiment of the present disclosure. FIG. 11 shows a graph of quality over data transfer rate of two media streams 425 and 426. Quality of media stream 425 is higher than quality of media stream 426 for a given data transfer rate. Conversely, for a given quality, data transfer rate of media stream 425 is lower than rate of media stream 426. Additionally, if media stream 425 is transmitted at a rate r1 and media stream 426 is transmitted at a rate r2, the total rate, r1+r2, should be lower than or equal to available bandwidth 'c' of the link (i.e., r1+r2≤c).

FIG. 12 shows a simplified diagram illustrating a potential principle of operation of embodiments according to the present disclosure. Two media streams, 425 and 426 with rates r1 and r2 respectively, traverse a network communication link symbolized by a pipe 428. Pipe 428 has a bandwidth represented by 'c.' Media streams 425 and 426 may be directed to two different network devices, for example, a mobile phone and a laptop respectively. The total data transfer rate (i.e., r1+r2) is matched to the total bandwidth (i.e., c) of the wireless link.

Figure 13:
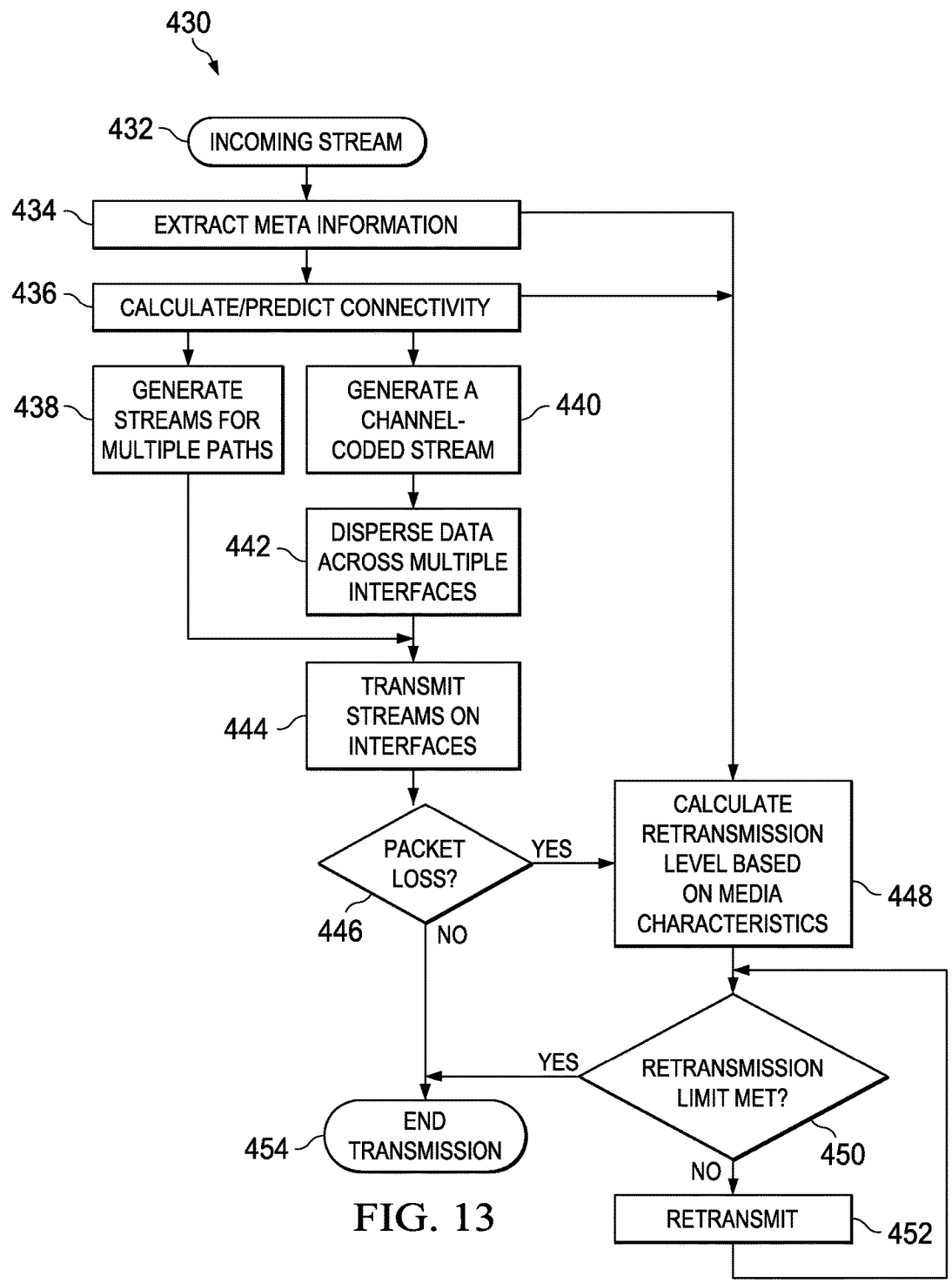
FIG. 13 is a simplified flow chart illustrating example operations that may be associated with a method for performance enhancement of data according to yet another embodiment of the present disclosure.

Turning to FIG. 13, FIG. 13 shows a flow-chart illustrating example operational steps of a method 430 associated with efficient error protection when transmitting streams across multiple networks, according to an embodiment of the present disclosure. According to an example embodiment, efficient error protection may be achieved by differentiating error protection levels based on relative importance of different media packets and wireless channel conditions over each wireless link. To ensure quality of traffic flow, important data streams may have to arrive at a receiver despite any underlying packet losses in the wireless link. Conversely, quality of traffic flow may not be negatively impacted if less important packets do not arrive. These less important media packets may be skipped if they are not successfully transmitted the first time, while retransmission for more important packets may be performed to ensure that the important packets arrive. Thus, to ensure timely delivery of media packets, the number of retransmissions may be limited based on a relative importance of the data packets. For example, for streaming applications with a more lenient latency requirement than non-streaming applications, it may be more efficient to combat packet losses via retransmissions, as opposed to forward error correction (FEC).

In FIG. 13, voice/video stream 302 is incoming in step 432. Meta information is extracted from voice/video stream 302 by meta information extractor 290 in step 434. Connectivity of transmission interfaces are calculated and/or predicted by performance enhancer 292 in step 436. Performance enhancer 292 can generate media streams 312 for multiple links (and/or paths) 298 in step 438 based at least on matching data transfer rate of each media stream 312 to available bandwidth across the corresponding interface. Alternatively, performance enhancer 292 may generate a channel-coded stream in step 440. Performance enhancer 292 may disperse the channel-coded stream into media streams 312 across multiple interfaces in step 442 based at least on matching data transfer rate of each media stream 312 to available bandwidth across the corresponding interface. Media streams 312 are transmitted on multiple interfaces 26 in step 444.

Proper transmission of media streams 312 is checked by path/link state monitor 286 in step 446. For example, if a Transmission Control Protocol (TCP) is used to transport data packets between OBU 30 and network controller 284, proper transmission can be checked from acknowledgement (ACK) packets sent back by a receiver (i.e., a node, either OBU 30 or controller 284, that receives data packets).

If it is determined that there is packet loss (i.e., one or more packets in media stream 312 have not reached a receiver), a retransmission level based on media characteristics may be calculated by performance enhancer 292 in step 448. In one embodiment, 3G and 4G wireless channels that allow both radio link control (RLC) frame retransmissions and medium access control (MAC) frame retransmissions may be used. In another embodiment, Wireless Local Area Network (WLAN) that allows MAC frame retransmission may be used. According to embodiments of the present disclosure, the retransmission level can be dynamically tuned based on various factors, including meta information 306, such as relative importance of each packet, latency requirement of application originating voice/video stream 302, decoding deadline of each packet, or expected channel condition over each link or codependency among successfully delivered and in-transit packets, or a combination thereof.

If the calculated retransmission limit is not met as determined in step 450, the packet is retransmitted in step 452. For example, retransmission of streaming video data may be performed for I-frame packets, which have a highest relative priority, up to N times, while retransmission of P-frame packets may be limited to M (M<N), and retransmission of B-frame packets, which have a lowest relative priority, may not be performed at all. Optimization of retransmission levels may be combined with intelligent interface selection (e.g., path assignment), for instance, by always choosing to send the most important packets over a link with lowest observed packet loss rate. If there is no packet loss in step 446, and/or if the calculated retransmission level is met as determined in step 450, transmission terminates in step 454.

Figure 14:
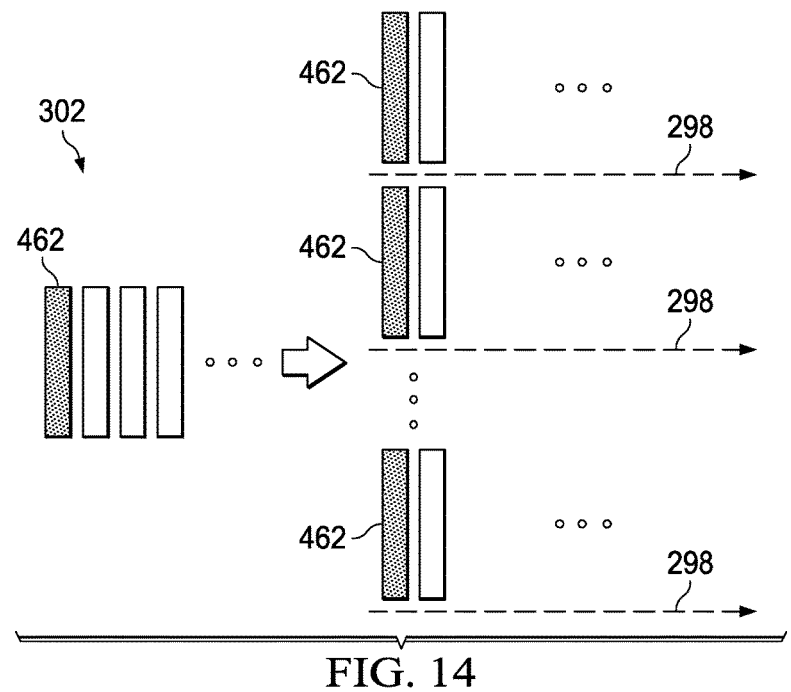
FIG. 14 is a simplified block diagram illustrating a potential principle of operation of performance enhancement of data according to an embodiment of the present disclosure.

Turning to FIG. 14, FIG. 14 is a simplified block diagram illustrating a potential principle of operation of performance enhancement of data according to an embodiment of the present disclosure. Diversity across alternate multiple wireless links (and/or paths) 298 may be leveraged to mitigate an impact of bursty packet losses over any particular link (and/or path). In one example implementation shown in FIG. 14, crucial packets 462 in an incoming data stream 302 may be duplicated during transmission over multiple wireless links (and/or paths) 298. In example embodiments, crucial packets 462 may include packets containing motion vectors and I-frames in compressed video, and base-layer packets in a scalably encoded audio or video stream. Thus, duplication of crucial packets 462 may ensure that crucial packets arrive losslessly at a receiver as compared to less crucial packets.

Figure 15:
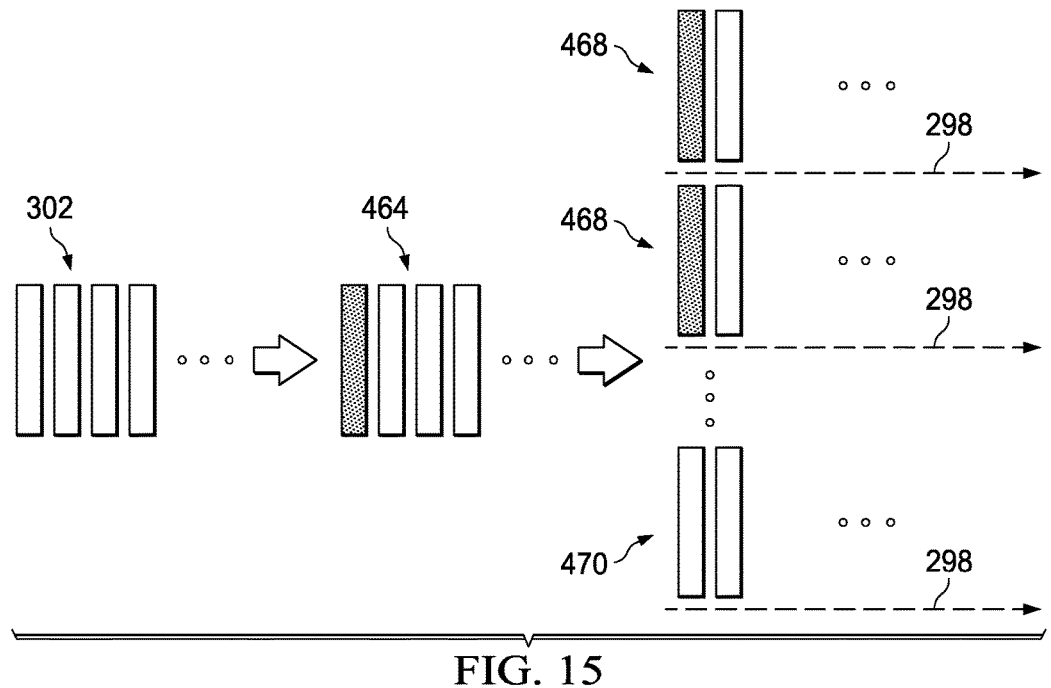
FIG. 15 is a simplified block diagram illustrating a potential principle of operation of performance enhancement of data according to another embodiment of the present disclosure.

Turning to FIG. 15, FIG. 15 is a simplified block diagram illustrating a potential principle of operation of performance enhancement of data according to an embodiment of the present disclosure. In general, channel coding deals with error control techniques. If data at an output of a communication system has a high error rate, coding may permit an increased rate of information at a fixed error rate, or a reduced error rate at a fixed transfer rate. In general, when a data stream is coded, a decoder can determine errors by checking if the received word is a valid code word or corrupted by noise.

In accordance with embodiments of the present disclosure, erasure protection channel coding and error protection channel coding, such as Reed-Solomon (RS) code, may be implemented across an incoming data stream 302, to create channel-coded stream 464. For example, a video stream 302 may be partitioned into segments, with each segment containing m packets. A block code may be applied to the m packets to generate additional r redundant packets (i.e., parity packets) resulting in an n-packet block, where n=m+r. With such coding, a receiver can recover the original m packets if a sufficient number of packets in a block are received. According to the present embodiment, channel coded stream 464 may be dispersed into coded packets 468 and uncoded packets 470 and dispersed across multiple links (and/or paths) 298. Uncoded packets 470 may also be transmitted concurrently with codes packets 468 to decode coded packets 468.

Figure 16:
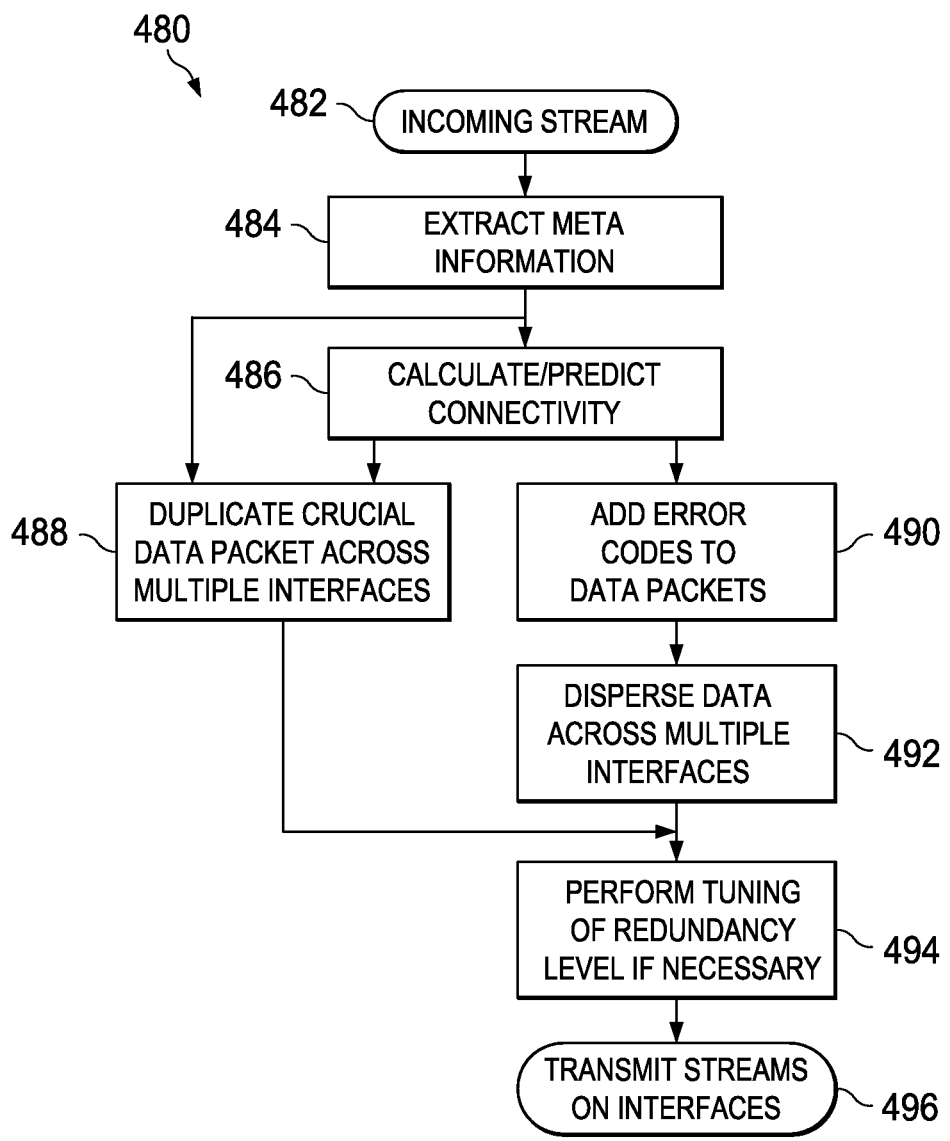
FIG. 16 is a simplified flow chart illustrating example operations that may be associated with a method for performance enhancement of data according to yet another embodiment of the present disclosure.

Turning to FIG. 16, FIG. 16 is a flow-chart illustrating example operational steps of a method 480 associated with robust package delivery according to an embodiment of the present disclosure. Voice/video stream 302 is incoming in step 482. Meta information is extracted from voice/video stream 302 by meta information extractor 290 in step 484. Connectivity of transmission interfaces 26 is calculated and/or predicted by performance enhancer 292 in step 486. Performance enhancer 292 can generate media streams 312 for multiple links (and/or paths) 298 in step 488 based at least on duplicating crucial data packets across multiple interfaces. Alternatively, performance enhancer 292 may generate a channel-coded stream in step 490, for example, by adding error codes (i.e., parity packets) to data packets to create coded packets 468. Performance enhancer 292 may disperse the channel-coded stream into media streams 312 across multiple interfaces in step 492. Duplication or channel coding of data may introduce a certain level of redundancy in transmitted media streams 312. Such redundancy may be carefully tuned to balance any tradeoff between robustness and overhead in step 494. Tuning of redundancy level may be performed based on one or more factors, including observed wireless channel conditions over each wireless link; amount of crucial information embedded in each media stream 312; and effectiveness of error concealment mechanisms used in communication system 10. Media streams 312 are transmitted on the interfaces in step 496.

Thus, multiple audio and video streams may be sent or received inside a vehicle. When multiple audio applications are sent or received inside a vehicle, for example, simultaneous use of a radio and a video conferencing system, there may be a need to use noise cancellation techniques to enhance audio quality. For example, beamforming of voice with multiple speakers may be implemented followed by active noise cancellation with multiple microphones to cancel ambient noise and improve audio quality.

Beamforming is a signal processing technique used for directional signal transmission or reception involving combining audio signals from multiple microphones in such a way that signals at a particular angle experience constructive interference and signals at other angles experience destructive interference. Beamforming can be used at both transmit and receive to achieve spatial selectivity. Thus, when transmitting, a phase and relative amplitude of the signal at a sender are controlled to create a pattern of constructive and destructive interference in a wavefront of the sound signal.

When receiving, information from different sensors (e.g., microphones) is combined such that the expected pattern of radiation is preferentially observed.

Figure 17:
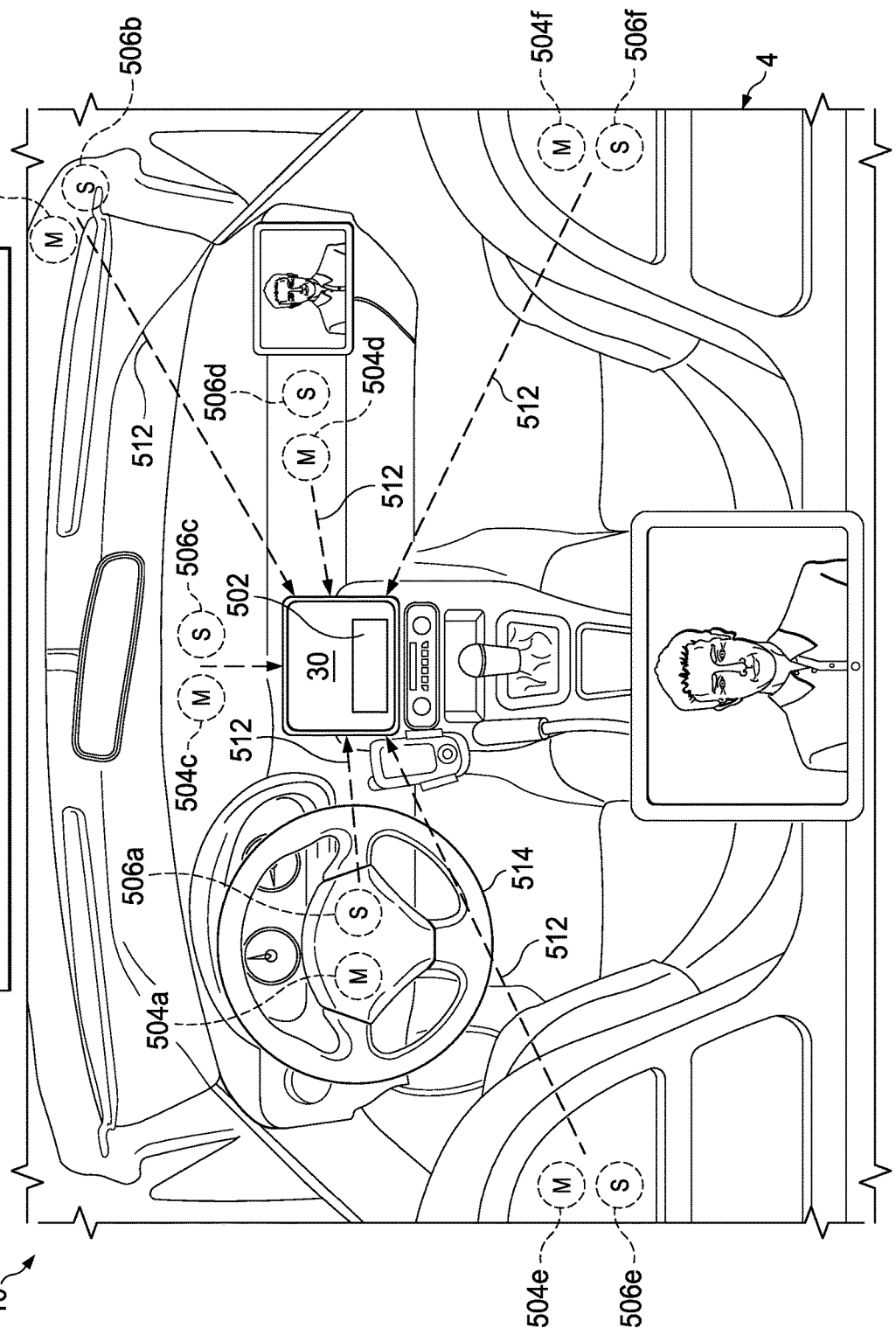
FIG. 17 is a simplified block diagram of example components of the communication system according to embodiments of the present disclosure.

Turning to FIG. 17, FIG. 17 is a simplified block diagram of an example interior of a vehicle, such as vehicle 4 showing exemplary placement of OBU 30, microphones and speakers in communication system 10 according to an embodiment of the present disclosure. Because OBUs may have various collaboration applications such as VoIP, Cisco WebEx®, Cisco Telepresence®, Voice-to-Text, Text-to-Voice applications, and the like, the interior of the vehicle may have noise originating from various sources that interferes with the quality of speech of hands free microphone and speaker systems. A signal processing module 502 in OBU 30, together with strategically placed microphones 504a-f and speakers 506a-f, can improve speech quality in noisy vehicular environments by suppressing multiple sources of background noise, sounds and echoes. Communication system 10 may also automatically cause adjustments to voice volume and equalization, and may employ beamforming techniques to maximize speech quality.

One or more microphones 504a-f and one or more speakers 506a-f may be employed for adaptive noise cancellation and acoustic beam-forming. Microphones 504a-f and speakers 506a-f can be built-in systems for vehicle 4 and/or mobile devices such as smartphones and tablets. Microphones 504a-f can send acoustic signals to OBU 30 over a communication link 512 that may be wired or wireless inclusive of any electronic link. Examples of wired links include USB cable, HDMI cable, Ethernet, Controller Area Network (CAN) buses, Local Internet Network (LIN) buses and Media Oriented System Transport (MOST) buses. Examples of wireless links include IEEE 802.11, 802.16, WiFi, Bluetooth, and WiMax. Similarly, processed acoustic signals may be sent from OBU 30 to speakers 506a-f over wired or wireless communication links.

In accordance with embodiments of the present disclosure, one or more microphones (not shown) may be positioned outside a car, for example, near an engine or exterior noise area, to select noise frequency bands. Microphones 504a maybe positioned near the driver, for example, on a steering wheel 514. Similarly, microphones 504b may be positioned near a passenger seat area to capture the passenger's speech on a hands-free telephone call. If the driver is speaking, the corresponding microphone 504a can be used as a source of speech with beamforming, dynamic voice equalization and volume adjustment to improve energy of an input frequency band of the speech. The remaining microphones 504b-f can be used as noise sources to filter out noise surrounding the speaker, including stationary and non-stationary noise, intermittent ambient sounds and echoes. For example, the remaining microphones 504b-f may provide noise cancellation, wherein sound waves from some microphones interfere with and cancel sound waves from other microphones, thereby reducing noise.

These dual techniques (i.e., beamforming and active noise cancellation techniques) can provide a clear voice to a listener on a remote node or a clear voice input to a voice-to-text engine residing in OBU 30. It will be appreciated that although the embodiment has been described with respect to microphones, the methods described herein are applicable to situations wherein one or more users may be listening to audio from multiple speakers 506a-f. In such cases, beamforming may be used to transmit high quality audio for a high priority user or application. For example, a traffic alert audio may have higher priority than music playing over all speakers. Beamforming may be used to direct the traffic alert signal to speakers 506a near the driver to enhance the traffic alert audio quality over the music.

Figure 18:
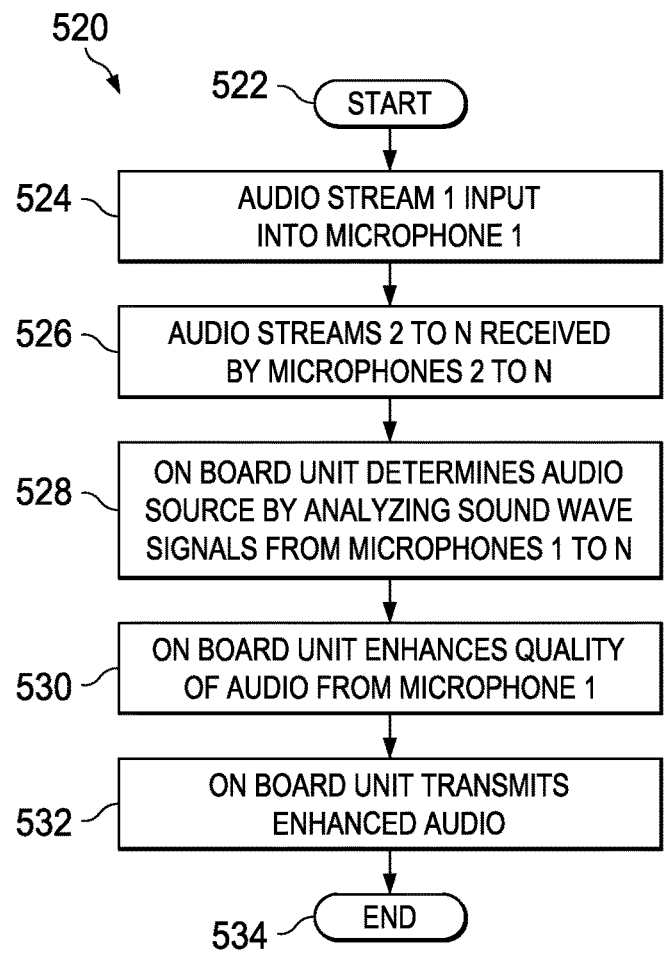
FIG. 18 is a simplified flow chart illustrating example operations that may be associated with a method for noise cancellation according to an embodiment of the present disclosure.

Turning to FIG. 18, FIG. 18 illustrates a flow-chart illustrating example operational steps that may be associated with a method 520 cancelling noise in a vehicular network environment according to embodiments of the present disclosure. Method 520 begins in step 522. In step 524, audio is input into a microphone 1. For example, a passenger may initiate a conference call using a hands-free telephone system equipped in vehicle 4. Microphone 1 may be situated close to the passenger initiating the conference call. Other microphones in vehicle 4, for example, microphones 2 to N, may receive the audio streams in step 526. Audio signals from microphones 2 to N may be sent to OBU 30, which analyzes the sound wave signals in step 528 to determine the source of sound, in this case, microphone 1. OBU 30 may enhance voice quality of sound from microphone 1 in step 530. Voice enhancement may be performed according to one or more techniques, for example, dynamic voice equalization or volume adjustment or a combination thereof, to improve quality of audio from microphone 1, while suppressing noise and ambient sounds from microphones 2 to N. The enhanced audio is transmitted to a remote end node by the OBU 30 in step 532, and the process is terminated in step 534.

In example embodiments, a HUD can display a picture of a vehicle, for example, vehicle 4. The picture on the HUD can be used to select a primary application, and a corresponding user, for example a driver, may choose a driver's seat position on the picture to instruct OBU 30 that the driver wants to listen to the radio. Simultaneously, a passenger in the back may choose a back seat on the picture to instruct OBU 30 that the passenger wants to use a WebEx application. OBU 30 can use this information from the driver and passenger to provision microphones, speakers and other components of the vehicle appropriately for each user and chosen application. Thus, the speakers in the front may be configured to transmit audio from the radio application, while suppressing noise from the speakers in the back. Simultaneously, speakers in the back may be configured to transmit audio from the WebEx application while suppressing noise from the speakers in the front.

In another example, radio controls may be exclusively in the front, and WebEx controls may be exclusively in the back. When a user selects radio controls, OBU 30 can automatically determine that microphones, speakers and other components of the vehicle in the front may be activated. On the other hand, when a user selects WebEx controls, OBU 30 can automatically determine that microphones, speakers and other components of the vehicle in the back may be activated.

Thus according to embodiments of communication system 10 described herein, a user in a vehicle may receive multiple data streams, including audio and video, from various sources inside and outside a vehicle. In response, or to provide commands to in-vehicle devices, for example, a video conferencing system, or for other purposes, the user may want to input data or information or commands into OBU 30 or other devices. For example, the user may want to initiate and conduct a video conferencing call in a vehicle. In another example, a user may want to control a volume of music playing from an audio system in the vehicle. Identity profiles associated with the user may be used to store user commands and/or preferences for various user inputs.

Figure 19:
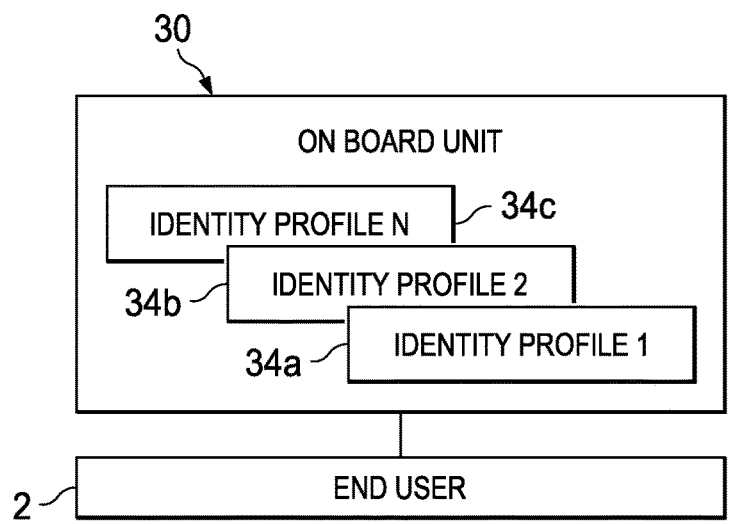
FIG. 19 is a block diagram illustrating example components of the communication system according to embodiments of the present disclosure.

Turning to FIG. 19, communication system 10 depicts further details that may be associated with OBU 30. In accordance with embodiments of communication system 10, OBU 30 may be provisioned with one or more identity profiles 34*a*, 34*b*, and 34*c* (referred to collectively herein as identity profiles 34), with each identity profile 34 corresponding to an agent that can authenticate to OBU 30. Identity profiles 34 can include profile information for a particular agent.

Profile information may be configured to aggregate agent attributes, account information, preferences, and/or settings, which can enable appropriate transactions by authenticated agents. For example, profile information can include vehicle settings, dashboard preferences, user commands (e.g., voice commands, gesture commands), application preferences (e.g., radio station preferences for driver and passengers, preferences regarding applications preferred by users in particular seats, etc.), wireless interface preferences (e.g., WiFi account information, etc.), web account information (e.g., multimedia, social networking, etc.), mobile device list (e.g., smartphones, mobile phones, tablets, laptops, etc.) including network configurations for mobile devices, network service provider membership account information, insurance information, credit card/payment account information, manufacturer web account information, network interface account information, GPS favorite locations, and phone contact list.

The information included in a particular identity profile may be at least partially dependent upon the particular agent to which it corresponds. For example, an authorized entity (e.g., a manufacturer of the vehicle, etc.) may not need vehicle settings, GPS favorite locations, or multimedia information in its identity profile. In addition to agents, a profile identity may be provisioned for a vehicle itself including information to distinctly identity the vehicle (e.g., a vehicle identification number (VIN)). It will be apparent that the examples provided herein of profile information are not all-inclusive, and any other suitable information or data could be included as profile information.

Various implementations can accommodate identity profiles 34 in OBU 30. For example, in one embodiment identity profiles 34 are stored in dedicated hardware (e.g., physical SIM card, memory card, etc.). Software can be configured to virtually switch between different hardware or the hardware itself may be programmable to store different agent identity information over time. In another embodiment, identity profiles 34 are stored in a programmable storage module or virtual identity module that can store one or more identity profiles 34. Generally, identity profiles 34 may be kept in any suitable memory element, software, hardware, or in any other suitable component, device, element, or object where appropriate and based on particular needs. In addition, identity profiles 34 may be provided in any database, register, cache, queue, control list, or storage structure.

In example embodiments of the present disclosure, identity profiles 34 may be provisioned and managed through one or more identity service providers, who may be a third party service provider, a mobile network operator, a vehicle manufacturer, a vehicle rental and leasing agency, a vehicle dealer, a government agency, or any other entity having an interest in managing identities associated with a vehicle over the life of the vehicle. Moreover, identity profiles 34 can be managed through the same or different identity service providers. By storing an identity profile in a remote cloud, for example, the identity profile can be associated with an agent rather than a particular vehicle. Consequently, a human agent (e.g., driver, passenger, owner, renter, etc.) can retrieve his identity profile in any vehicle. Depending on the make/model of the vehicle, the human agent can leverage relevant parts of the identity profile for available features in virtually any vehicle. Identity profile 34 may be dynamically added, removed, and updated via local or remote network access.

In other example embodiments, an identity profile may be stored on a transportable memory element (e.g., USB stick, CD, etc.), which may be provided locally to OBU 30 by a user. The identity profile can then be downloaded to OBU 30 from the transportable memory element. In other example scenarios, an identity profile may be dynamically created and managed (e.g., removed or updated) locally, directly through OBU 30. For example, OBU 30 may provide an identity profile creation tool through a display for an end user 2 to enter desired profile information and associate such information with an agent. In another embodiment, the identity profile creation tool may be accessible through a user's mobile device. In these scenarios, the identity profile would not be accessible through identity service providers and could only be accessed in the particular vehicle containing the identity profile.

Turning to FIG. 20, FIG. 20 shows various example embodiments of a gesture based user interface. User interface 536 may be a touch pad (e.g. single touch, multi touch) based input device mounted on steering wheel 514 of vehicle 4 and connected to OBU 30. OBU 30 may be configured to direct media information to one or more appropriate displays (e.g., display 28) in vehicle 4, and may be further configured to compute touch inputs from gesture based user interface 536 based on displayed information on the appropriate corresponding display.

Figure 20A:
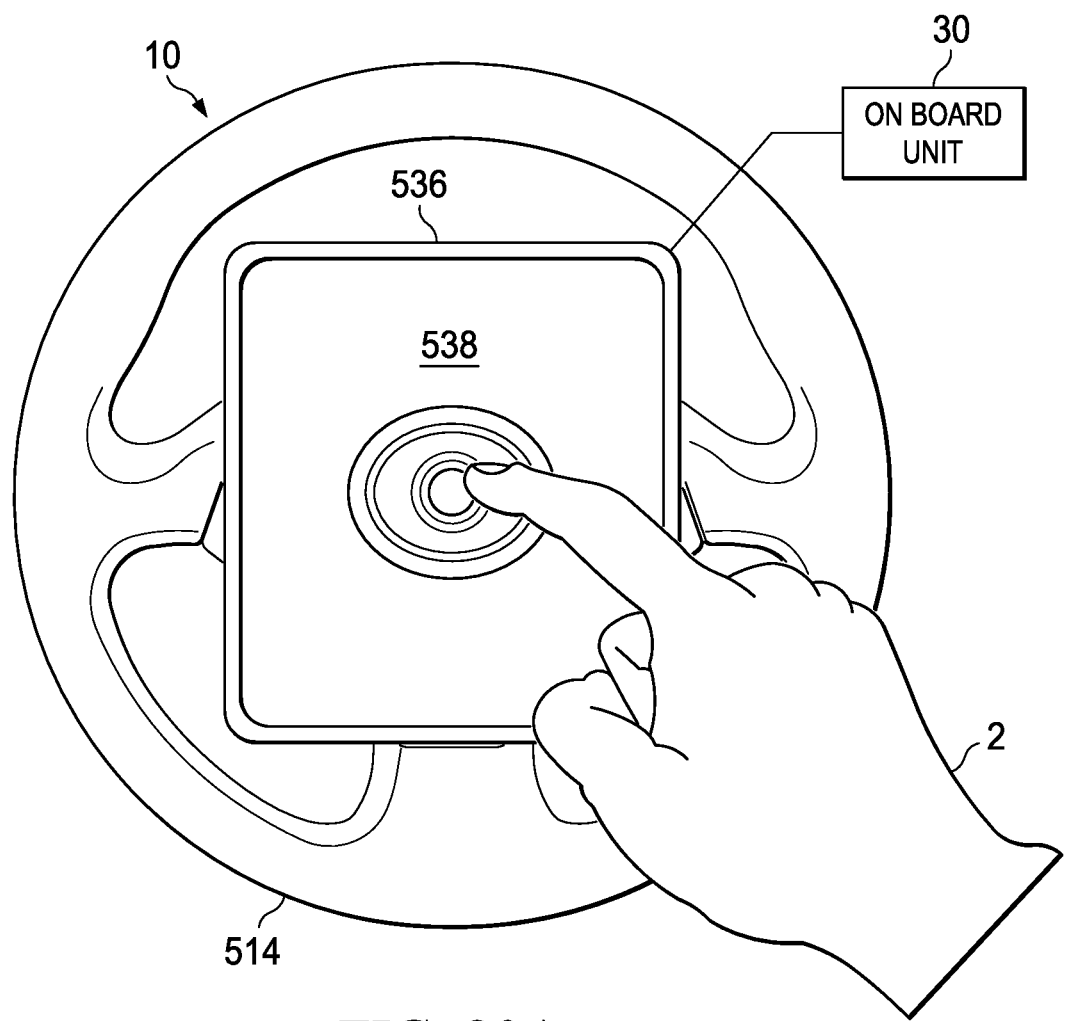
FIGS. 20A-20D are simplified diagrams illustrating example user interfaces according to embodiments of the present disclosure.
Figure 20B:
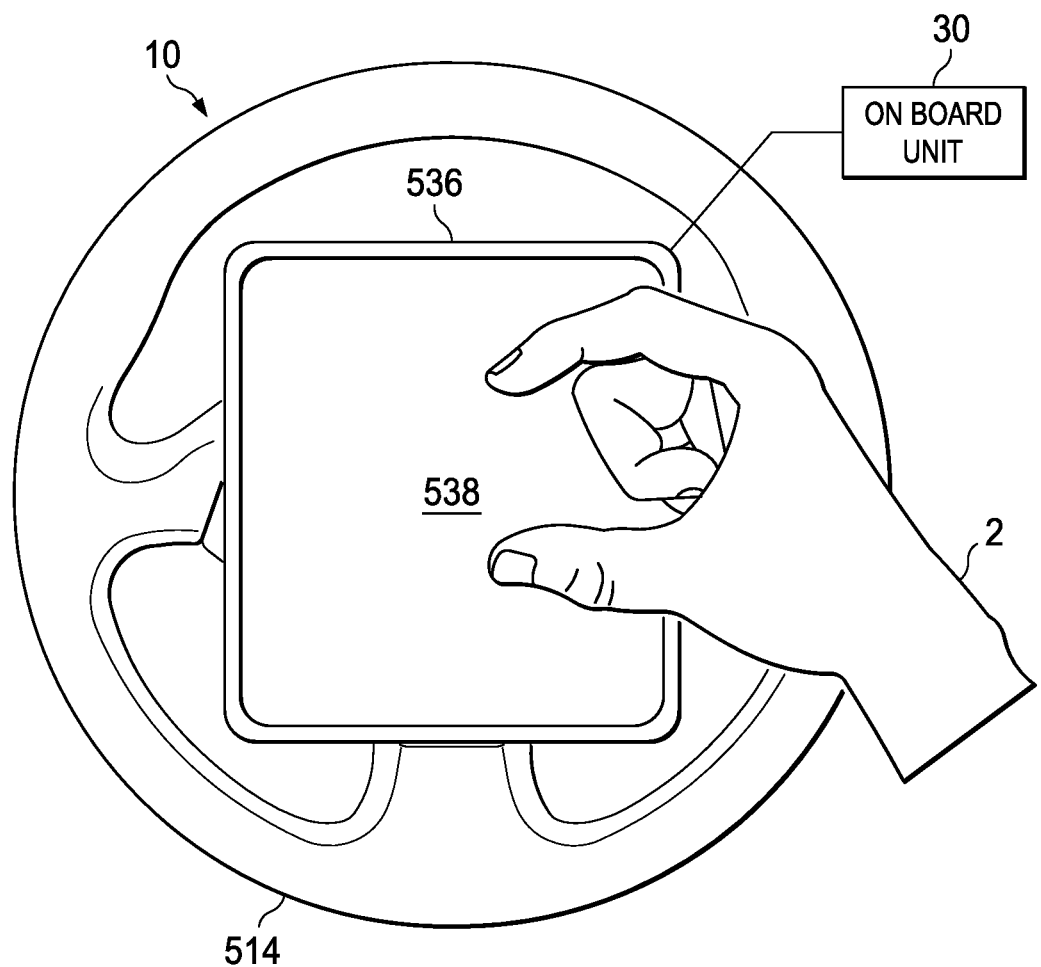

FIGS. 20A and 20B illustrate single and multi touch operations of gesture based user interface 536 mounted on steering wheel 514. User interface 536 may sense and respond to gestures in the form of one or more touches. Thus, user 2 may touch user interface 536 to implement user commands such as click, select, drag up/down/left/right, zoom in and out, flip, swipe, pan, expand, minimize, go forward/backward, etc. Example touches may include pressing, tapping, rotating a wheel on a surface 538 of user interface 536, moving one finger over surface 538 of user interface 536, moving multiple fingers over surface 538 of user interface 536, etc. These and other possible touches can be used to control different applications and in-vehicle devices, such as in-vehicle climate, audio and video, navigation, infotainment systems, etc.

Figure 20C:
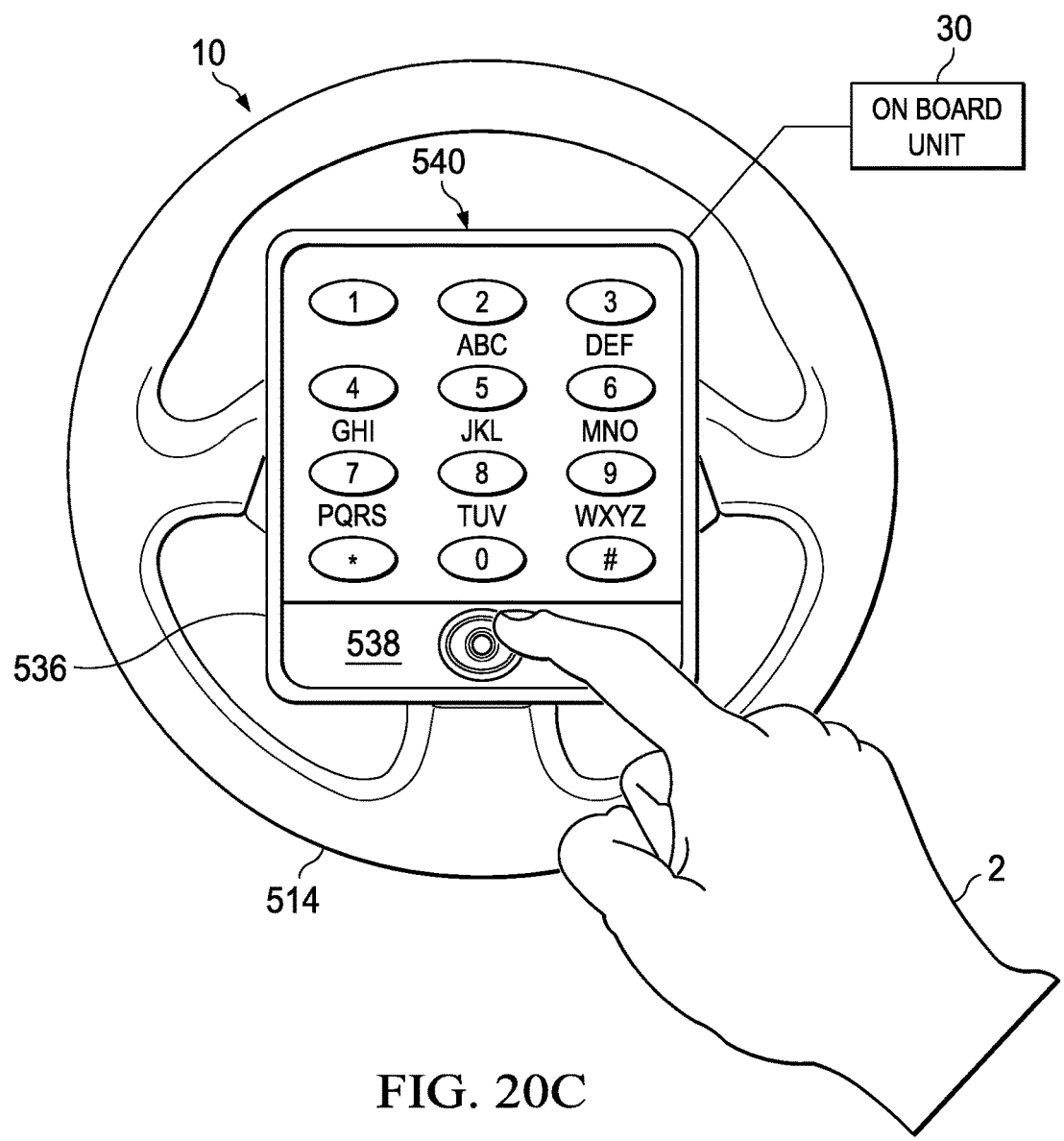
Figure 20D:
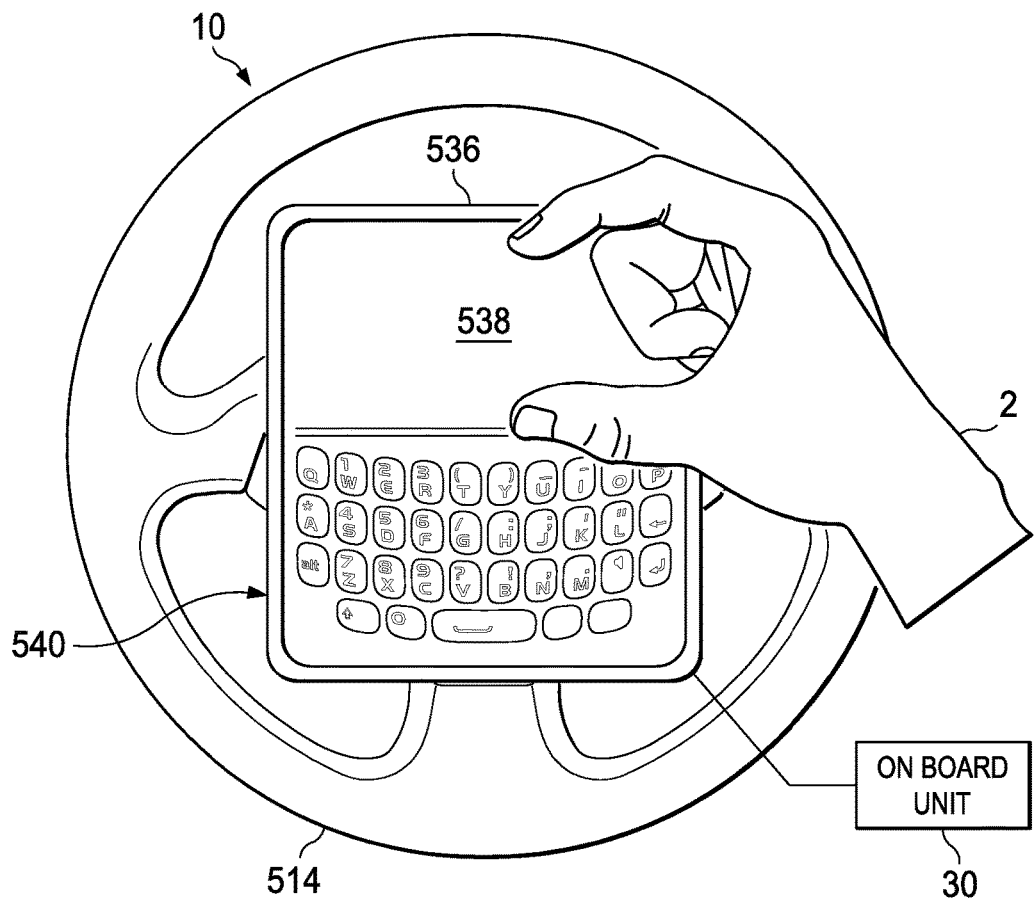
Figure 20E:
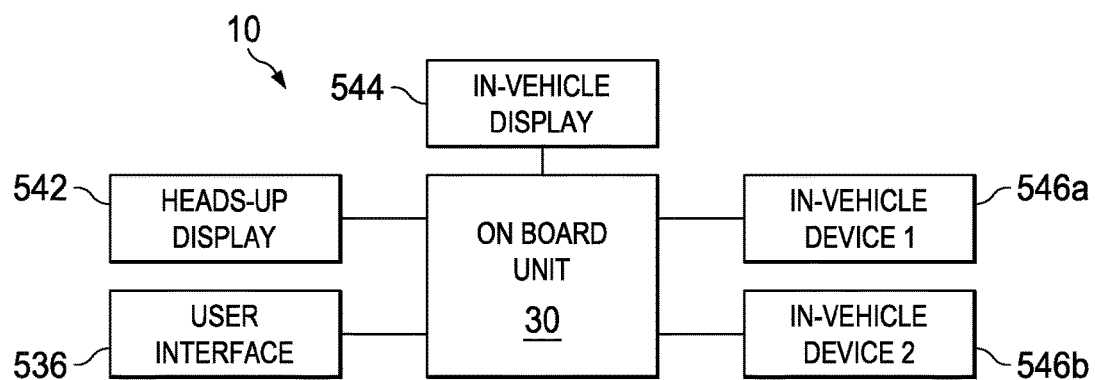
FIG. 20E is a simplified block diagram illustrating an example user interface in a communication system according to embodiments of the present disclosure.

In another example embodiment according to the present disclosure, a keyboard and/or number pad 540 can also be mounted on steering wheel 514 as illustrated in FIGS. 20C and 20D. A driver familiar with a layout of keyboard/number pad 540 can type words or numbers while keeping his/her eyes on the road. Smart predictive text/number input can augment user interface 536 so that the driver can input a minimum number of characters. In such a scheme, one or more predicted words may appear on a screen for the driver to select. The driver may select the appropriate text or number using one or more appropriate touches on user interface 536. It will be appreciated that the type and layout of keyboard/number pad 540 illustrated in FIGS. 20C and 20D are for example purposes only. Other variations and designs may be implemented without changing the scope of the disclosure. For example, keyboard 540 may be split into two halves, and each half may be located on either side of steering wheel 514. User interface 536 may be mounted on other parts of the vehicle, for example, adjacent to steering wheel 514, on a dashboard, etc. It will be appreciated that various placements and designs of user interface 536 are possible without changing the scope of the present disclosure.

Figure 21:
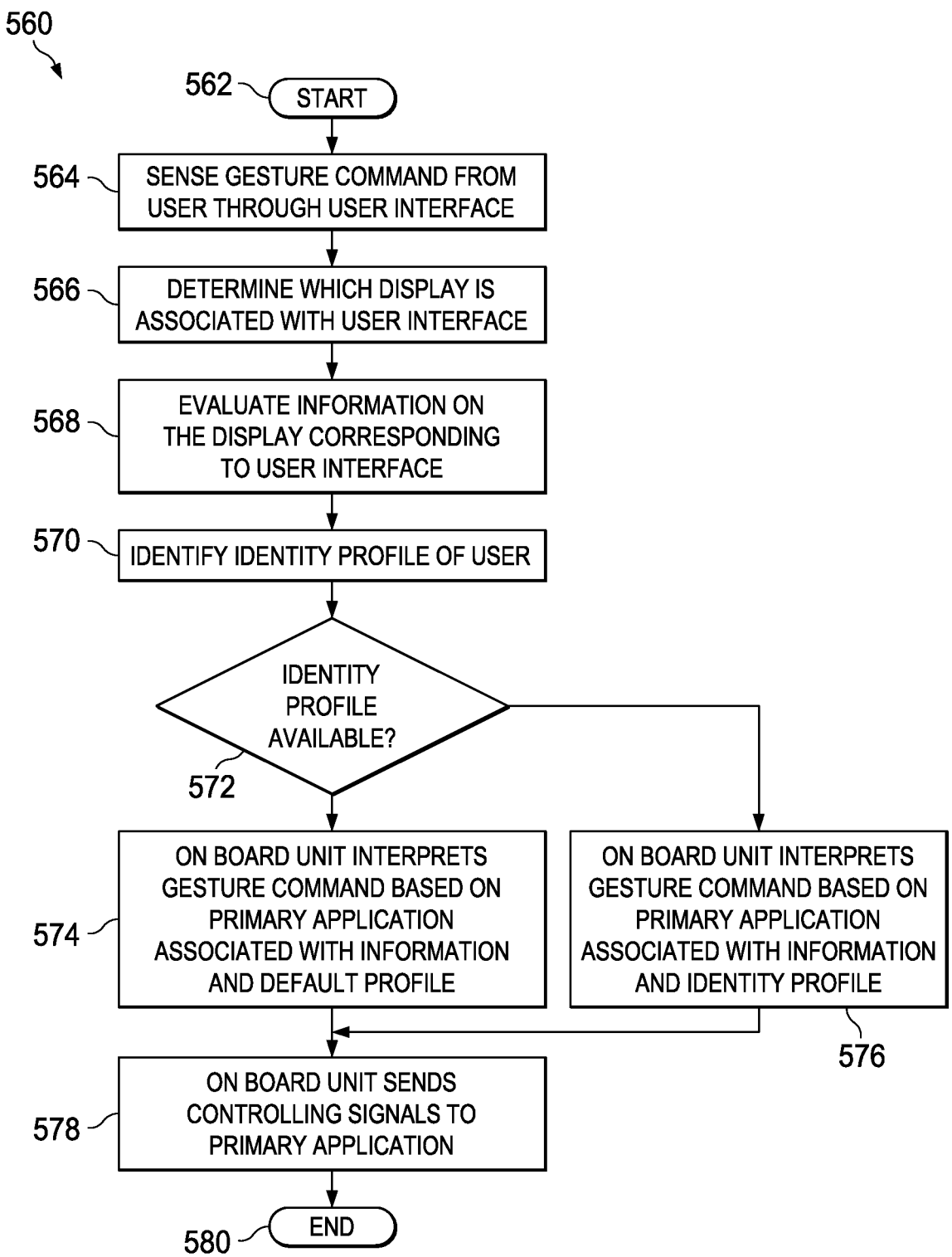
FIG. 21 is a simplified flow chart illustrating example operations that may be associated with a method using user interfaces according to embodiments of the present disclosure.

Turning to FIG. 21, FIG. 21 shows a flow-chart illustrating example operational steps that may be associated with a method 560 for operating a touch based user interface 536 according to an embodiment of the present disclosure. Method 560 starts in step 562. In step 564, user 2 may touch user interface 536, for example, swipe the user's index finger from right to left on surface 538 of user interface 536. OBU 30 may sense this gesture command from the user through user interface 536. OBU 30 may determine which display is associated with user interface 536 in step 566. OBU 30 can evaluate information on the display corresponding to user interface 536 in step 568.

For example, OBU 30 may aggregate signals from the user's touch inputs to effect actions on multiple applications. Multiple applications may be simultaneously running on OBU 30, and/or on multiple in-vehicle devices. At any given time, one application of the multiple applications may be displayed as a primary application on a heads up display (HUD) or in-vehicle display. In one example embodiment, user 2 may pre-select the desired display to be controlled by inputs through gesture based user interface 536. For example, icons representing different displays may be available for selection on a primary display such as HUD. By default, user interface 536 may control the HUD only and user 2 can select an appropriate icon of choice to switch the primary display from HUD to another in-vehicle display. Once switched to the desired display, user 2 can select a different icon using user interface 536 to switch to controlling a different primary display.

In another example embodiment, camera(s) tracking a driver's eyes may determine the primary display. In yet another example embodiment, OBU 30 may share resources with in-vehicle devices such as smart phones, laptops, tablets, etc. For example, OBU 30 may use a phone's screen as a display. With seamless resource sharing, in-vehicle devices can utilize user interface 536 as an input device to control applications on the in-vehicle device. In a particular example, a smartphone sharing resources with OBU 30 may be controlled by user interface 536.

In step 570, OBU 30 may check whether identity profile 34 corresponding to user 2 is available. In example embodiments of the present disclosure, user inputs may be associated with identity profiles 34*a-c*. For example, identity profile 34*a* may be associated with a first user, 34*b* may be associated with a second user, and identity profile 34*c* may be associated with a third user. A swipe on surface 538 of user interface 536 by the first user with identity profile 34*a* may be interpreted differently by OBU 30 than the same swipe by the third user with identity profile 34*c*.

In other example embodiments, touches may be customized to a user's gender, for example, a woman's touches may be interpreted differently from a man's touches. In other example embodiments, touches may be associated with user age. For example, an adult's touches may be interpreted differently from a teenager's touches. In other example embodiments, touches may be based on generic human behavior, independent of identity profiles associated with specific users. Such touches based on generic human behavior may be stored in default identity profiles. For example, a swipe of an index finger to the left by any user (i.e., irrespective of any identity profile 34) may be interpreted to mean that the user wants to move the display to the left. It will be apparent that the examples provided herein of associations between touches and actions/interpretations and/or identity profiles 34 are not all-inclusive, and any other suitable associations could be included between touches, actions/interpretations and identity profiles.

OBU 30 may also determine user input, such as smart text and predictive actions, from the user's touches based on a user context for the primary application. For example, if user 2 has selected a radio playing music on a radio station, then a few swipes on surface 538 of user interface 536 may imply that user 2 probably wants to tune the radio to another radio station. In another example, user 2 may select a phone, and the same swipes on surface 538 of user interface 536 may imply that user 2 wants to redial a previously called number. It will be appreciated that numerous other scenarios are possible for context based determination of user inputs.

If identity profile 34 is not available, OBU 30 can interpret user's touch, based on a default profile and primary application in step 574. On the other hand, if an identity profile 34 for user 2 is available, OBU 30 may interpret user's touches based on the corresponding identity profile 34 and primary application in step 576. OBU 30 can send controlling signals based on interpretations of user's touch to the appropriate primary application, in-vehicle device, remote node, etc. in step 578. The process ends in step 580.

Figure 22:
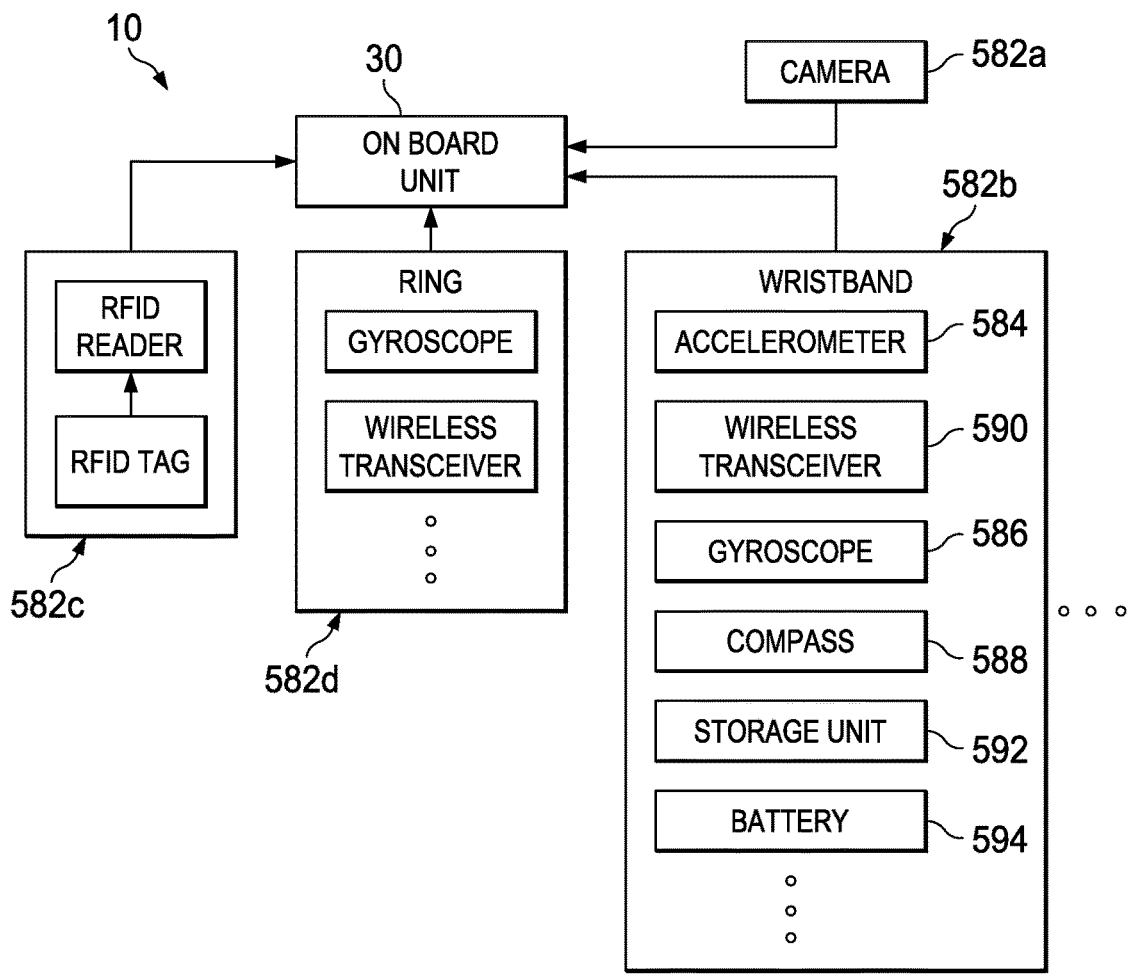
FIG. 22 is a simplified diagram of example components of the communication system according to embodiments of the present disclosure.

In accordance with embodiments of the present disclosure, other gestures may also be used to input user commands and send signals via appropriate user interfaces. Turning to FIG. 22, FIG. 22 illustrates a simplified block diagram of gesture based user interfaces 582*a-d* in communication system 10 according to embodiments of the present disclosure. Gestures may be expressed using hands, fingers, head, eyes and/or other parts of the body either alone or in combination. Gestures may also be used in combination with physical objects, icons and pictures. For example, a hand wave may be interpreted as a signal to stop a phone application, whereas the hand wave in combination with a head nod and a picture may be interpreted as a signal to start a phone application and dial a specific number.

In accordance with embodiments of communication system 10, OBU 30 may be provisioned with one or more gesture based user interfaces 582*a-d* (referred to collectively herein as gesture based user interfaces 582), with each gesture based user interface 582 adapted to communicate with OBU 30 via wireless links. Examples of wireless links include IEEE 802.11, 802.16, WiFi, Bluetooth, and WiMax. Gesture based user interface 582 may be: 1) an electronic wearable device, or an object attached to an electronic device, for example, a camera, illustrated in FIG. 22 as gesture based user interface 582*a*; or 2) image recognition via appropriate sensors and devices.

According to embodiments of the present disclosure, a user may wear a gesture based user interface 582 whose motion and orientation represent different types of inputs. Example devices include: rings, watches, wristbands, earrings, headbands, etc. In each case, an electronic circuit comprising accelerometers, gyroscopes, batteries, compasses, and wireless transceivers can be imbedded in user interface 582, which may be active or passive. As used herein, 'active devices' can wirelessly transmit signals representing motion information to OBU 30. An example of an active device, illustrated in FIG. 22 as gesture based user interface 582*b*, may be a wristband comprising an accelerometer 584, gyroscope 586, compass 588, wireless transceiver 590, storage unit 592, and battery 594. Accelerometer 584, gyroscope 586 and compass 588 track motion and orientation of the user interface 582*b*. Wireless transceiver 590 may transmit the motion and orientation information to OBU 30 wirelessly, for example, using Bluetooth, WiFi Direct, or other wireless technologies.

As used herein, 'passive devices' do not transmit information to OBU 30. Rather, one or more passive devices, one or more detectors, and/or sensors coupled to OBU 30 track movements of the one or more passive devices and thereby capture gestures. An example of a passive device enabling gesture commands, illustrated in FIG. 22 as user interface 582*c*, is radio frequency identification (RFID) tag with corresponding RFID readers to detect RFID signals. RFID tags may be embedded in physical objects, icons, or pictures. OBU 30 may aggregate information from one or more active devices and/or detectors/sensors detecting motion of one or more passive devices to determine a desired user input from the user's gestures.

Gestures may be used to control applications and in-vehicle devices, for example, selecting projected icons or information on a windshield HUD, flipping to a next set of icons or information on the HUD, and controlling audio and climate settings. In another example embodiment, user 2 may use multiple user interfaces 582 (e.g., multiple rings on different fingers) to aggregate more information to OBU 30. For example, user 2 may wear multiple rings on different fingers, so that different finger orientations and gestures can represent predetermined set of inputs (e.g. speed dial a phone number via gesture). In another embodiment, user 2 may wear a passive RFID tag ring on one finger or multiple passive RFID tag rings on different fingers. One or more RFID readers can capture the location and orientation of the RFID tags and transmit that information to OBU 30. In yet another embodiment, user 2 may wear an RFID reader. Multiple RFID tags may be distributed around vehicle 4 to reflect signals back to the RFID reader so that OBU 30 can determine its relative location and motion.

Figure 23:
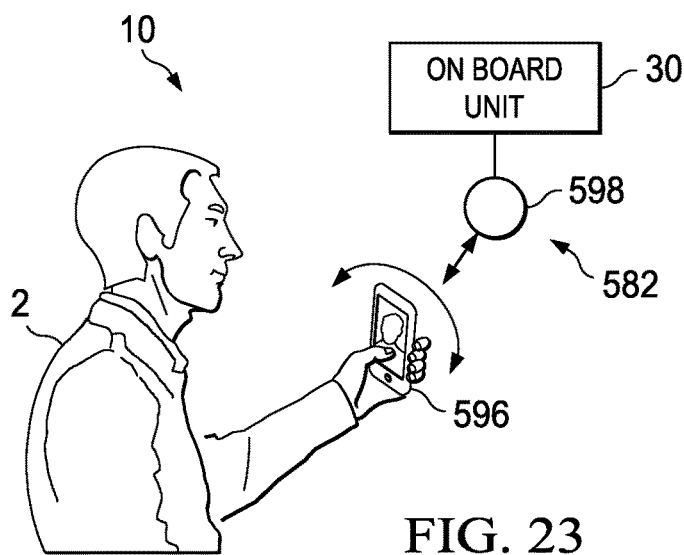
FIG. 23 is a simplified diagram of a user interacting with example components of the communication system according to another embodiment of the present disclosure.

Turning to FIG. 23, FIG. 23 is a simplified diagram of a user interacting with example components associated with a gesture based user interface 582 in communication system 10 according to an embodiment of the present disclosure. User 2 may wave an article 596 embedded with RFID logic. Article 596 may be a picture, or icon, or object. An RFID reader 598 may capture RFID information from article 596 and relay the RFID information to OBU 30. OBU 30 may associate a corresponding preprogrammed input indicating an intent of the object being waved or otherwise moved, and may interpret the gesture as appropriate input by the user. For example, user 2 may wave a picture of a person, for example, her daughter, the picture being attached with an RFID tag. An RFID reader may capture the RFID information and transmit the RFID information to OBU 30. An application on OBU 30, for example, a phone application, can register the RFID information and associate it with the daughter's phone number. The phone application can then automatically dial the phone number. In another example, user 2 may hold different objects in front of a camera to trigger preprogrammed responses. For example, a red cube may signal calling home, a yellow triangle may signal calling another person, etc.

Figure 24A:
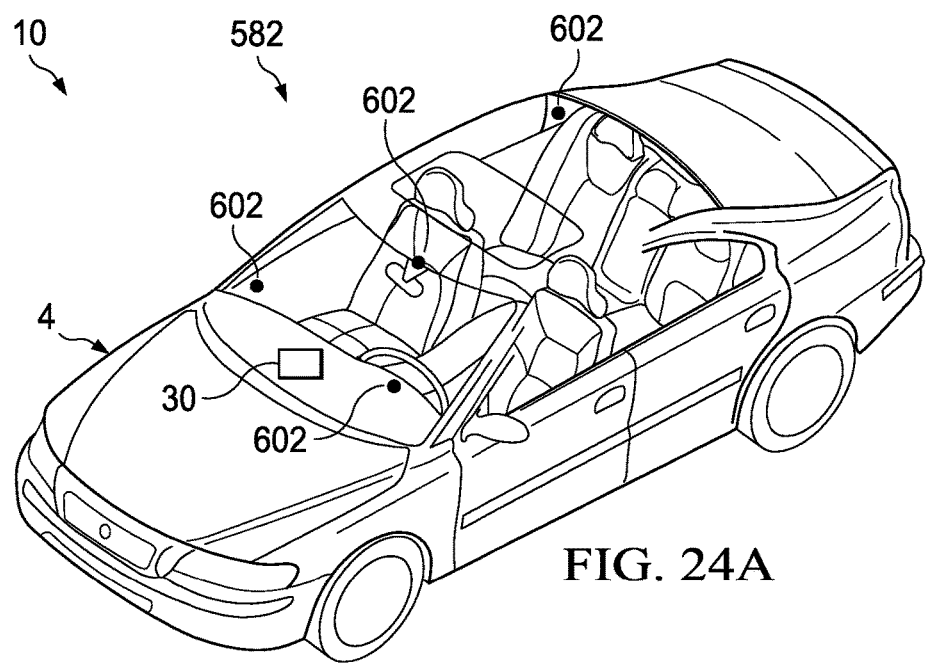
FIGS. 24A-24C are simplified diagrams of example components of the communication system according to embodiments of the present disclosure.
Figure 24B:
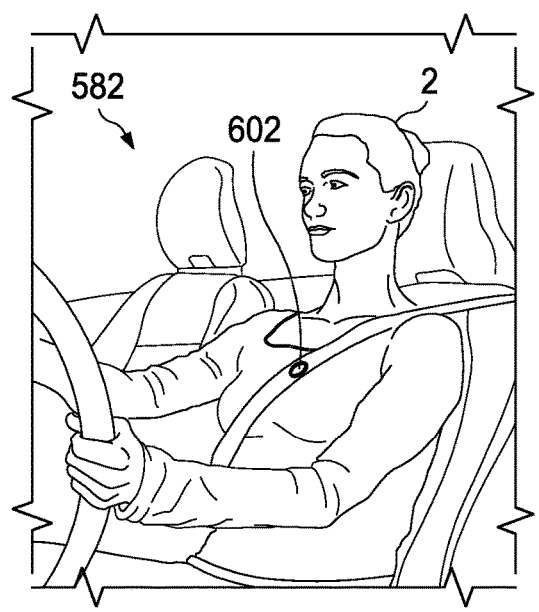
Figure 24C:
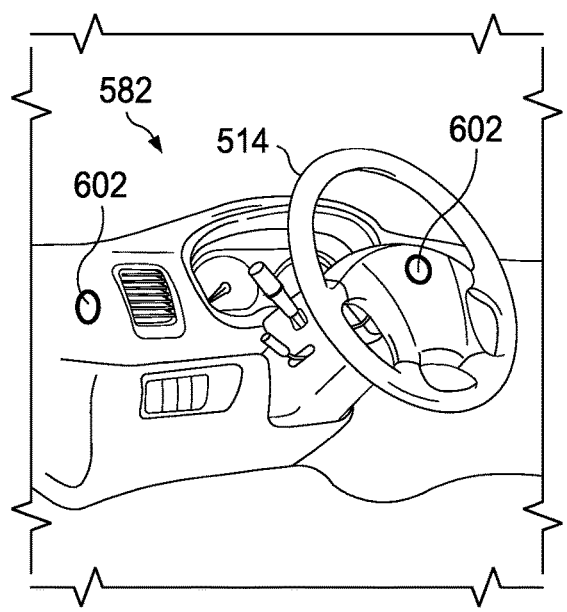

Turning to FIGS. 24A-24C, FIGS. 24A-24C illustrate further gesture based user interfaces 582 in communication system 10 according to embodiments of the present disclosure. According to example embodiments, information about gestures can be aggregated through image recognition techniques. For example, as illustrated in FIG. 24A, one or more cameras 602 may be positioned opportunistically inside vehicle 4 to record gestures from user 2 by capturing images of user 2. The captured images can be sent to OBU 30 for image recognition processing including, for example, feature extraction and gesture estimation. Cameras 602 may be optical, infrared, time-of-flight or any suitable combination thereof to capture various information associated with gestures, for example speed and type of gesture. One or more image-based recognition techniques could be used with standard off-the-shelf cameras. However, time-of-flight cameras may provide additional depth information that can make feature and gesture extraction more accurate and reliable.

In example embodiments, gestures may also be context sensitive. Generally, gestures could be predefined as representing a particular command or having a particular meaning when used in different contexts. Thus, the same gesture could indicate one command in a first context and could indicate a different command in a second context. For example, user 2 may be asked by an application to select icons displayed on the HUD. A pointing motion by user 2 may mean icon selection whereas a swiping motion may mean flipping to the next set of icons. On the other hand, when dialing a call, a pointing motion may mean a particular number, whereas a swiping motion may mean switching call recipients.

Cameras 602 may be mounted in several locations. In one example embodiment, as illustrated in FIG. 24B, camera 602 may be located on a seat belt of user 2 to provide "driver's eye view" of a driver's hands and body for gesture recognition. In another example embodiment, as illustrated in FIG. 24C camera 602 may be located on steering wheel 514 for hand and body gesture recognition. In yet another example embodiment, camera 602 may be mounted on a sun visor to get a clear view of the driver's head and eyes and calculate the direction of the driver's line of sight. In another example embodiment, camera 602 may be located on a passenger side of a dashboard to get a profile view and enhance tracking and gesture extraction accuracy. In another example embodiment, camera 602 may be located on an exterior of the vehicle to provide sensory data about the environment. Such image based recognition may allow OBU 30 to provide better information based on passive data collected about the driver. For example, a time-of-flight camera 602 can calculate the direction a driver is looking, and can select to display information on a HUD at an unobtrusive location away from the driver's direct line of sight. In other examples, image based recognition can be used to detect a critical event (e.g., event creating potential danger to the driver and/or others) and alert the driver of such events.

Figure 25:
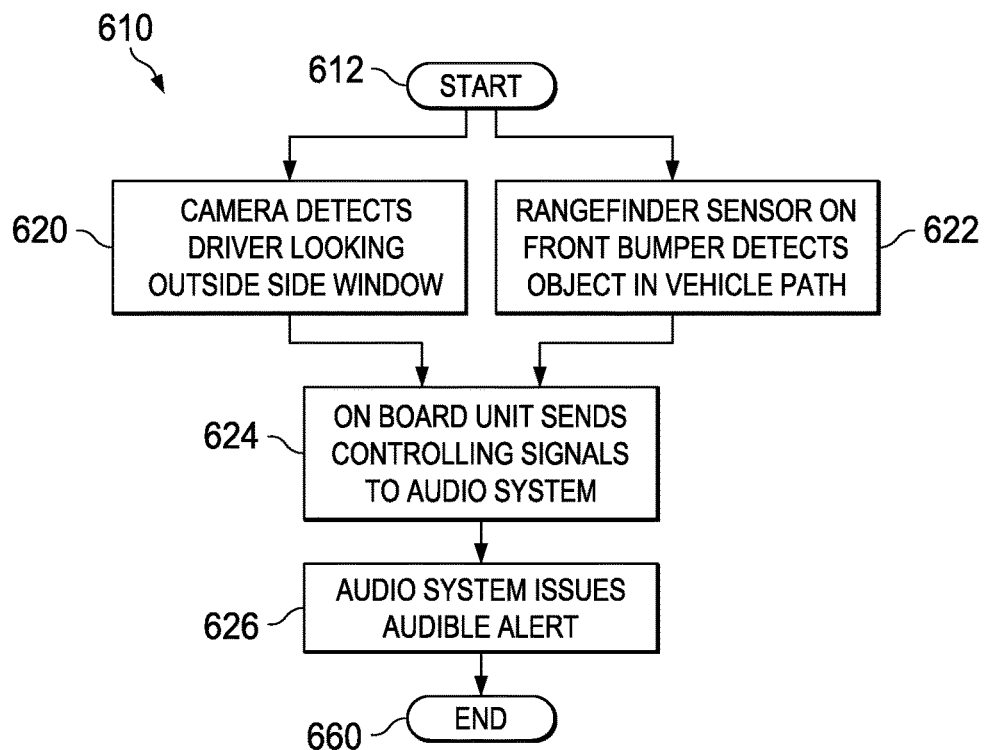
FIG. 25 is a simplified flow chart illustrating example operations that may be associated with an example scenario with user interfaces according to embodiments of the present disclosure.

Turning to FIGS. 25-28, FIGS. 25-28 illustrate various flow charts illustrating example operational steps associated with a method 610 using multiple user interfaces according to embodiments of the present disclosure. According to various embodiments, in method 610, one or more user interfaces may be used simultaneously or in conjunction with each other. In FIG. 25, method 610 starts in step 612 and illustrates an example scenario. Camera 602 may detect that a driver is looking out a side window in step 620, at the same time that a rangefinder sensor 14 on a front bumper may detect that an object has just moved into a path of vehicle 4 in step 622. OBU 30 can aggregate information from camera 602 and rangefinder sensor 14 and may send controlling signals to an audio system in step 624. The audio system may issue an audible alert in step 626 to alert the driver about the object. The process ends in step 660.

Figure 26:
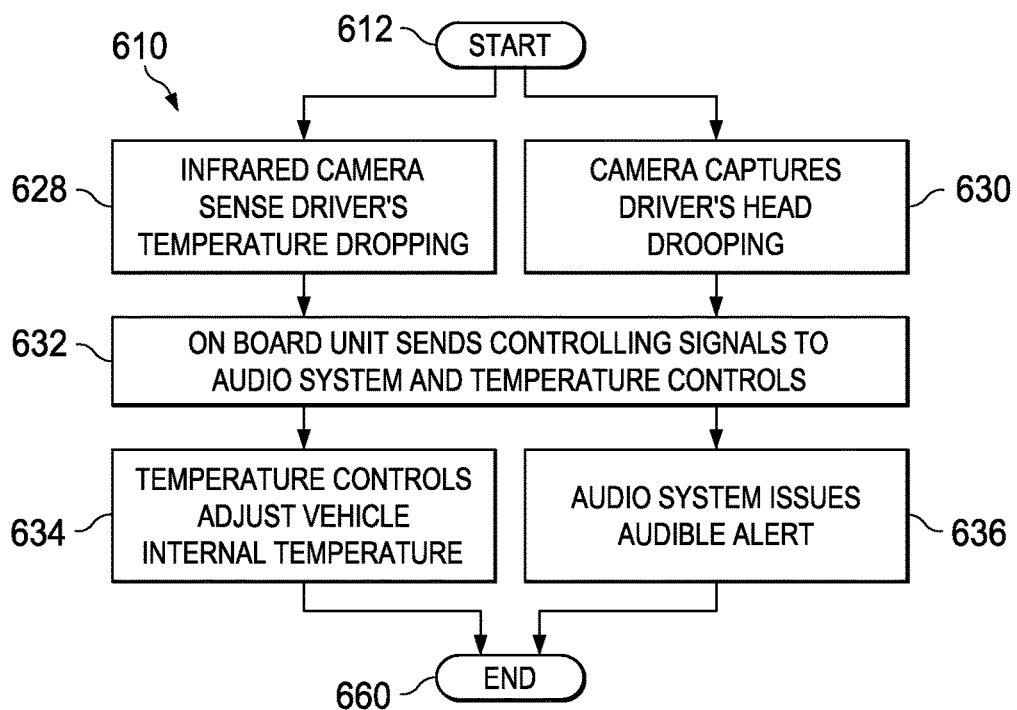
FIG. 26 is a simplified flow chart illustrating further example operations that may be associated with another example scenario with user interfaces according to embodiments of the present disclosure.

In FIG. 26, method 610 starts in step 612 and illustrates another example scenario. An infrared camera 602 may sense in step 628 that a driver's body temperature is dropping at around the same time that a time-of-flight camera 602 may capture the driver's head drooping in step 630. OBU 30 can aggregate information from the infrared camera and time-of-flight camera and may send controlling signals to an audio system and temperature controls in step 632. In response, the temperature controls can adjust vehicle internal temperature in step 634 and the audio system can simultaneously issue an audible alert in step 636 to wake up the driver as he begins to doze off, and make automatic adjustments to a climate control or stereo to keep the driver awake and alert. The process ends in step 660.

Figure 27:
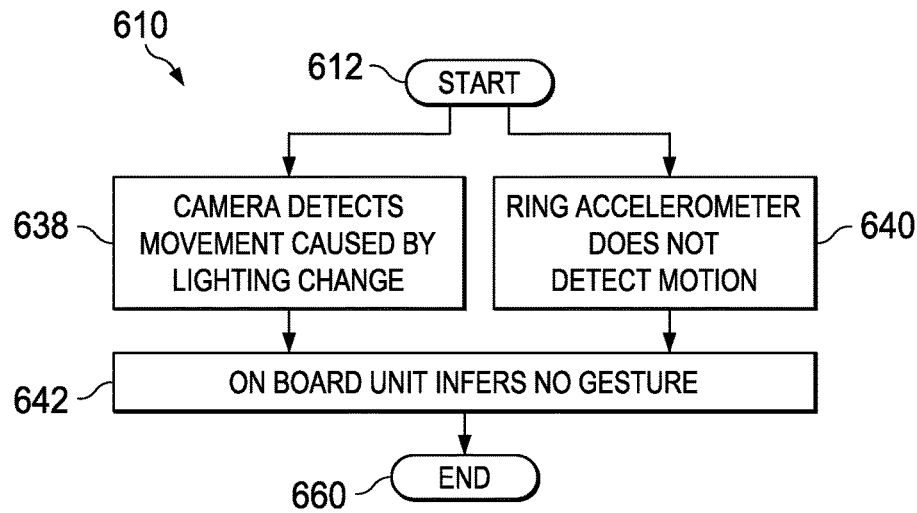
FIG. 27 is a simplified flow chart illustrating additional example operations that may be associated with yet another example scenario with user interfaces according to embodiments of the present disclosure.

In FIG. 27, method 610 starts in step 612 and illustrates yet another example scenario. A camera 602 may detect movement across its view caused by a lighting change (e.g., when the vehicle enters a tunnel) in step 638. OBU 30 may cross-reference the lighting change information with a ring accelerometer 582 worn on a user's finger, which does not detect motion in step 640. OBU 30 may determine that the user's hand has not moved and no gesture should be inferred in step 642. Vehicle 4 may be equipped with a touch based user interface 536 and gesture based user interface 582. The process ends in step 660.

Figure 28:
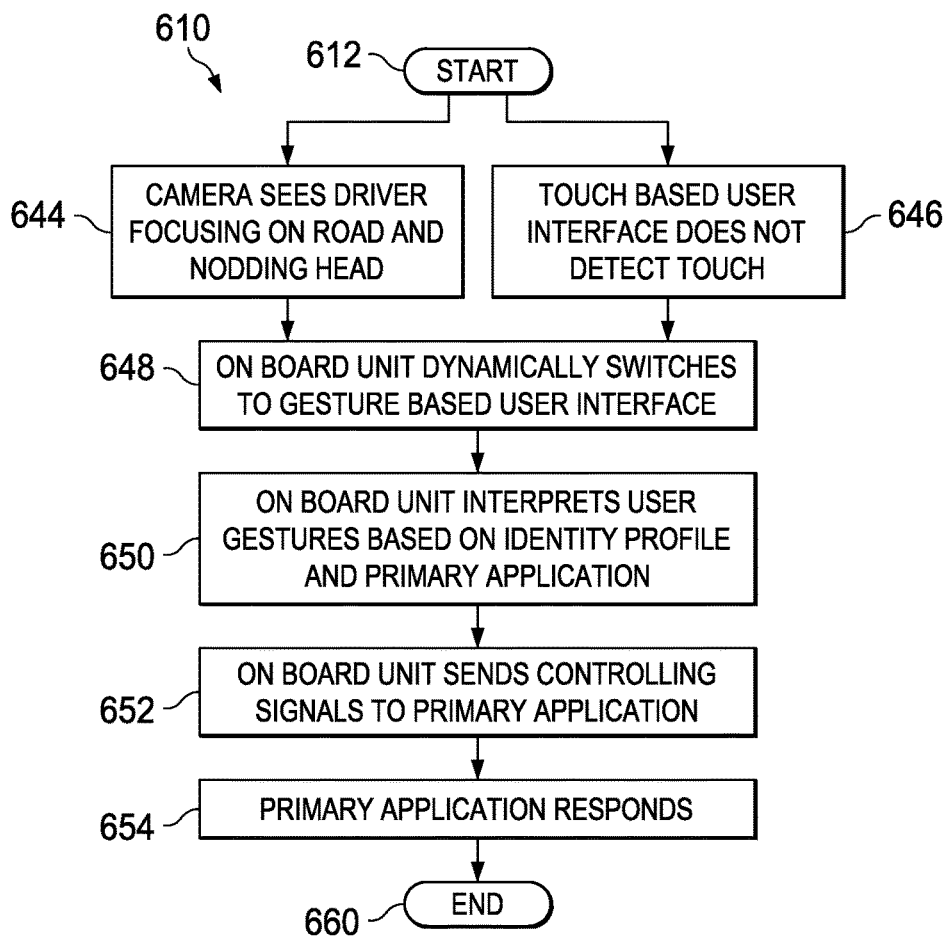
FIG. 28 is a simplified flow chart illustrating yet other example operations that may be associated a further example scenario with user interfaces according to embodiments of the present disclosure.

In FIG. 28, method 610 starts in step 612 and illustrates a further example scenario. Assume that user 2 cannot move his fingers to use touch based user interface 536 (e.g., user 2 is focusing on the road and cannot take his hands or fingers away from the steering wheel). However, a camera 602 may detect that the driver is focused on the road, and nodding his head in step 644, while user interface 536 does not detect touch in step 646. Accordingly, OBU 30 may dynamically switch to gesture based user interface 582 in step 648. In step 650, OBU 30 may interpret user gestures based on suitable identity profile 34 and a primary application. OBU 30 may send controlling signals to the primary application in step 652, and the primary application may respond in step 654. The process ends in step 660.

It will be appreciated that while method 610 has been described with reference to various steps in connection with FIGS. 25-28 that may occur in certain example scenarios as a user operates a vehicle, the steps therein are not comprehensive and may include numerous other movement detections and appropriate responsive signals to a primary application, to vehicle settings, to an audio system, and the like. Additionally, while FIGS. 25-28 illustrate operations associated with particular movement and sensory detections, any movement and sensory detections could be combined and therefore, countless scenarios may be possible. Moreover, the movement and sensory detections can be achieved using any suitable combination of one or more user interfaces of the same or differing types.

In certain implementations and numerous examples provided herein, vehicle 10 is described with reference to an automobile. Communication system 10, however, is not limited to automobiles, but can be applied to a myriad of other types of vehicles (e.g., airplanes, boats, trains, etc.). It will be appreciated that the broad teachings disclosed herein are intended to include any type of vehicle used to move from one location to another location, including vehicles that are not designed to transport humans.

In one example implementation, the on-board unit (OBU) (e.g., OBU 30) and controller (e.g., controller 284) are network elements that facilitate or otherwise help coordinate mobility events, network connectivity, and the transmission of data packets (e.g., for mobile devices, for machine devices, for nodes, for end users, or for a network such as those illustrated in the FIGURES herein) associated with a vehicular network environment. As used herein, the term 'network element' is meant to encompass computers, network appliances, servers, routers, switches, gateways, bridges, loadbalancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In example implementations, at least some portions of the internal networking, data optimization and dynamic frequency selection activities outlined herein may be implemented in software in, for example, the OBU and/or controller. In some embodiments, one or more of these features may be implemented in hardware, provided external to these elements, or consolidated in any appropriate manner to achieve the intended functionality. The OBU and controller may include software (or reciprocating software) that can coordinate in order to achieve the operations, as outlined herein. In still other embodiments, one or both of these elements may include any suitable algorithms, hardware, software, components, modules, interfaces, or objects that facilitate the operations thereof. Furthermore, OBUs described and shown herein may also include suitable interfaces for receiving, transmitting, and/or otherwise communicating data or information in a network environment. Additionally, some of the processors and memory elements associated with the various network elements may be removed, or otherwise consolidated such that a single processor and a single memory location are responsible for certain activities. In a general sense, the arrangements depicted in the FIGURES may be more logical in their representations, whereas a physical architecture may include various permutations, combinations, and/or hybrids of these elements.

It is imperative to note that, because of the inherent properties of the technologies being leveraged by the present disclosure, the terms 'node', 'network element', 'OBU', and 'controller' are broad and, therefore, inclusive of many of the equipment examples discussed herein (e.g., a router, a wireless mobile device, a gateway, etc.). Such expansive breadth is afforded to this terminology due to the flexibility of the presented architectures (e.g., components can be readily exchanged for alternatives). Moreover, there are countless possible design configurations that can be used to achieve the operational objectives outlined here. Accordingly, the associated infrastructure has a myriad of substitute arrangements, design choices, device possibilities, hardware configurations, software implementations, equipment options, etc. In addition, the terms 'node', 'network element', 'OBU', and 'controller' share overlapping definitions as used herein in this Specification, where particular scenarios and environments may require these elements to be extended to specific device provisioning that is atypical. At least in a general sense, these terms are interchangeable due to the limitless schemes in which they can be deployed.

Note that with the numerous examples provided herein, interaction may be described in terms of two, three, four, or more network elements. However, this has been done for purposes of clarity and example only. It should be appreciated that the system can be consolidated in any suitable manner. Along similar design alternatives, any of the illustrated computers, modules, components, and elements of the FIGURES may be combined in various possible configurations, all of which are clearly within the broad scope of this Specification. In certain cases, it may be easier to describe one or more of the functionalities of a given set of flows by only referencing a limited number of network elements. It should be appreciated that communication system 10 of the FIGURES and its teachings are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols in which packets are exchanged in order to provide mobility data, connectivity parameters, access management, etc. Moreover, although communication system 10 has been illustrated with reference to particular elements and operations that facilitate the communication process, these elements and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. An apparatus, comprising:
   a memory element configured to store instructions;
   a plurality of wireless interfaces; and
   a computing processor operable to execute the instructions, wherein the plurality of wireless interfaces, the computing processor, and the memory element cooperate such that the apparatus is configured to:
      establish a communication channel between the apparatus and a sender;
      receive an incoming stream of data from the sender;
      calculate a connectivity of each wireless interface in the plurality of wireless interfaces;
      generate a plurality of data streams from the data based, at least in part, on the connectivity of each wireless interface, wherein to generate the plurality of data streams is to:
         measure a bandwidth across each wireless interface in the plurality of wireless interfaces; and
         match a data transfer rate of at least one data stream in the plurality of data streams across each path with the corresponding bandwidth; and
      transmit the plurality of data streams across the plurality of wireless interfaces.

2. The apparatus of claim 1, wherein calculating the connectivity of each wireless interface comprises:
   measuring a loss rate of each wireless interface;
   measuring a received signal strength indication (RSSI) of each wireless interface;
   extracting a threshold loss rate of each wireless interface;
   extracting a threshold RSSI of each wireless interface;
   comparing the loss rate with the threshold loss rate of each wireless interface; and
   comparing the RSSI with the threshold RSSI of each wireless interface.

3. The apparatus of claim 1, wherein the apparatus is further configured to:
   calculate the data transfer rate of the at least one data stream based on at least one media characteristic of the at least one data stream.

4. The apparatus of claim 1, wherein the apparatus is further configured to:
   extract meta information of the data;
   determine a data packet was lost during the transmission of the plurality of data streams;
   calculate a retransmission level based on a criterion in the meta information; and
   retransmit the data packet across one of the wireless interfaces in the plurality of wireless interfaces according to the retransmission level.

5. The apparatus of claim 4, wherein:
   the criterion is a priority level of the data packet; and
   a data packet with a higher priority level has a first retransmission level and a data packet with a lower priority level has a second retransmission level, wherein the first retransmission level is greater than the second retransmission level.

6. The apparatus of claim 1, wherein generating the plurality of data streams comprises duplicating a crucial data packet across at least two wireless interfaces of the plurality of wireless interfaces.

7. The apparatus of claim 1, wherein generating the plurality of data streams comprises:
   generating a channel coded stream from the data; and
   dispersing the channel coded stream across at least two wireless interfaces in the plurality of wireless interfaces.

8. The apparatus of claim 1, further comprising encoding the plurality of data streams by tuning a redundancy level of at least one data stream.

9. The apparatus of claim 1, wherein the data comprises audio/video data.

10. The apparatus of claim 1, wherein the apparatus is a network controller.

11. The apparatus of claim 1, wherein the apparatus is an on-board unit (OBU) inside a vehicle.

12. A method, comprising:
   establishing a communication channel between a node and a sender, wherein the node is coupled to a plurality of wireless interfaces;
   receiving, at the node, an incoming stream of data from the sender;
   extracting meta information of the data;
   calculating a connectivity of each wireless interface in the plurality of wireless interfaces;

generating a plurality of data streams from the data based, at least in part, on the connectivity of each wireless interface;
transmitting the plurality of data streams across the plurality of wireless interfaces;
determining a data packet was lost during the transmission of the plurality of data streams;
calculating a retransmission level based on a criterion in the meta information; and
retransmitting the data packet across one of the wireless interfaces in the plurality of wireless interfaces according to the retransmission level.

13. The method of claim 12, wherein calculating the connectivity of each wireless interface comprises:
measuring a loss rate of each wireless interface;
measuring a received signal strength indication (RSSI) of each wireless interface;
extracting a threshold loss rate of each wireless interface;
extracting a threshold RSSI of each wireless interface;
comparing the loss rate with the threshold loss rate of each wireless interface; and
comparing the RSSI with the threshold RSSI of each wireless interface.

14. The method of claim 12, wherein generating the plurality of data streams across the plurality of wireless interfaces includes:
measuring a bandwidth across each wireless interface in the plurality of wireless interfaces; and
matching a data transfer rate of at least one data stream in the plurality of data streams across each path with the corresponding bandwidth.

15. The method of claim 14, further comprising:
calculating the data transfer rate of the at least one data stream based on at least one media characteristic of the at least one data stream.

16. The method of claim 12, wherein:
the criterion is a priority level of the data packet; and
a data packet with a higher priority level has a first retransmission level and a data packet with a lower priority level has a second retransmission level, wherein the first retransmission level is greater than the second retransmission level.

17. The method of claim 12, wherein generating the plurality of data streams comprises duplicating a crucial data packet across at least two wireless interfaces in the plurality of wireless interfaces.

18. At least one non-transitory machine-readable medium comprising code for execution, wherein the code, when executed by at least one processor, causes the at least one processor to perform operations comprising:
establishing a communication channel between a node and a sender, wherein the node is coupled to a plurality of wireless interfaces;
receiving, at the node, an incoming stream of data from the sender;
calculating a connectivity of each wireless interface in the plurality of wireless interfaces;
generating a plurality of data streams from the data based, at least in part, on the connectivity of each wireless interface; and
transmitting the plurality of data streams across the plurality of wireless interfaces, wherein the calculating the connectivity of each wireless interface comprises:
measuring a loss rate of each wireless interface;
measuring a received signal strength indication (RSSI) of each wireless interface;
extracting a threshold loss rate of each wireless interface;
extracting a threshold RSSI of each wireless interface;
comparing the loss rate with the threshold loss rate of each wireless interface; and
comparing the RSSI with the threshold RSSI of each wireless interface.

19. The at least one non-transitory machine-readable medium of claim 18, wherein the generating the plurality of data streams comprises duplicating a crucial data packet across at least two wireless interfaces of the plurality of wireless interfaces.

20. The at least one non-transitory machine-readable medium of claim 18, wherein the generating the plurality of data streams comprises:
generating a channel coded stream from the data; and
dispersing the channel coded stream across at least two wireless interfaces in the plurality of wireless interfaces.

* * * * *